United States Patent
Nagao

(10) Patent No.: US 7,076,732 B2
(45) Date of Patent: *Jul. 11, 2006

(54) DOCUMENT PROCESSING APPARATUS HAVING AN AUTHORING CAPABILITY FOR DESCRIBING A DOCUMENT STRUCTURE

(75) Inventor: Katashi Nagao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,135

(22) Filed: Mar. 7, 2005

(65) Prior Publication Data

US 2005/0154971 A1    Jul. 14, 2005

Related U.S. Application Data

(63) Continuation of application No. 09/635,390, filed on Aug. 9, 2000, now Pat. No. 6,981,218.

(30) Foreign Application Priority Data

Aug. 11, 1999   (JP) ............................... P11-227532

(51) Int. Cl.
 G06F 17/24    (2006.01)

(52) U.S. Cl. .......................... 715/536; 715/531; 704/9; 704/4

(58) Field of Classification Search ................ 715/500, 715/536, 531; 704/9, 4
See application file for complete search history.

(56) References Cited

U.S. PATENT DOCUMENTS

| | | | | |
|---|---|---|---|---|
| 5,289,375 | A | * | 2/1994 | Fukumochi et al. ............ 704/9 |
| 5,424,947 | A | * | 6/1995 | Nagao et al. ................... 704/9 |
| 5,442,547 | A | * | 8/1995 | Kutsumi et al. ................ 704/9 |
| 6,092,035 | A | * | 7/2000 | Kurachi et al. ................. 704/9 |
| 6,119,077 | A | * | 9/2000 | Shinozaki ....................... 704/3 |
| 6,266,642 | B1 | * | 7/2001 | Franz et al. ................. 704/277 |
| 6,330,530 | B1 | * | 12/2001 | Horiguchi et al. ............. 704/9 |
| 2002/0007383 | A1 | * | 1/2002 | Yoden et al. ............... 707/536 |

OTHER PUBLICATIONS

Kiyoshi, Yamabana, et al., An Interactive Transaltion Support Facility For Non-Professional Users, Applied Natural Language Conferences—Proceedings of the fifth conference on Applied Natural Language Processing in Washington, D.C. (© 1997).*

Abe, Masahiro, et al., A Dana-Danji Translation System for Non-Segmented Input Sentences Based on Syntactic and Semantic Analysis, International Conference on Computational Linguistics in Bonn, Germany (© 1986).*

* cited by examiner

*Primary Examiner*—Doug Hutton
(74) *Attorney, Agent, or Firm*—Bell, Boyd & Lloyd LL

(57) ABSTRACT

An apparatus and method are disclosed for easily generating document data (tag file) in a form that makes it possible to perform various processes upon the document data. An original document (plain text) is divided into morphological elements, and morphological information is added thereto. Information representing the hierarchical document structures is also added. Furthermore information indicating referential relations between portions in the original document is also added.

1 Claim, 45 Drawing Sheets

FIG. 12A

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| INDEX | IDX1<br>IDX7<br>IDX13<br>IDX15 | IDX2<br>IDX8 | IDX3<br>IDX9<br>IDX14 | IDX4<br>IDX10 | IDX5<br>IDX11 | IDX6<br>IDX12 |

FIG. 12B

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| PROPER NOUN | MR. A<br>.... | B COMPANY<br>.... | C COMPANY<br>G COMPANY<br>.... | D SPECIES<br>.... | MR. E<br>.... | MR. F<br>.... |
| WORD SENSE | BASEBALL (4546)<br>GROUND (2343)<br>.... | LABOR (3112)<br>EMPLOYMENT (9821)<br>.... | MOBILE (2102)<br>.... | CHERRY-1 (1111)<br>ORANGE-1 (9911)<br>.... | CHERRY-2 (1112)<br>ORANGE-2 (9912)<br>.... | CHERRY-3 (1113)<br>.... |
| DOCUMENT ADDRESS | SP1<br>SP2<br>SP3<br>... | SO1<br>SO2<br>SO3<br>... | CO1<br>CO2<br>CO3<br>... | PL1<br>PL2<br>PL3<br>... | AR1<br>AR2<br>AR3<br>... | EV1<br>EV2<br>EV3<br>... |

FIG. 16

|  | COMPUTER | TELEVISION | |
|---|---|---|---|
| COMPUTER |  | 0.55 | |
| TELEVISION | 0.55 |  | |
| VTR | 0.25 | 0.60 | |

FIG. 22A

<document><head><sentence>[<noun phrase><adjective phrase: word sense = "3cf072"> 素敵に </adjective phrase><noun: identifier = "a200"> エイジング </noun></noun phrase>/8</sentence><sentence><verb phrase: identifier = "a876"><adverb phrase: relation = "object"><noun phrase: identifier = "a1000"; relation = "subject"; word sense = "3be2c7> ガン </noun phrase><noun: identifier= "a8"; word sense = "0ff5e7"> 転移 </noun><adverb phrase> 抑え </verb phrase> られる！？ </sentence></head>

FIG. 22B

\<paragraph\>\<sentence\>\<adverb phrase: relation = "subject"\>\<noun phrase: coreference = "a89"\> この転移 \</noun phrase\>, \</adverb phrase\>\<adverb phrase: relation = "condition"\>\<adverb phrase: relation = "subject"\>\<noun phrase: identifier "a15"\>\<noun phrase: coreference = "a1";
relation = "essential"; word sense = "3be2c7"\> がん \</noun phrase\>\<noun; word sense = "0f2e4c"\> 細胞 \</noun\>\</noun phrase\> が \<adverb phrase\> 増えるだけでは \</adverb phrase\> 発生しない。
\</sentence\>\<sentence\>\<adverb phrase: relation = "subject"\>\<noun phrase: identifier = "a18"\>; coreference = "a15"\>\<noun phrase: coreference = "a1"; relation = "essential"\> がん \</noun phrase\>\<noun: word sense = "0f2e4c"\> 細胞 \</noun\>\</noun phrase\> が \</adverb phrase\>\<adverb phrase: relation = "means"\>\<adverb phrase: relation = "means"\>\<adverb phrase: relation = "object"\>\<noun phrase: identifier = "a12"\>\<adverb phrase: relation = "underfined"\>\<adverb phrase: relation = "indirect object"\>\<adverb phrase: relation = "place"\>\<noun phrase: syntax = "parallel"\>\<noun phrase: word sense = "0f2e4c"\> 細胞 \</noun phrase\> と \<noun phrase: word sense = "0f2e4c"\> 細胞 \</noun phrase\>\</noun phrase\> の \</adverb phrase\> 間に \</adverb phrase\> ある \</adverb phrase\> \<noun phrase\>\<noun: syntax = "backward dependency"\> 蛋白 \<exception: relation = "underfined"; pronunciation = "null"\> （たんぱく） \</exception\> \</noun\> 質 \</noun phrase\> などを \</adverb phrase\> 溶かし、 \</adverb phrase\>\<adverb phrase: relation = "object"\>\<verb phrase: relation = "underfined"\>\<adverb phrase: relation = "subject"\>\<noun phrase: coreference = "a18"; word sense = "0f6fa3"\> 自分 \</noun phrase\> の \</advereb phrase\> 進む \</verb phrase\> 道を \</adverb phrase\> つくって、 \</adverb phrase\>\<adverb phrase: relation = "indirect object"\>\<noun phrase: identifier = "a33"; syntax = "parallel"\>\<noun phrase; word sense = "0ef4e6" \> 血管 \</noun phrase\> や \<noun phrase: pronunciation = " りんぱかん "\> リンパ管 \</noun phrase\>\</noun phrase\> に \</adverb phrase\> 入り込む。 ← EXAMPLE 2
\</sentence\>\<sentence: identifier = "a16"\>\<adverb phrase: relation = " 主語 "\>\<verb phrase: relation = "content"\>\<adverb phrase: relation = "object"\>\<noun phrase\>\<adverb phrase: relation = "content"\>\<adverb phrase\>\<adverb phrase\> 循環しながら \</adverb phrase\>\<verb\>\<verb phrase: relation = "underfined"\>\<adverb phrase: relation = "object"\>\<noun phrase: identifier = "a69"\> 新たな "\<noun: pronunciation = " すみか "\> 住み家 \</noun\>"\</noun phrase\> を \</adverb phrase\> 探して \</verb phrase\> 潜り込む、
\</verb\>\</adverb phrase\> といった \</adverb phrase\>\<adjective phrase: relation = "underfined"; word sense = "3ce6b4"\> 複雑な \</adjective phrase\> 動き \</noun phrase\> を \</adverb phrase\> する \</verb phrase\> ことが、 \</adverb phrase\>\<noun phrase: relation = "time"\> 近年 \</noun phrase\> 解明されつつある。\</sentence\>\</paragraph\>\</document\>

— EXAMPLE 1 (at 蛋白 \<exception line)
— EXAMPLE 2 (at 入り込む line)
EXAMPLE 3 (at 潜り込む line)

FIG. 23

<document><sentence><adverb phrase: relation="time">During<noun phrase: relation="essential"><adverb phrase: coreference="wsj">its</adverb phrase><adjective phrase>centennial</adjective phrase>year</noun phrase>,</adverb phrase><proper noun phrase: identifier="wsj"relation="subject">The Wall Street Journal</proper noun phrase> will report<noun phrase: relation="object">events>adverb phrase>of<noun phrase>the past century</noun phrase></adverb phrase><complementary sentence><noun phrase>that</noun phrase>stand<adverb phrase: relation="essential">as<noun phrase>milestones<adverb phrase> of<noun phrase>American business history</noun phrase></adverb phrase></noun phrase> </adverb phrase></complementary sentence></noun phrase>.</sentence><sentence><noun phrase: coreference="a3" relation="subject"><cardinal number phrase: type="integer"; value="3"; relation="essential">THREE</cardinal number phrase>COMPUTERS<complementary sentence>THAT CHANGED<noun phrase: relation="object">the face<adverb phrase>of<noun phrase>personal computing</noun phrase></adverb phrase></noun phrase></complementary sentence></noun phrase>were launched<adverb phrase: relation="time">in<date phrase identifier="a1977">1977</date phrase></adverb phrase></sentence><sentence><date phrase> That year</date phrase><proper noun phrase: identifier="a3;syntax="parallel"; relation= "subject">the<proper noun phrase: identifier="a2">Apple<noun phrase: pronunciation="two"> II</noun phrase></proper noun phrase>,<proper noun phrase: identifier="cp">Commodore Pet</proper noun phrase>and<proper noun phrase: identifier="trs">Tandy TRS</proper noun phrase></proper noun phrase>came<adverb phrase: relation="essential">to market</adverb phrase>.</sentence><set of sentences to be read continuously><sentence><noun phrase: coreference="a3"; relation="subject">The computers</noun phrase>were<adjective phrase: identifier="a87";relation="essential">crude</adjective phrase><adverb phrase>by<noun phrase><adverb phrase>today's</adverb phrase>standards</noun phrase></adverb phrase>,</sentence><sentence: identifier="a222" relation="example"><noun phrase: identifier="aonrs" relation="subject"><proper noun phrase: coreference="a2">Apple<noun: pronunciation="two">II</noun></proper noun phrase>owners</noun phrase> <adjective phrase: relation="underfined">,for exampe,</adverb phrase><verb: syntax= "parallel"><verb phrase>had to use<noun phrase: relation="object"><adverb phrase: coreference="aonrs">their</adverb phrase>television sets</noun phrase><adverb phrase>as screens</adverb phrase></verb phrase>and<verb phrase>stored<noun phrase: relation="object">data</noun phrase><adverb phrase: relation="indirect object"> on audiocassettes</adverb phrase></verb phrase></verb>.</sentence></set of sentences to be read continuously></document>

EXAMPLE 4

FIG. 24A

¥Com=Lang=JPN¥¥Pau=100¥¥Com=begin_s¥ [¥Pau=50¥¥
Com=begin_ph¥ 素敵にエイジング] ／8 ¥Pau=100¥¥
Com=begin_s¥¥Pau=50¥¥Com=begin_ph¥ ガン転移、抑えら
れる！？

FIG. 24B

¥Pau=500¥¥Com=begin_p¥¥Pau=100¥¥Com=begin_s¥¥Pau=50¥¥
Com=begin_ph¥ この転移、¥Pau=50¥¥Com=begin_ph¥ ガン細胞が増
えるだけでは発生しない。¥Pau=100¥¥Com=begin_s¥¥Pau=50¥¥
Com=begin_ph¥ がん細胞が ¥Pau=50¥¥Com=begin_ph¥ 細胞と ¥
Pau=50¥¥Com=begin_ph¥ 細胞の間にある ¥Pau=50¥¥
Com=begin_ph¥ 蛋白質などを溶かし、¥Pau=50¥¥Com=begin_ph¥ 自
分の進む道をつくって、¥Pau=50¥¥Com=begin_ph¥ 血管や ¥
Pau=50¥¥Com=begin_ph¥ りんぱかんに入り込む。¥Pau=100¥¥
Com=begin_s¥¥Pau=50¥¥Com=begin_ph¥ 循環しながら Pau=50¥¥
Com=begin_ph¥¥ 新たな"すみか"を探して潜り込む、といった ¥
Pau=50¥¥Com=begin_ph¥ 複雑な動きをすることが、¥Pau=50¥¥
Com=begin_ph¥ 近年解明されつつある。

FIG. 25

¥Com=Lang=ENG¥¥Pau=100¥¥=Com=begin_s¥¥Com=Vol=0¥¥Pau=50¥
¥Com=begin_ph¥During¥Pau=50¥¥Com=begin_ph¥its ¥Pau=50¥¥
Com=begin_ph¥centennial year, ¥Pau=50¥¥Com=begin_ph¥The
Wall Street Journal will report ¥Pau=50¥¥Com=begin_ph¥
events¥Pau=50¥¥Com=begin_ph¥of ¥Pau=50¥¥Com=begin_ph¥
the past century ¥Pau=50¥¥Com=begin_ph¥that stand ¥
Pau=50¥¥Com=begin_ph¥as ¥Pau=50¥¥Com=begin_ph¥
milestones ¥Pau=50¥¥Com=begin_ph¥of ¥Pau=50¥¥
Com=begin_ph¥American business history.
¥Pau=100¥¥Com=begin_s¥¥Com=Vol=80¥¥Pau=50¥¥
Com=begin_ph¥THREE COMPUTERS THAT CHANGED ¥Pau=50¥¥
Com=begin_ph¥the face ¥Pau=50¥¥Com=begin_ph¥ of ¥Pau=50¥¥
¥Com=begin_ph¥personal computing were launched ¥Pau=50¥
¥Com=begin_ph¥ in ¥Pau=50¥¥Com=begin_ph¥1977.
¥Pau=100¥¥Com=begin_s¥¥Com=Vol=80¥¥Pau=50¥¥
Com=begin_ph¥That year ¥Pau=50¥¥Com=begin_ph¥the ¥
Pau=50¥¥Com=begin_ph¥Apple ¥Pau=50¥¥Com=begin_ph two, ¥
Pau=50¥¥Com=begin_ph¥Commodore Pet and ¥Pau=50¥¥
Com=begin_ph¥Tandy TRS came ¥Pau=50¥¥Com=begin_ph¥to
market.
¥Pau=100¥¥Com=begin_s¥¥Com=Vol=80¥¥Pau=50¥¥
Com=begin_ph¥The computers were ¥Pau=50¥¥Com=begin_ph¥
crude ¥Pau=50¥¥Com=begin_ph¥by ¥Pau=50¥¥Com=begin_ph¥
today's standards. ¥Pau=100¥¥Com=begin_s¥¥Com=Vol=0¥¥
Pau=50¥¥Com=begin_ph¥Apple two owners ¥Pau=50¥¥
Com=begin_ph¥, for example, ¥Pau=50¥¥Com=begin_ph¥had to
use ¥Pau=50¥¥Com=begin_ph¥their television sets ¥
Pau=50¥¥Com=begin_ph¥as screens and ¥Pau=50¥¥
Com=begin_ph¥stored ¥Pau=50¥¥Com=begin_ph¥data ¥Pau=50¥
¥Com=begin_ph¥on audiocassettes.

10. Image-dominant pages

DOCUMENT PROCESSING APPARATUS HAVING AN AUTHORING CAPABILITY FOR DESCRIBING A DOCUMENT STRUCTURE

CROSS REFERENCE TO RELATED APPLICATIONS

The present application is a continuation of U.S. patent application Ser. No. 09/635,390 filed on Aug. 9, 2000, now U.S. Pat. No. 6,981,218 the disclosure of which is herein incorporated by reference.

BACKGROUND OF THE INVENTION

1. Field of the Invention

The present invention relates to a document data generating apparatus for generating/processing electronic document data.

2. Description of the Related Art

WWW (World Wide Web) is widely used to supply hypertext information via the Internet.

The WWW is a system that allows electronic document to be treated in a new manner, that is, generated, processed, disclosed, and used in common. However, from the point of view of practically using documents, the WWW has a limitation in the capability of processing documents. Thus, there is a need for a higher-level document processing technique such as categorization or summarization of documents. In order to realize such high-level document processing, it is necessary to automatically process the contents of documents.

However, such automatic processing of the contents of documents has difficulties as described below.

Firstly, the HTML (Electronic Markup Language) prescribes the manner of representing documents, but does not prescribe the contents of the documents. Secondly, it is not necessarily easy for users to understand the contents of documents that are linked to one another via a hypertext network. Thirdly, authors usually write documents without bearing in mind the convenience of readers, and no adjustment is made as to the difference in convenience between authors and readers.

Although the WWW is a new electronic documentation system having various advantages, the WWW is not capable of performing high-level document processing which needs additional automatic processing. In other words, in order to realize the high-level document processing, it is required to automatically process documents.

To the above end, systems for assisting in automatically processing a document has been developed on the basis of natural language processing technology. One such method is to automatically process a document according to tags which have been attached, by the author of the document or other person, to the document so as to represent attribute information about the internal structure of the document.

In recent years, computers have become increasingly popular, and many computers are connected to one another via a network. As a result, there occurs a need for a higher-level document processing technique to perform generation of a text document, labeling, and a modification of a text document, in accordance with an index depending upon the content of a document. More specifically, there is a need for a technique to summarize or categorize a document in response to a request issued by a user.

To the above end, document data or a document file supplied to a user should include information required to process the document data. Thus, there is a need for an authoring technique for generating document data including such information.

The authoring technique should be easily used not only by users having high-level knowledge but also general users who do not have high-level knowledge.

SUMMARY OF THE INVENTION

Thus, it is an object of the present invention to provide an apparatus and method for processing a document in a manner that satisfies the above-described requirements. According to an aspect of the present invention, to achieve the above object, there is provided a document processing apparatus comprising: automatic analysis means for automatically analyzing an electronic document and attaching structure information representing a document structure to the electronic document in accordance with the result of the automatic analysis; information presenting means for presenting information about the electronic document including the structure information so that a user may correct internal information associated with the electronic document on the basis of the information displayed on a display; and correction means for correcting the internal information associated with the electronic document in response to an operation performed by the user in accordance with the internal information displayed on the display.

In this document processing apparatus according to the present invention, the automatic analysis means preferably comprises morpheme dividing means for dividing the electronic document into morphemes and morphological information attaching means for attaching morphological information to each morpheme.

When candidates of internal information are attached by the automatic analysis means to an electronic document, the information presenting means may present information for prompting a user to select one of the candidates of internal information.

The candidates of internal information may represent different manners in which the electronic document is divided into morphemes.

The candidates of internal information may represent different document structures.

The candidates of internal information may represent different referential relations between portions of the electronic document.

The correction means may correct the internal information associated with the electronic document by adding, removing, or modifying internal information.

Preferably, the automatic analysis means automatically analyzes the document structure of the electronic document in the order from the lowest hierarchical level to the highest hierarchical level, and the correction means corrects the internal structure of the electronic document in the order from the lowest hierarchical level to the highest hierarchical level.

According to another aspect of the present invention, there is provided a document processing method comprising the steps of: attaching structure information representing a document structure to the electronic document by automatically analyzing the electronic document; presenting information about the electronic document including the structure information so that a user may correct internal information associated with the electronic document on the basis of the information displayed on a display; and correcting the internal information associated with the electronic document in response to an operation performed by the user in accordance with the internal information displayed on the display.

In this document processing method according to the present invention, the step of attaching structure information preferably includes the steps of dividing the electronic document into morphemes and attaching morphological information to the respective morphemes.

If candidates of internal information are attached in the step of attaching structure information, the step of presenting information may present information so as to prompt a user to select one of the internal information.

The candidates of internal information may represent different manners in which the electronic document is divided into morphemes.

The candidates of internal information may represent different document structures.

The candidates of internal information may represent different referential relations between portions of the electronic document.

The correction step may correct the internal information associated with the electronic document by adding, removing, or modifying internal information.

Preferably, the step of attaching structure information automatically analyses the electronic document as to the document structure in the order from the lowest level to the highest level of the hierarchy of the document structure, and the correction step corrects the internal structure of the electronic document in the order from the lowest level to the highest level of the hierarchy of the document structure.

According to still another aspect of the present invention, there is provided a storage medium including a computer-controllable program stored thereon, the program comprising the steps of: automatically analyzing an electronic document and attaching structure information representing a document structure to the electronic document in accordance with the result of the automatic analysis; presenting information about the electronic document including the structure information so that a user may correct internal information associated with the electronic document on the basis of the information displayed on a display; and correcting the internal information associated with the electronic document in response to an operation performed by the user in accordance with the internal information displayed on the display.

In this storage medium according to the present invention, the step of attaching structure information preferably includes the steps of dividing the electronic document into morphemes and attaching morphological information to the respective morphemes.

If candidates of internal information are attached in the step of attaching structure information, the step of presenting information may present information so as to prompt a user to select one of the candidates of internal information.

The candidates of internal information may represent different manners in which the electronic document is divided into morphemes.

The candidates of internal information may represent different document structures.

The candidates of internal information may represent different referential relations between portions of the electronic document.

The correction step may correct the internal information associated with the electronic document by adding, removing, or modifying internal information.

Preferably, the step of attaching structure information automatically analyses the electronic document as to the document structure in the order from the lowest level to the highest level of the hierarchy of the document structure.

According to still another aspect of the present invention, there is provided a signal carrying a computer-controllable program, the program comprising the steps of: automatically analyzing an electronic document and attaching structure information representing a document structure to the electronic document in accordance with the result of the automatic analysis; presenting information about the electronic document including the structure information so that a user may correct internal information associated with the electronic document on the basis of the information displayed on a display; and correcting the internal information associated with the electronic document in response to an operation performed by the user in accordance with the internal information displayed on the display.

In this signal according to the present invention, the step of attaching structure information preferably includes the steps of dividing the electronic document into morphemes and attaching morphological information to the respective morphemes.

If candidates of internal information are attached in the step of attaching structure information, the step of presenting information may present information so as to prompt a user to select one of the candidates of internal information.

The candidates of internal information may represent different manners in which the electronic document is divided into morphemes.

The candidates of internal information may represent different document structures.

The candidates of internal information may represent different referential relations between portions of the electronic document.

The correction step may correct the internal information associated with the electronic document by adding, removing, or modifying internal information.

Preferably, the step of attaching structure information automatically analyses the electronic document as to the document structure in the order from the lowest level to the highest level of the hierarchy of the document structure.

BRIEF DESCRIPTION OF THE DRAWINGS

FIG. 12 is a table illustrating a categorization model according to the embodiment of the invention;

FIG. 16 is a table illustrating word sense relevance values according to the embodiment of the invention;

FIG. 22 is a schematic diagram illustrating another example of a tag file according to the embodiment of the invention;

FIG. 23 is a schematic diagram illustrating another example of a tag file according to the embodiment of the invention;

FIG. 24 is a schematic diagram illustrating another example of a read-out file according to the embodiment of the invention;

FIG. 25 is a schematic diagram illustrating another example of a read-out file according to the embodiment of the invention;

DESCRIPTION OF THE PREFERRED EMBODIMENTS

The present invention is described in further detail below with reference to preferred embodiments, as to the following items.

Figure 1:
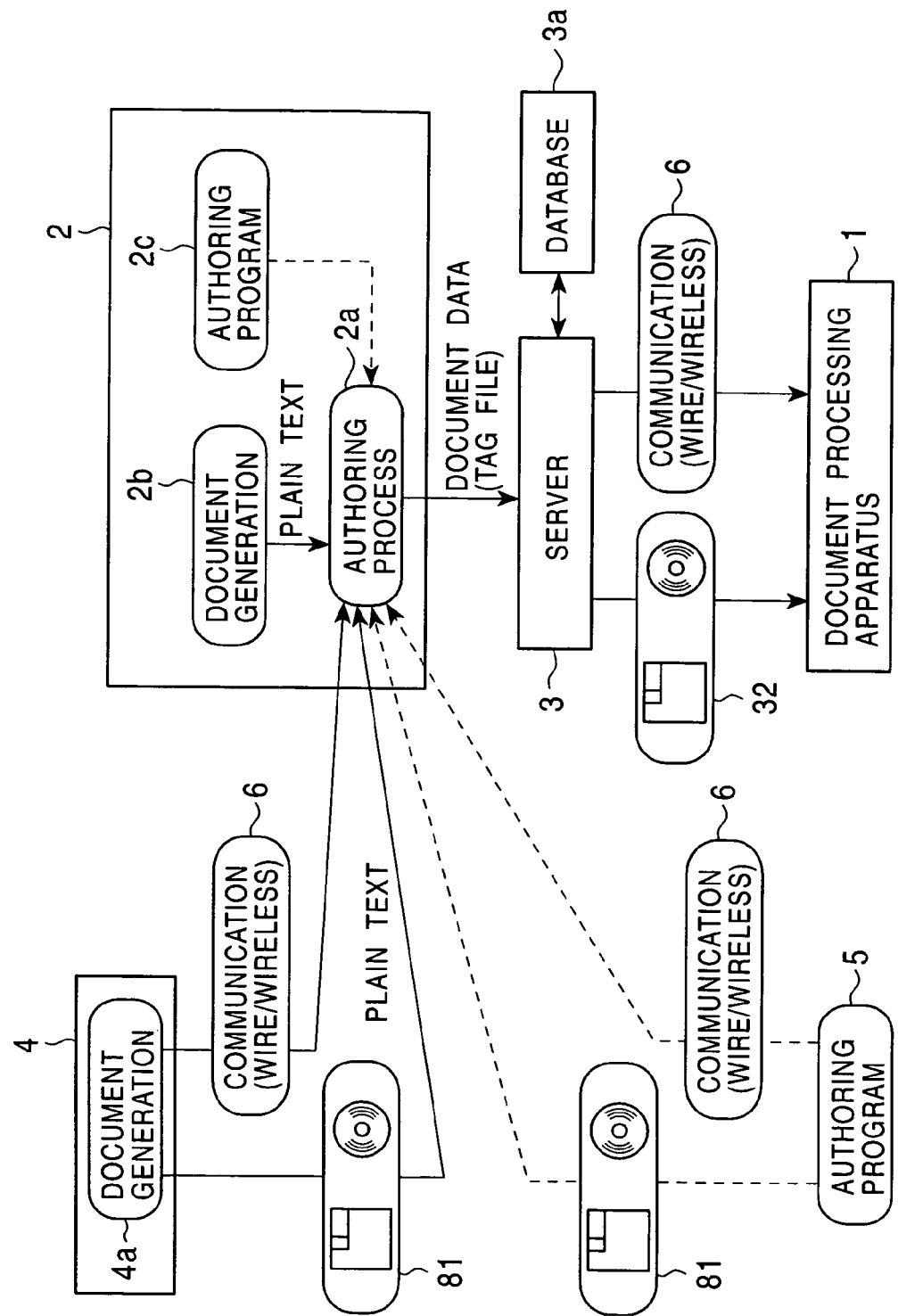
FIG. 1 is a block diagram illustrating an embodiment of a document data providing system according to the present invention.

First, the configuration of a document data providing system is described. After that, a document processing apparatus, that is included in the document data providing system and that receives document data, is described. The data structure of document data is then described. Thereafter, described is an embodiment of an authoring apparatus for generating document data to be supplied to the document processing apparatus according to the present invention. More specifically, the following items will be described:

1. Configuration of Document Data Providing System
2. Configuration of Document Processing Apparatus
3. Document Data Structure
4. Manual Categorization of Document Data
4.1 Procedure
4.2 Indexing
4.3 Browsing, Generation of Categories, and Categorization
4.4 Creation/Registration of the Categorization Model
5. Automatic Categorization of Document Data
5.1 Procedure
5.2 Automatic Categorization
6. Summarization 7. Reading Aloud Document 8. Configuration of Authoring Apparatus 9. Authoring Process 1. Configuration of Document Data Providing System FIG. 1 illustrates an example of the configuration of a document data providing system.

In the present embodiment, the document data providing system includes mainly a document processing apparatus 1, a server 3, an authoring apparatus 2, and a document provider 4.

The document provider 4 provides original text data (original document) including no tags that will be described later (hereinafter, such a text including no tags will be referred to as a plain text).

In the present embodiment, the document provider 4 has a document generator 4a for generating a plain text.

Note that the document provider 4 is not necessarily required to have the document generator 4a, and what is essential to the document provider 4 is to provide a plain text. Instead of generating a document, the document provider 4 may provide a plain text received from an external document producer.

The document provider 4 may store a plain text, to be provided, on a storage medium 81 such as a floppy disk or an optical disk whereby the plain text may be provided to the authoring apparatus 2 or other apparatus.

Alternatively, the document provider 4 may transmit a plain text to the authoring apparatus 2 via a cable communication medium (such as a public telephone line, a private communication line, or the Internet) or a wireless communication medium (such as a satellite communication line or a wireless telephone line).

The authoring apparatus 2 includes an authoring processor 2a, a document generator 2b, and an authoring program 2c. The hardware configuration of the authoring apparatus 2 and the operation thereof will be described later.

When the authoring apparatus 2 receives a plain text via the storage medium 81 or the communication line 6, the authoring apparatus 2 may perform an authoring process upon the received plain text thereby generating document data to be supplied to the document processing apparatus 1 serving as a user terminal that will be described later. Herein, the "document data" is generated by adding various tags as will be described later. Thus, such document data will also be referred to as a tag file.

The authoring processor 2a performs the authoring process in accordance with the authoring program 2c.

When the authoring apparatus 2 has the document generator 2b, the authoring apparatus 2 is capable of generating a plain text without necessarily having to receive a plain text from the document provider 4, and the authoring apparatus 2 is capable of performing an authoring process upon the generated plain text thereby generating document data (tag file).

The authoring program 2c may be stored in advance in an internal storage device (RAM, ROM, hard disk) in the authoring apparatus 2. Alternatively, an external authoring program 5 may be downloaded into the authoring apparatus 2 via the storage medium 81 or the communication line 6 so that the authoring processor 2a may operate in accordance with the downloaded authoring program 5.

The document data generated by the authoring apparatus 2 is supplied to the server 3 and stored in a database 3a.

Although not shown in FIG. 1, the supplying of document data from the authoring apparatus 2 to the server 3 may also be achieved using a storage medium or a communication line.

The server 3 supplies document data stored in the database 3a to an end user's apparatus such as the document processing apparatus 1 via a storage medium 32 such as a floppy disk or an optical disk or a communication line 6.

An end user may perform various processes upon received document data using the document processing apparatus 1 as will be described later thereby obtaining various high-level documents.

Note that FIG. 1 shows only one example of the system configuration, and a practical system may be configured in various manners.

For example, the system may include a large number of document providers 4, authoring apparatus 2, and servers 3. An authoring apparatus 2 may be disposed on the side of a document provider 4. Furthermore, a document provider 4, an authoring apparatus 2, and a server 3 may be combined into a single apparatus.

2. Configuration of Document Processing Apparatus

The document processing apparatus 1, that is included in the document data providing system and that processes received document data, is described in further detail below.

Figure 2:
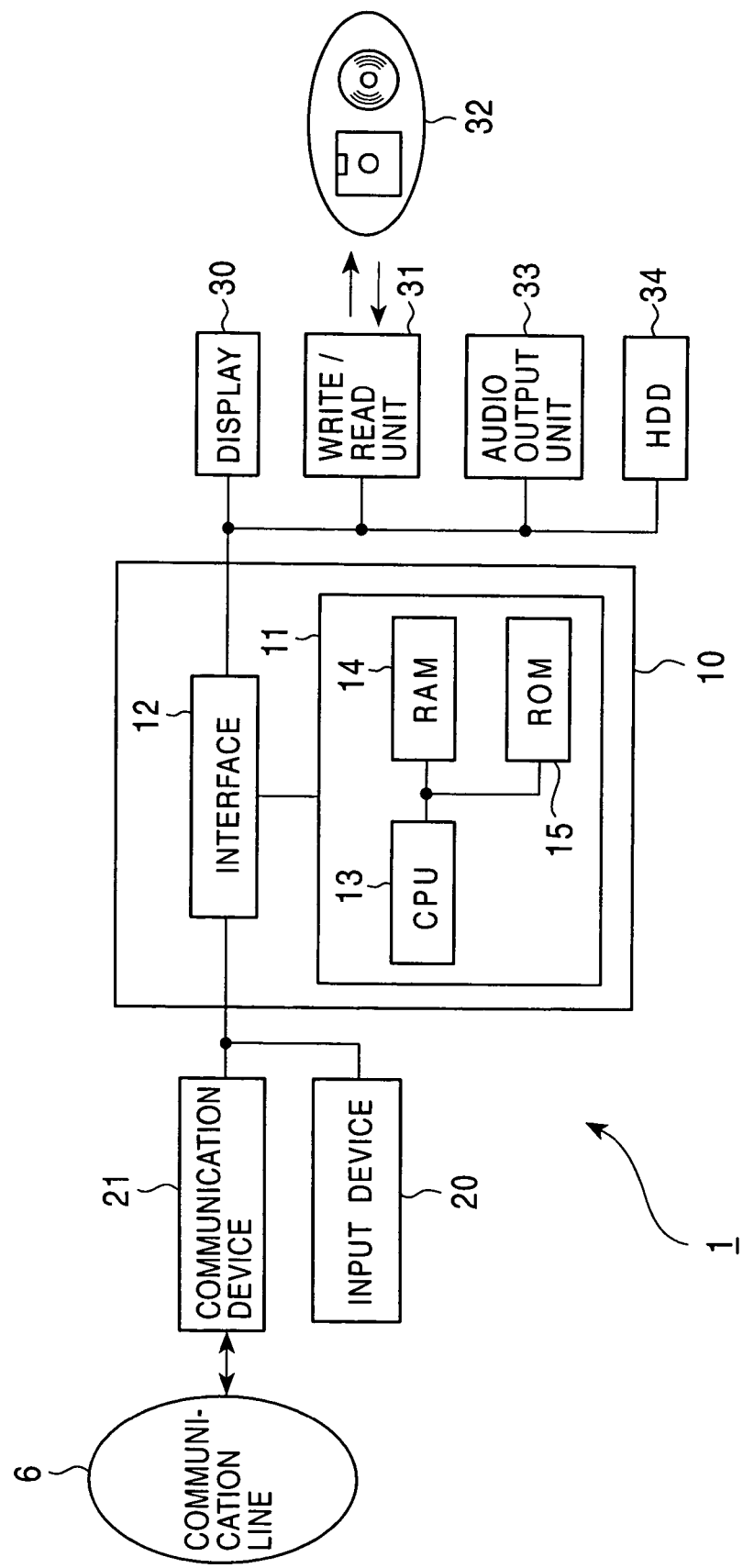
FIG. 2 is a block diagram illustrating an embodiment of a document processing apparatus according to the present invention.

As shown in FIG. 2, a document processing apparatus includes a main unit 10 including a controller 11 and an interface 12, an input unit 20 used by a user to input data or a command to the main unit 10, a communication device 21 for transmitting and receiving a signal to or from an external device, a display unit 30 for displaying an output from the main unit 10, a write/read unit 31 for writing and reading information onto and from a recording medium 32, an audio output unit 33, and an HDD (hard disk drive) 34.

The main unit 10 including the controller 11 and the interface 12 serves as the core of the document processing apparatus 1.

The controller 1 includes a CPU 13 for processing a document, a RAM 14 serving as a volatile memory, and a ROM 15 serving as a nonvolatile memory.

The CPU 13 executes a program in accordance with a procedure stored in the ROM 15 wherein the CPU 13 temporarily stores data in the RAM 14 if necessary.

Operations performed by the controller 11 include, as will be described in detail later, categorization of given document data, summarization, generation of a file used to output data by voice, and document analysis required in the above operations. Programs and application software required for the above operations are stored in the ROM 15 the HDD 34 or the storage medium 32.

As described above, the document processing program used by the controller 11 may be stored in advance in the ROM 15 or may be loaded from the storage medium 32 or the HDD 34. Alternatively, the document processing program may be downloaded from an external server via the communication device 21 (communication line 6) and a network such as the Internet.

The interface 12 is connected to the controller 11 the input unit 20 the communication device 21, the display 30 the write/read unit 31 the audio output unit 33 and the HDD 34.

Under the control of the controller 11, the interface 12 inputs data via the input unit 20, inputs and outputs data from and to the communication device 21, outputs data to the display 30, inputs and outputs data from and to the write/read unit 31, outputs data to the audio output unit 33, and inputs and outputs data from and to the HDD 34. In the above operation, the interface 12 adjusts timing of inputting or outputting data between various parts described above and also converts data format as required.

The input unit 20 is used by a user to input data or a command to the document processing apparatus 1. The input unit 20 may include a keyboard and a mouse. Using the input unit 20, the user may enter a keyword via the keyboard. The user may also select, using the mouse, an element of an electronic document displayed on the display 30.

Hereinafter, an electronic document handled by the document processing apparatus 1 is also referred to simply as a document. Furthermore, the term "element" is used to describe various elements of a document. Elements include a document itself, a sentence, and a word.

The communication device 21 serves to receive a signal that is transmitted by an external apparatus to the document processing apparatus 1 via a communication line 6. The communication device 21 also serves to transmit a signal over the communication line 6.

If the communication device 21 receives one or more document data from an external apparatus such as a server 3, the communication device 21 transfers the received document data to the main unit 10. The communication device 21 also transmits data to an external apparatus via the communication line 6.

The display 30 serves as an output device of the document processing apparatus 1, for displaying characters and/or image information. The display 30 may include a cathode ray tube (CRT) or a liquid crystal display (LCD). The display 30 may display one or more windows in which characters and/or graphic images are displayed.

The write/read unit 31 serves to write and read data to and from a storage medium 32 such as a floppy disk or an optical disk.

Although in the present embodiment, a floppy disk (magnetic disk) or an optical disk is employed as the storage medium 32, other types of removable storage media such as a magnetooptical disk, a memory card, and a magnetic tape may also be employed. As for the write/read unit 31, a device (such as a disk drive or a card drive) adapted to writing/reading data to and from an employed medium may be used.

In the case where a document processing program to be used to process a document is stored on the storage medium 32, the write/read unit 31 may read the document processing program from the storage medium 32 and transfer it to the controller 11.

When document data is stored on the storage medium 32, the write/read unit 31 may read such a data from the storage medium 32 and transfer it to the controller 11. This provides another way for the document processing apparatus 1 to acquire document data.

Furthermore, after processing document data by the document processing apparatus 1, the controller 11 may store the resultant document data on the storage medium 32 using the write/read unit 31.

The audio output unit 33 serves as an output device of the document processing apparatus 1, for providing a voice output corresponding to a document.

More specifically, the audio output unit 33 outputs a voice signal synthesized by the controller in accordance with document information (read-out file) that will be described later.

The HDD 34 serves as a mass storage device used by the document processing apparatus 1 to store a large amount of data. The HDD 34 writes and reads information under the control of the controller 11.

The HDD 34 is used to store various application programs such as a voice synthesis program executed by the controller 11. The HDD 34 may also be used to store document data input to the document processing apparatus 1.

3. Document Data Structure

The data structure of document data is described below. In the present embodiment, a document is processed in accordance with attribute information described by a tag attached to a document. Tags used in the present embodiment include a syntactic tag and a semantic/pragmatic tag wherein the syntactic tag indicates the structure of a document and the semantic/pragmatic tag makes it possible for a machine to understand the contents of documents written in various languages.

A syntactic tag may be used to described the internal structure of a document.

Figure 3:
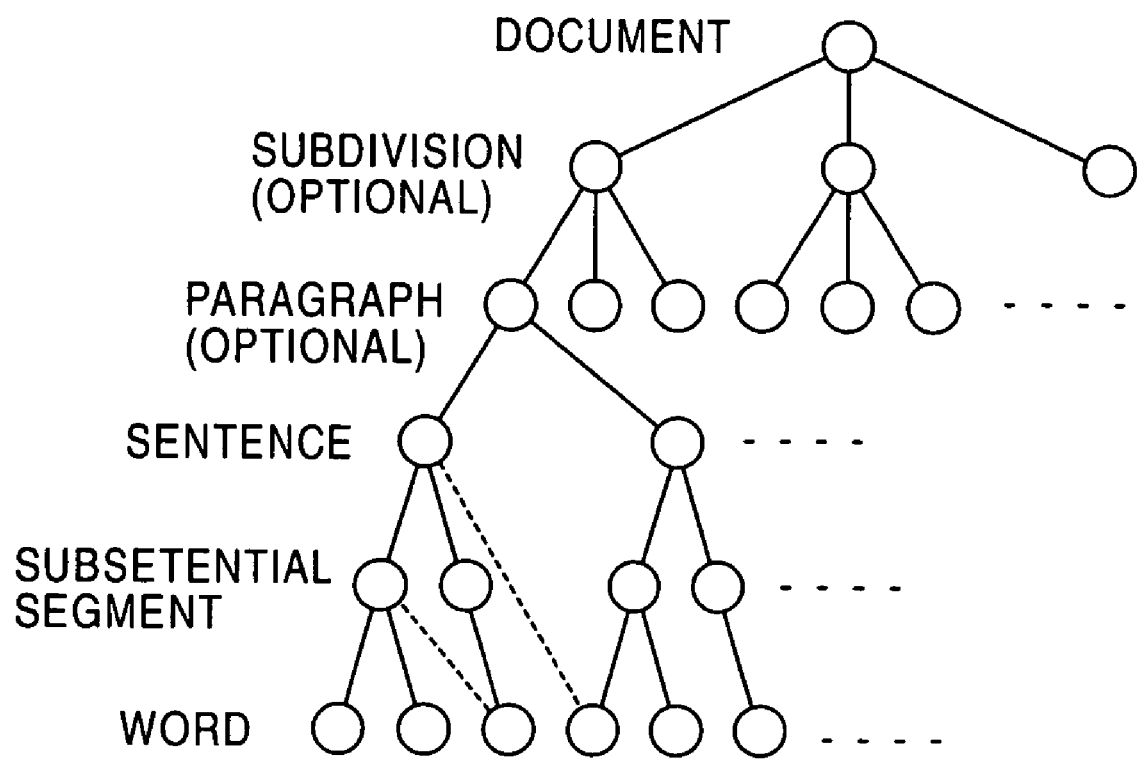
FIG. 3 is a schematic diagram illustrating a document structure employed in the embodiment of the invention.

The internal structure, to be represented by tags, includes elements such as a document, sentences, and words which are linked to one another by normal links or reference links, as shown in FIG. 3.

In FIG. 3, open circles represent elements. Open circles at the bottom represent elements in the lowest level in a document. Solid lines represent normal links indicating direct connections between elements such as sentences or words. Broken lines represent reference links indicating dependence between elements.

The internal structure of a document is composed of, in order from the highest level to the lowest level, a document, a subdivision, a paragraph, a sentence, a subsentential segment, . . . , and a word element, wherein the subdivision and the paragraph are optional.

Tags may also be used for the semantic purpose. For example, when a word has a plurality of senses (meanings), a tag may be used to specify a particular sense.

In the present embodiment, tagging is performed according to XML (Extensible Markup Language) similar to HTML (Hyper Text Markup Language).

Some examples of tagging are described below. In these examples, tags are described within brackets < >. Note that tagging is not limited to those examples but tagging may be performed in many different ways. Two specific examples of documents including tags are shown below, where one of the example is written in English and the other is written in Japanese. Note that internal structures of documents written in other languages can also be described using tags.

When a sentence "Time flies like an arrow." is given, tagging may be performed as follows.

<sentence><noun phrase: word sense="time0">time</noun phrase><verb phrase><verb: word sense="fly1">flies</verb><adverb phrase><adverb: word sense=like0>like</adverb><noun phrase>an<noun: word sense="arrow0">arrow</noun></noun phrase></adverb phrase></verb phrase>.</sentence>

In the above example, <sentence>, <noun>, <noun phrase>, <verb>, <verb phrase>, <adverb>, and <adverb phrase> are used to indicate a sentence, a noun, a noun phrase, a verb, a verb phrase, an adjective/adverb (including preposition and postposition phrases), and an adjective/adverb phrase, respectively. That is, the syntactic structure of the sentence is described by those tags.

A start tag is placed immediately before an element and a corresponding end tag is placed immediately after that element. Herein, end tags placed immediately after the respective elements include a symbol "/" to indicate that the tags are end tags. The term "element" is used herein to describe a syntactic element such as a phrase, a paragraph, or a sentence.

The expression, word sense="time0", indicates that word "time" is used herein to describe the 0th sense of a plurality of senses of word "time". More specifically, although "time" has senses as a noun, an adjective, and a verb, "time" is used herein as a noun (first sense). Similarly, word "orange" has three senses, namely, the name of a plant, one of colors, and one of fruits, which can be distinguished from each other by specifying a word sense.

Figure 4:
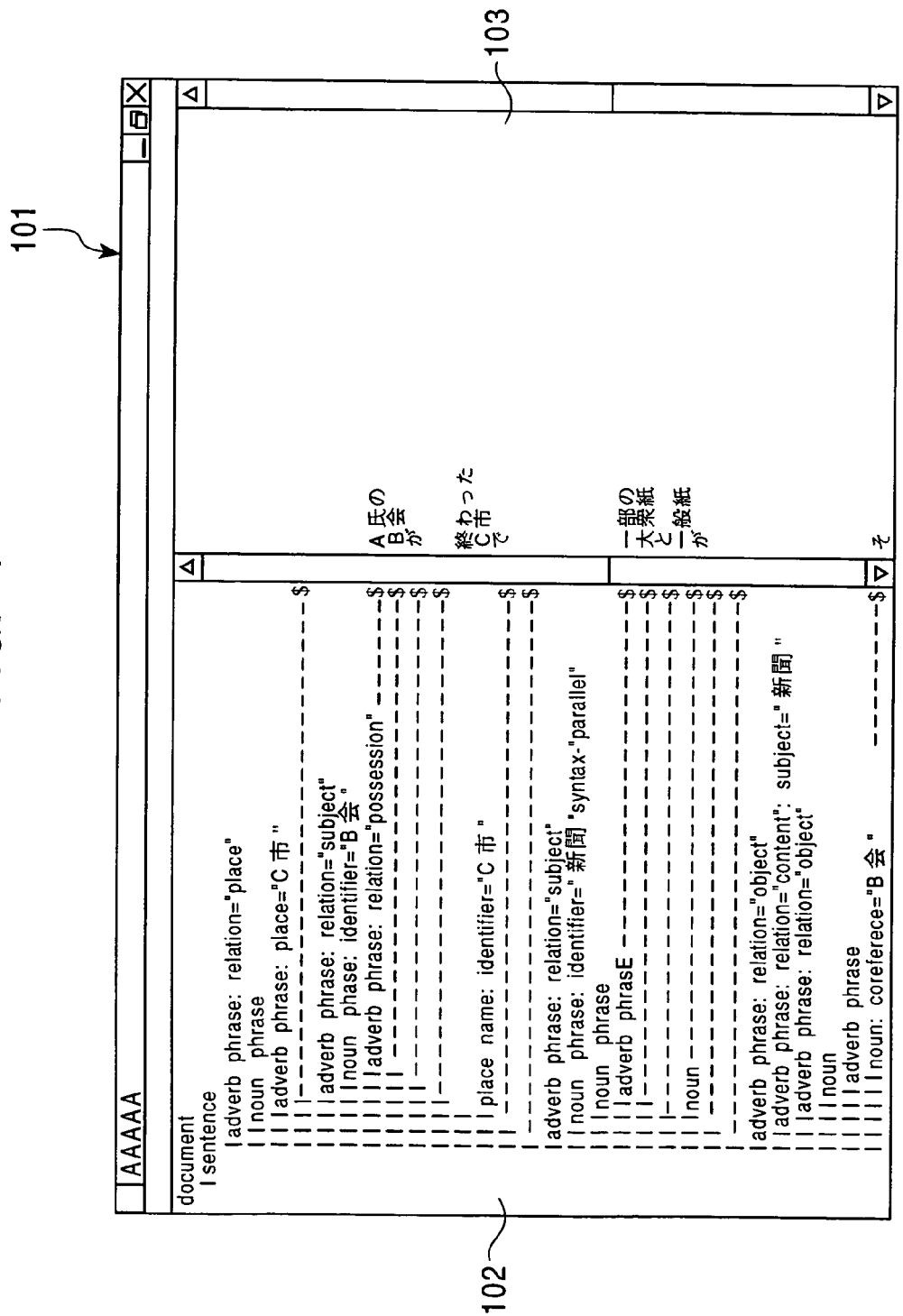
FIG. 4 is a schematic diagram illustrating a window for displaying a sentence structure according to the embodiment of the invention.

In the present embodiment, the syntactic structure of document data may be displayed in a window 101 on the display 30, as shown in FIG. 4. In the window 101, word elements are displayed in a subwindow 103 on the right side, and the internal structure of a sentence is displayed in a subwindow on the left side.

In this specific example in FIG. 3, a part of a sentence "A氏のB会が終わったC市で、一般紙がその写真報道を自主規制する方針を紙面で明らかにした。" (convention B was held in C City under the leadership of Mr. A. Some of newspaper companies, including usual and popular newspaper companies, have announced, on their papers that they will restrict themselves in terms of insertion of photographs of Mr. A.) is shown in the window 101. This document may be tagged, for example, as follows.

```
<document><sentence><ladverb phrase: relation =
"place"><noun phrase><adverb phrase: place = "C市
"><document><sentence><adverb phrase: relation =
"place"><noun phrase><adverb phrase: place = "C市"><adverb
phrase: relation = "subject"> <noun phrase: identifier ="B
会"><adverb phrase: relation = "position"><person name:
identifier = "A氏">A氏</ person name></adverb
phrase><organization name: identifier ="B会">B会
</organization name></noun phrase>が</adverb phrase>終 わ つ た
</adverb phrase><place name: identifier = "C市">C市</place
name></noun phrase>で</adverb phrase><adverb phrase:
relation = "subject"><noun phrase: identifier ="press";
syntax= "parallel"><noun phrase><adverb phrase>部の</adverb
phrase>大衆紙</noun phrase>と<noun>般紙</noun></noun phrase>
が</adverb phrase><adverb phrase: relation =
"object"><adverb phrase: relation = "content"; subject =
"press"><adverb phrase: relation = "object"><noun
phrase><adverb phrase><noun: coreference ="B会">そ</noun>の
</adverb phrase>写真報道</noun phrase>を</adverb phrase>自主規
制する</adverb phrase>方針を</adverb phrase><adverb phrase:
relation = "location">紙面で</adverb phrase>明らかにした。
</sentence></document>
```

As can be seen, the structure of the document is described by pairs of tags <*> and </*>.

For example, a pair of tags <document> and </document> indicates the range of a document, and a pair of tags <sentence> and </sentence> indicates the range of a sentence. A pair of tag <noun phrase: identifier="B会"> and </noun phrase> is used to describe a noun phrase "A氏のB会" with an identifier "B会".

Thus, the internal structure of the sentence is described by tags as shown in the subwindow on the left side of FIG. 4.

In the above sentence, syntax="parallel" indicates that "一部の大衆紙" and "一般紙" are parallel in relation. Herein, "parallel" elements are such elements having the same dependency. When no particular dependency is specified, "<noun phrase: relation=x><noun>A</noun><noun>B</noun></noun phrase>" indicates that A depends on B. Expression, relation=x, indicates a relational attribute.

A relational attribute describes a relation between elements in terms of syntax, meaning, and rhetoric. More specifically, a relation attribute describes a grammatical function such as a subject, an object, and an indirect object, a theme/role such as an acting person, a person receiving an action, and a beneficiary, and a rhetorical relation such as a reason and a result. In the present example, relatively simple syntactic functions such as a subject, object, and indirect object are described by relational attributes.

Furthermore, in the present example, the attributes of proper nouns such as "A氏", "B会", and "C市" ("Mr. A", "Convention B", "City C") are described by tags <place name>, <person name>, and <organization name>. By attaching a tag <place name>, <person name>, or <organization name>, it is possible to indicate that a tagged word is a proper noun.

4. Manual Categorization of Document Data 4.1 Procedure

In the document processing apparatus 1 of the present embodiment, when document data is input from the outside via the communication device 21 (or via the write/read unit 31), the document data is categorized in accordance with the content thereof. Although in the following description, document data is assumed to be input from the outside via the communication device 21, the categorization may also be performed in a similar manner when document data is input from a removable medium such as a floppy disk via the write/read unit 31.

In general, categorization is performed either in a manual fashion by a user in accordance with the content of given document data or in an automatic fashion by the document processing apparatus 1.

Categorization is performed on the basis of a categorization model that will be described later. In the initial state, the document processing apparatus 1 has no categorization model. Therefore, when the document processing apparatus 1 is in the initial state, it is required to manually generate a categorization model and perform categorization. If a categorization model has been generated, it becomes possible to automatically categorize given document data.

First, the manual categorization process to be performed initially is described. That is, when the document processing apparatus in the initial state receives document data from the outside, the manual categorization process is performed by the controller 11 in accordance with an operation performed by a user so as to generate a categorization model and categorize the document data.

The outline of the manual categorization process is first described with reference to FIG. 5, and then each step of the process is described in further detail.

Figure 5:
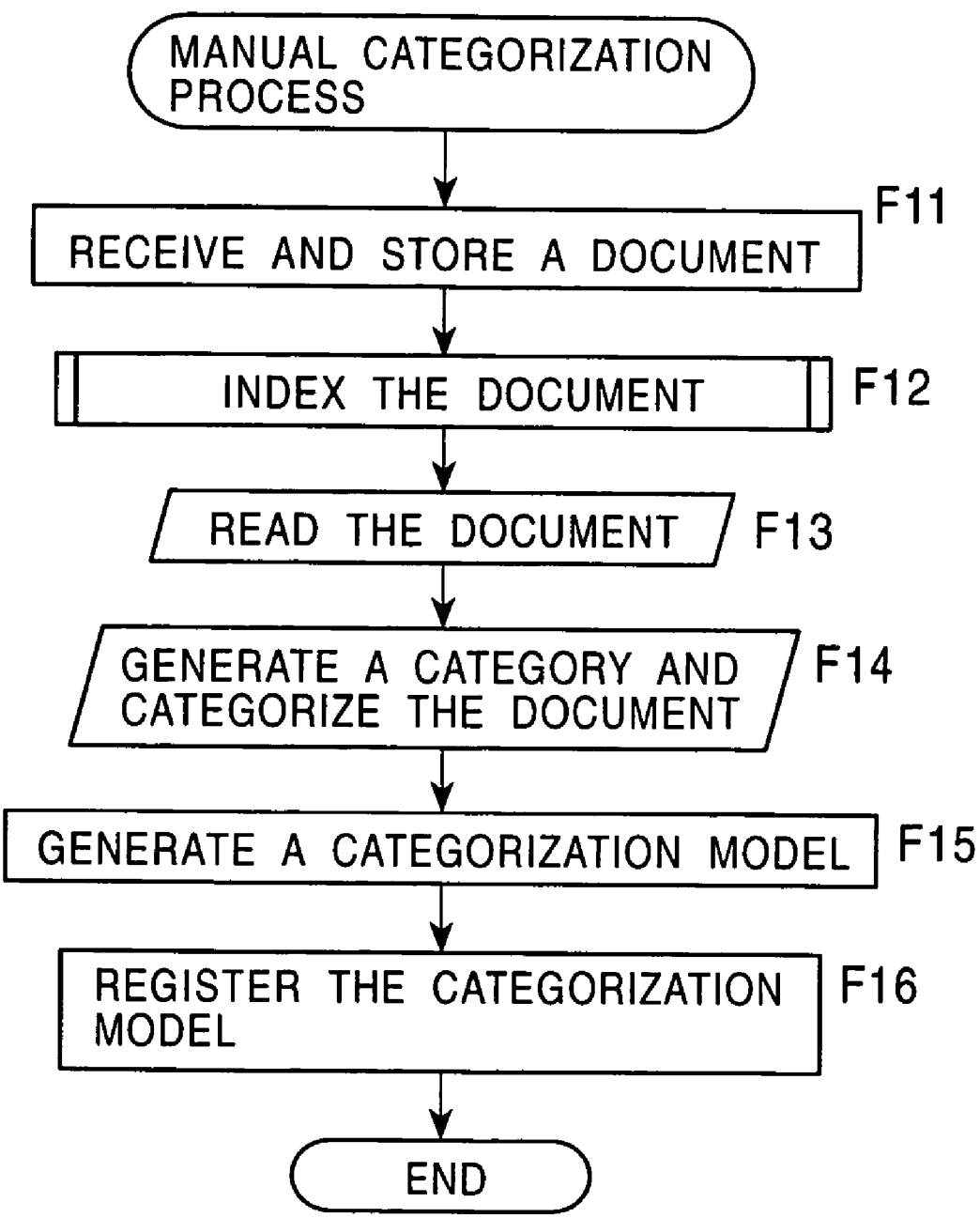
FIG. 5 is a flow chart illustrating a manual categorization process according to the embodiment of the invention.

In step F11 in FIG. 5, the receiver 21 of the document processing apparatus 1 receives a document. In this step F11, the receiver 21 receives one or more documents via, for example, a communication line. The received one or more documents are transferred to the main unit 10 of the document processing apparatus 1. The controller 11 stores the one or more documents into RAM 14 or the HDD 34.

In step F12, the controller 11 of the document processing apparatus 1 extracts words characterizing the plurality of documents received via the receiver 21 and generates an index for each document. The controller 11 stores the generated index 11 in the RAM 14 or the HDD 34.

As will be described later, the index of each document includes a proper noun and/or other words that characterize the document. Therefore, categorization or retrieval can be performed using an index.

In step F13, a user reads a document as required. In this step, the document processing apparatus 1 performs an operation in response to a command issued by the user. The next step F14 is also performed in response to an operation of the user.

The document data input to the document processing apparatus 1 is displayed on the screen of the display 30 in response to a command issued by the user so that the user can read it.

When the user reads a document, the user may issue various commands by clicking an icon or the like on the screen so as to perform various processes such as summarization that will be described later. When the user reads a document in the manual categorization process, step F14 is performed to generate categories and categorize the document.

In step F14, the controller 11 generates and displays categories in accordance with an operation performed by the user. The user then specifies a category for each document data. In response, the controller 11 categorizes and displays document data.

In step F15, the controller 11 generates a categorization model on the basis of categories generated by the user in step F14 and also on the basis of categorization performed by the user for each document data.

The categorization model includes data that represents correspondence between categories and elements of indexes (generated in step F12) of respective documents. That is, the categorization model represents how documents are categorized.

In step F16, the resultant categorization model is registered. The registration is performed by the controller 11 by storing the categorization model in the RAM 14.

By performing the process shown in FIG. 5 in the above-described manner, one or more document data input to the document processing apparatus 1 in the initial state are manually categorized, and a categorization model is generated.

The respective steps in the process shown in FIG. 5 are described in further detail below.

4.2 Indexing

In step F14, the controller 11 generates an index for each document data input.

A specific example of an index generated for certain document data is shown below.

```
<index: date = "AAAA/BB/CC"; time = "DD:EE:FF";
document address = "1234">
    <user's operation history: maximum summary size =
"100">
        <selection: number of elements = "10">PictureTel</選択
></selection>
    </user's operation history>
    <summary>Primary Minister X did not tell a specific
amount of tax reduction, in a press conference.</summary>
    <word: word sense = "0003"; central activation value =
"140.6">not tell</word>
    <word: word sense = "0105"; identifier "X"; central
activation value = "67.2">Prime Minister</word>
    <person name: identifier "X"; word: word sense =
"6103"; central activation value = "150.2">Prime Minister
X</word></word /person name>
    <word: word sense = "5301"; central activation value =
```

-continued

```
"120.6">ask</word>
    <word: word sense = "2350"; identifier "X"; central
activation value = "31.4">Prime Minister</word>
    <word: word sense = "9582"; central activation value =
"182.3">emphasize</word>
    <word: word sense = "2595"; central activation value =
"93.6">tell</word>
    <word: word sense = "9472"; central activation value =
"12.0">noticed</word>
    <word: word sense = "4934"; central activation value =
"46.7">did not tell</word>
    <word: word sense = "0178"; central activation value =
"175.7">excuse</word>
    <word: word sense = "7248"; identifier = "X"; central
activation value = "130.6">I</word>
    <word: word sense = "3684"; identifier = "X"; central
activation value = "121.9">Prime Minister</word>
    <word: word sense = "1824"; central activation value =
"144.4">appeal</word>
    <word: word sense = "7289"; central activation value =
"176.8">show</word>
    </index>
```

In the above example, <index> and </index> indicate the start and end positions, respectively, of the index. <date> and <time> indicate the date and the time, respectively, at which the index was generated. <summary> and </summary> indicate the start and the end, respectively, of the summary.

<word> and </word> indicate the start and end of a word.

word sense="0003" indicates the third word sense of a word. The other tags are used in a similar manner. As described earlier, in order to distinguish a plurality of word senses of a word, numbers are assigned in advance to the respective word senses, and a particular word sense is specified by the number assigned to that word sense.

<user's operation history> and </user's operation history> indicate the start and end of a user's operation history. <selection> and </selection> indicate the start and end of a selected element. maximum summary size="100" indicates that the maximum summary size is set to 100 characters. number of elements="10" indicates that the number of selected elements is 10.

As can be seen from the above example, the index of a document includes one or more proper nouns and/or word senses that characterize the document.

Figure 6:
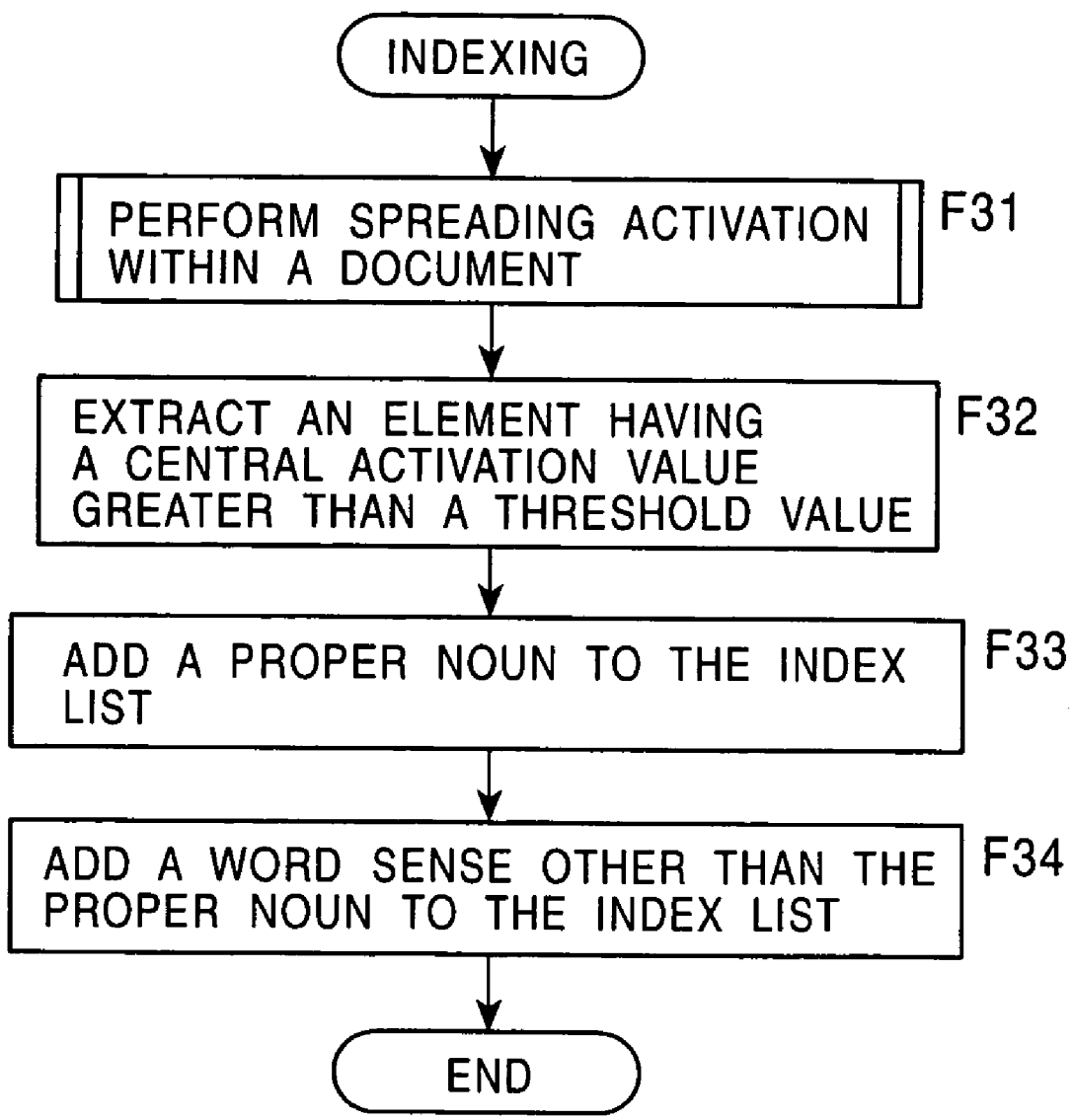
FIG. 6 is a flow chart illustrating an indexing process according to the embodiment of the invention.

The indexing process in step F12 is described in further detail below with reference to FIGS. 6 to 9. Note that FIG. 6 illustrates the indexing process for one document data. When indexing is performed for a plurality of document data, it is required to perform the process shown in FIG. 6 for each document data.

Figure 8:
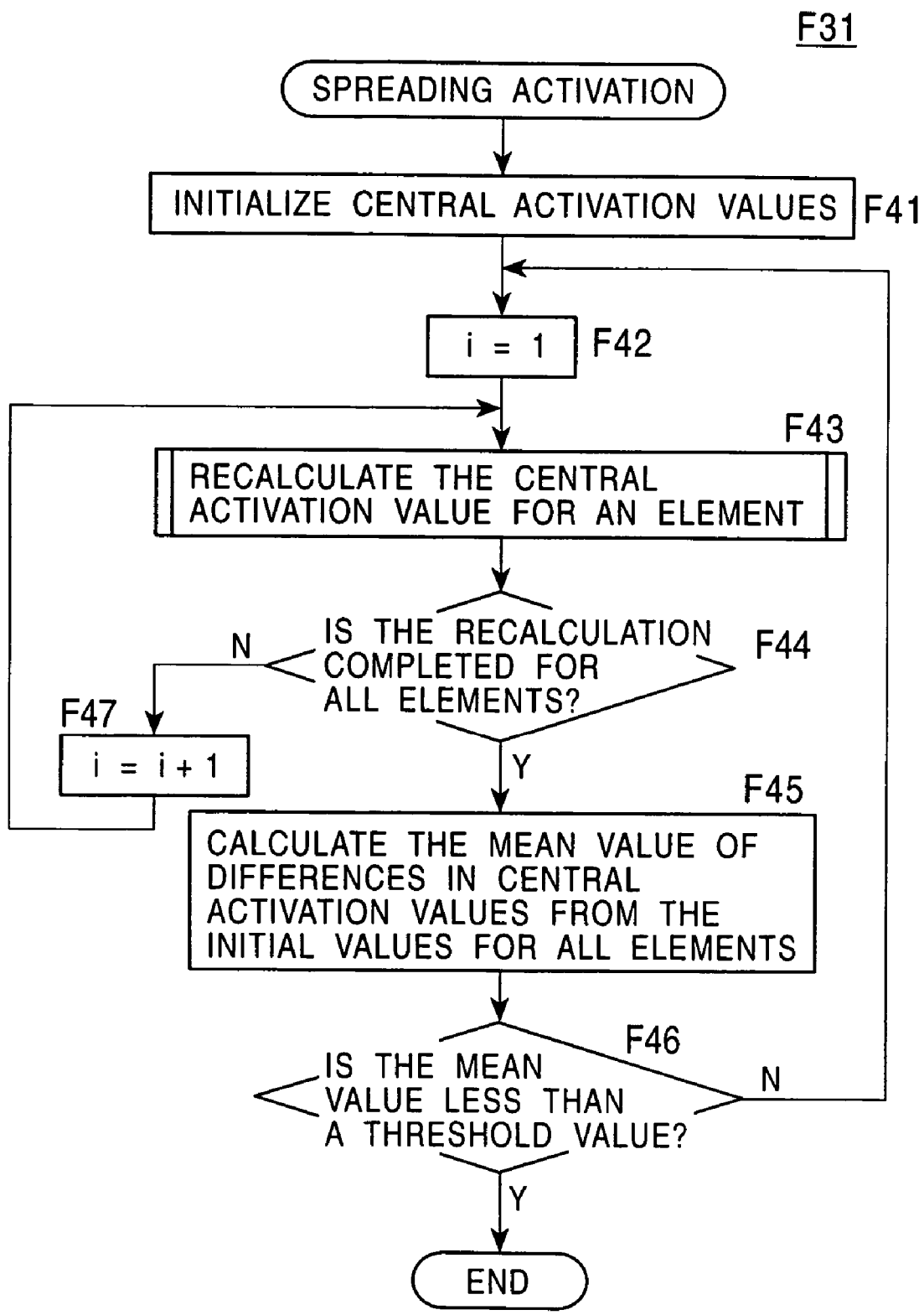
FIG. 8 is a flow chart illustrating an activation value spreading process according to the embodiment of the invention.
Figure 9:
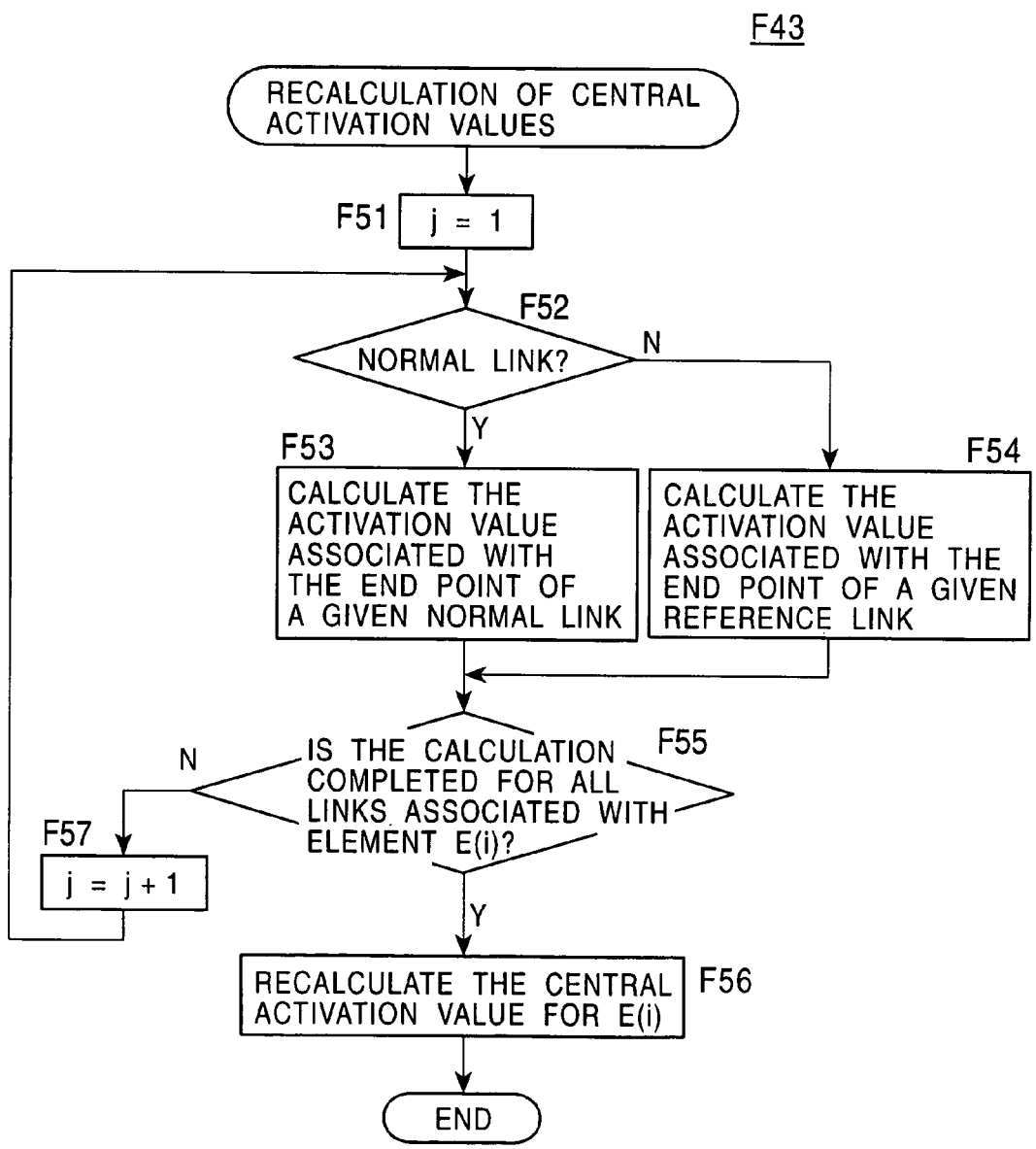
FIG. 9 is a flow chart illustrating a process of updating an activation value according to the embodiment of the invention.

FIG. 8 illustrates the details of step F31 shown in FIG. 6, and the details of step F43 are shown in FIG. 9.

In the indexing process shown in FIG. 5, spreading of activation values is first performed in step F31 in FIG. 6.

The spreading of activation values is a process in which the central activation values associated with elements in document data are spread depending on the internal structure of a document such that high central activation values are given to elements having significant relations with elements having high central activation values.

More specifically, initial central activation values are first given to the respective elements of a document, and the central activation values are then spread depending upon the internal structure, that is, the link structure, of the document.

The central activation values are determined depending upon the internal structure represented by tags, and they can be used to extract distinctive words characterizing the document.

The controller 11 performs the spreading of activation values in step F31 and stores the resultant central activation values associated with the respective elements into the RAM 14.

The spreading of activation values in step F31 is described in further detail below with reference to FIGS. 7 to 9.

Figure 7:
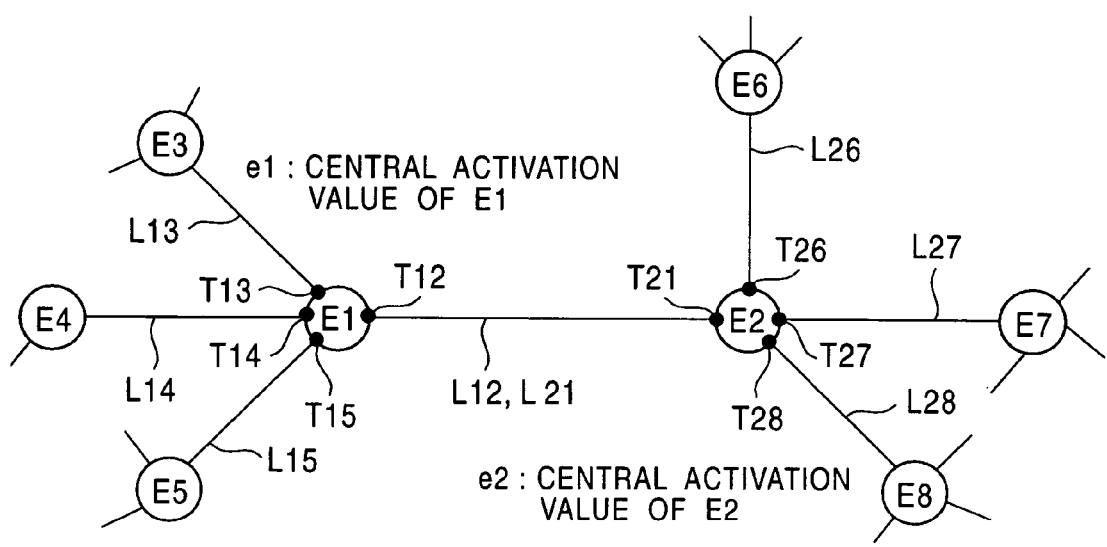
FIG. 7 is a schematic diagram illustrating activation values of elements used in the embodiment of the invention.

FIG. 7 illustrates an example of a link structure associated with some elements.

Note that FIG. 7 does not illustrate all elements of a document and the entire link structure associated therewith but illustrates a part of the link structure in the vicinity of elements E1 and E2. Of elements E1-E8 shown in FIG. 7, E1 and E2 are taken as examples in the following description.

Herein, we assume that the element E1 has a central activation value equal to e1 and the element E2 has a central activation value equal to e2.

These two elements E1 and E2 are connected to each other by a link L12 (normal link or reference link).

The link L12 has an end point T12 connected with the element E1 and also has an end point T21 connected with the element E2.

The element E1 is also connected with elements E3, E4, and E5, via links L13, L14, and L15, respectively. The links L13, L14, and L15 have end points T13, T14, and T15, respectively, connected with the element E1.

Similarly, the element E2 is also connected with elements E6, E7, and E8, via links L26, L27, and L28, respectively. The links L26, L27, and L28 have end points T26, T27, and T28, respectively, connected with the element E2.

The spreading of activation values over such a link structure is described below with reference to FIGS. 8 and 9.

In step F41 in FIG. 8, before starting the spreading of activation values associated with the document data, an index of which is to be produced, initial central activation values are defined for all elements included in the document.

The initial central activation values are determined such that, for example, a proper noun and other elements selected by a user have high values.

The controller 11 sets to zero the end-point activation values of end points T(xx) of reference links and those of normal links via which elements are connected to one another. The controller 11 stores the resultant initial end-point activation values in the RAM 14.

In step F42, the controller 11 initializes a counter for counting the number of elements Ei of the document. More specifically, the controller 11 sets the counter value i of the element counter to 1. When i=1, the counter points to a first element (for example, element E1 in FIG. 8).

In step F43, the controller 11 recalculates the central activation value for an element pointed to by the counter.

By way of example, the recalculation of the central activation value for the element E1 is described in detail with reference to FIG. 9.

In the recalculation of the central activation value, end-point activation values of the element are first recalculated, and a new central activation value is determined using the current central activation value and the recalculated end-point activation values.

In step F51 in FIG. 9, the controller 11 initializes the counter for counting the number of links connected at one end thereof with an element Ei (E1 in this specific example) of a document. More specifically, the controller 11 sets the counter value j of the link counter to 1. When j=1, the link counter points to a first link L(yy) connected with an element Ei. In the specific example shown in FIG. 7, a link L12 is pointed to as a first link associated with the element E1.

In step F52, the controller 11 determines, by referring to a relational attribute tag, whether or not the link pointed to by the link counter, that is, the link L12 between elements E1 and E2, is a normal link. If the link L12 is a normal link, the controller 11 advances the process to step F53. However, the controller 11 advances the process to step F54 if the link L12 is a reference link.

In the case where the link L12 is a normal link and thus the process goes to step F53, the controller 11 calculates a new end-point activation value for the end point T12 at which the element E1 is connected to the normal link L12.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12 and then dividing the resultant sum by the total number of elements included in the document.

The controller 11 determines the new end-point activation value of the end point connected the normal link by performing the above-described calculation using end-point activation values and the central activation value read from the RAM 14. The determined end-point activation value is stored in the RAM 14. Thus, the end-point activation value t12 for the end point T12 is updated.

On the other hand, in the case where it is determined in step F52 that the link L12 is a reference link and thus the process goes to step F54, the controller 11 calculates a new end-point activation value of the end point T12 at which the element E1 is connected to the link L12. In this case, the calculation is performed as follows.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12. (In this case, unlike the calculation for normal links, the resultant sum is not divided.)

The controller 11 determines the new end-point activation value of the end point connected the reference link by performing the above-described calculation using end-point activation values and the central activation value read from the RAM 14. The determined end-point activation value is stored in the RAM 14. Thus, the end-point activation value t12 for the end point T12 is updated.

After performing step F53 or F54, the controller 11 determines, in step F55, whether to go to step F57. That is, the process goes to step F57 if it is determined in step F55 that the calculation is not completed for all links. In step F55, the counter value j is incremented, and the process returns to step F52.

Thus, the counter value becomes j=2, and the counter points to the second link (for example, L13) connected to the element E1. The end-point activation value t13 of the end point T13 at which the element E1 is connected to the link L13 is calculated, in a similar manner as described above, by performing step F52 and the following steps.

In step F55, the controller 11 determines whether the new end-point activation value has been calculated for all links connected to an element Ei (E1 in this specific example) pointed to by the current counter value i, and the controller 11 performs the calculation until the new end-point activation value has been determined for all end points of the current element Ei.

That is, the above-process is performed repeatedly while incrementing the counter value j in step F57 thereby determining new end-point activation values t12, t13, t14, and t15 of end points T12, T13, T14, and T15 of the element E1. When all end-point activation values have been determined, the process goes from step F55 to F56.

In step F56, the new central activation value ei for the element Ei is determined using the new end-point activation values determined in the above process.

The new central activation value ei is determined by adding the sum of new end-point activation values of the element Ei to the current central activation value ei of the element Ei. For example, in the case of the element E1 shown in FIG. 7, the new central activation value e1 is given by $$e1(\text{new}) = e1 + t12 + t13 + t14 + t15$$

After determining the central activation value ei of the element Ei pointed to by the current counter value i, the controller 11 stores the resultant central activation value ei in the RAM 14. Thus, the central activation value ei of the element Ei is updated. (The old central activation value is further held for use in step F45 that will be described later.)

After updating the central activation values in step F43 shown in FIG. 8 in the manner described above with reference to FIG. 9, the controller 11 advances the process to step F44 shown in FIG. 8. In step F44, the controller 11 determines whether the central activation values have been updated for all elements of the document. More specifically, the controller 11 determines whether the counter value i has become equal to the total number of elements included in the document.

If the updating of the central activation value is not completed for all elements, the controller 11 advances the process to step F47. In step F47, the controller 11 increments the counter value i and returns the process to step F43.

For example, at the time when the process for the element E1 is completed, the counter value i is incremented to i=2 so as to point to the element E2.

Thus, step F43 (that is, the process shown in FIG. 9) is repeated to calculate the central activation value for the element E2.

Although a further detailed description is not given herein because step F43 is performed in a similar manner, the end-point activation values t21, t26, t27, and t28 of the end points T21, T26, T27, and T28 of the element E2 are updated, and then the new central activation value e2 is determined in accordance with the following equation:

$$e2(\text{new}) = e2 + t21 + t26 + t27 + t28$$

In the process shown in FIG. 8, step F43 is performed repeatedly to calculate the central activation value while incrementing the counter value i in step F47 so as to change the element pointed to by the counter value, until the central activation value has been updated for all elements included in the document.

When the updating of the central activation value is completed for all elements included in the document, the process goes from step F44 to F45.

In step F45, the controller 11 calculates the mean value of variations in the central activation value of all elements contained in the document. That is, the mean value of differences between the new and old central activation values of all elements is calculated.

More specifically, the controller 11 reads from the RAM 14 the old central activation values and the updated new central activation values for all elements. The controller 11 then calculates the differences between the new and old central activation values and divides the sum of differences by the total number of elements thereby determining the mean value of variations in central activation values of all elements.

The controller 11 then stores into the RAM 14 the mean value of the variations in the central activation values of all elements.

In the following step F46, the controller 11 determines whether the mean value calculated in step F45 is less than a predetermined threshold value.

If the mean value is less than the threshold value, the controller 11 terminates the process of spreading activation values. However, when the mean value is not less than the threshold value, the process returns to step F42 to repeat the above-described process.

As a result of spreading activation values, the central activation values of elements related to elements having high central activation values become high.

However, if the spreading of activation values is performed only once, there is a possibility that the central activation value of an element, which should be increased to achieve the purpose of the indexing process, is not increased to a sufficiently high level. More specifically, although the central activation values of elements directly linked to an element having a high initial central activation value are increased to sufficiently high levels by one execution of the activation spreading process, the central activation values of elements that are not directly linked to an element having a high initial value are not increased to sufficiently high levels even when those elements are important to create the index.

To avoid the above problem, the spreading of activation values is performed as many times as required to satisfy the condition in step F46. That is, the spreading of activation values is performed repeatedly until the central activation values for all elements have substantially converged, thereby ensuring that the central activation values of all important elements are increased.

The central activation values of all elements can converge via the iterations of spreading activation values, because the central activation values of the respective elements are updated using central activation values calculated in the previous iteration. However, if the number of iterations is too great, the calculations are continued uselessly after the central activation values for all elements have converged.

To avoid the above problem, the mean value of variations in the central activation values between two successive iterations is calculated in step F45, and it is determined in step F46 whether the mean value have fallen within a predetermined small range. Thus, the calculation is terminated when the central activation values have substantially converged.

After completion of the spreading of activation values in FIGS. 8 and 9 (step F31 in FIG. 6), the controller 11 advances the process to step F32 shown in FIG. 6.

In step F32, the controller 11 evaluates the central activation values determined in step F31 for the respective elements and extracts elements having central activation values greater than a predetermined threshold value. The controller 11 stores the extracted elements in the RAM 14.

In the next step F33, the controller 11 reads the extracted elements from the RAM 14. The controller 11 then extracts all proper nouns included in the extracted elements and adds the extracted proper nouns to the index. Proper nouns have no word sense and they are not described in a dictionary. Thus, proper nouns are handled separately from the other words. Herein, as described earlier, a "word sense" refers to a particular meaning of a word having a plurality of meanings.

It is possible to determine whether each element is a proper noun, by checking an associated tag described in a document. For example, in the internal structure represented by tags as shown in FIG. 3, relational attributes represented by tags indicate that "A氏", "B会", and "C市" (("Mr. A", "Convention B", "City C") are "person name", "organization name", and "place name", respectively, and thus they are proper nouns. The controller 11 adds the extracted proper nouns to the index and stores the result in RAM 14.

In the next step F34, the controller 11 extracts, from the elements extracted in step F32, word senses other than the proper nouns and adds the extracted word senses to the index. The result is stored in the RAM 14.

By performing the above process, an index such as that described above with reference to the specific example is obtained. That is, words characterizing a document including tags are detected, and an index is generated by listing the detected words. The significance of words included in a document is evaluated on the basis of the central activation values determined by means of spreading activation values depending upon the internal structure of the document.

Because indexes generated in the above-described manner include word senses and proper nouns that characterize documents, indexes can be used to retrieve a desired document.

In addition to the word senses and the proper nouns that characterize the document, the index also includes the document address representing the storage location of the RAM 14 (or the HDD 34) where the document is stored.

4.3 Browsing, Generation of Categories, and Categorization

The process of generating the index described above with reference to FIGS. 6 to 9 is performed in step F12 shown in FIG. 5. When the manual categorization process shown in FIG. 5 is performed, after the completion of generating the index, a user reads a document and manually categorizing the document, in steps F13 and F14.

In step F13 in FIG. 5, as described earlier, the user can read a document displayed on the display 30.

In step F14, the user generates categories and categorizes document data into categories generated.

The operations in steps F13 and F14 and other related operations performed by the controller 11 are described below with reference to specific examples.

Figure 10:
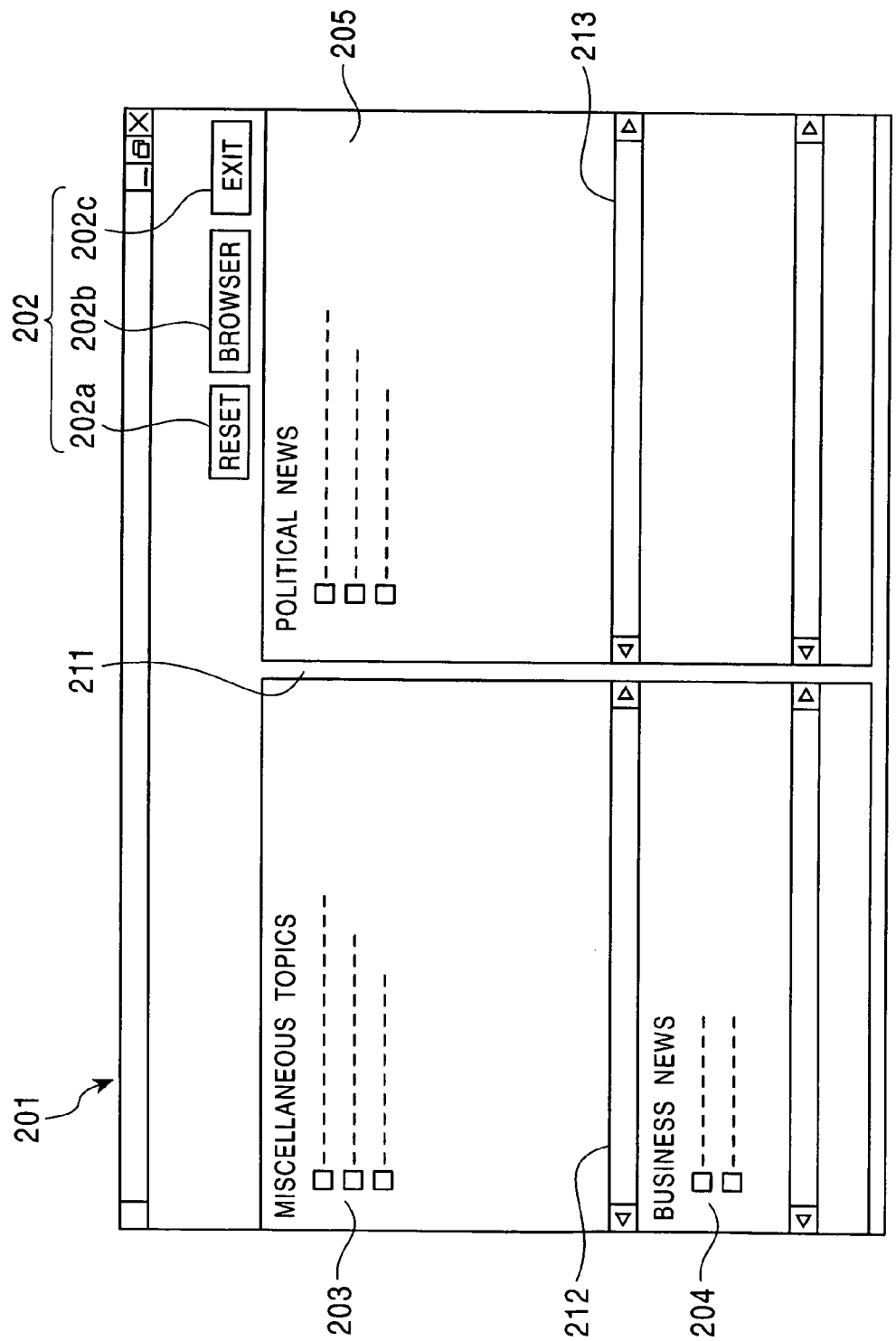
FIG. 10 is a schematic diagram illustrating a categorization window according to the embodiment of the invention.
Figure 11:
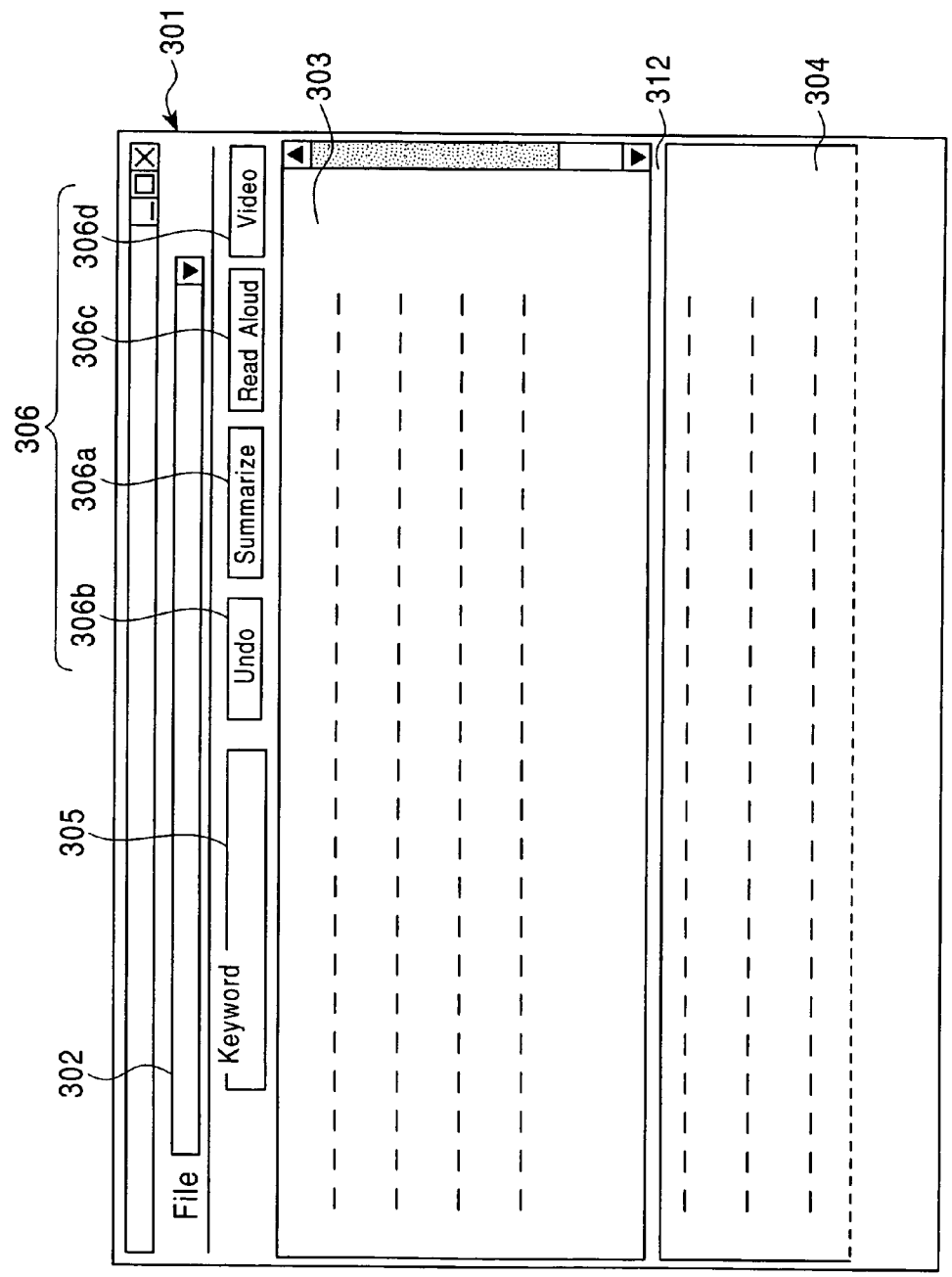
FIG. 11 is a schematic diagram illustrating a browser window according to the embodiment of the invention.

FIGS. 10 and 11 illustrate specific examples of documents displayed on the display 30.

FIG. 10 shows a document categorization window 201 used to categorize documents in accordance with a categorization model that will be described in detail later. In this specific example, the document categorization window 201 serves as a graphic user interface (GUI) for categorization of documents.

The document categorization window 201 includes operation control buttons 202 such as a position reset button 202a used to reset the window into an initial state, a browser button 202b used to browse documents, and an exit button 202c used to exit from the window 201.

The document categorization window 201 includes subwindows serving as document category displaying areas 203, 204, 205, etc., corresponding to categories based on the categorization model.

The document category displaying area 203 is used to display miscellaneous topics. That is, documents that have not been categorized yet are indicated in the document category displaying area 203. For example, documents that are received in step F11 in FIG. 5 (and that are to be categorized) are indicated in the document category displaying area 203 entitled "miscellaneous topics".

On the other hand, the document category displaying area 204 is used to indicate documents categorized in, for example, "business news".

The document category displaying area 205 is used to indicate documents categorized in, for example, "political news".

The other document category displaying areas having no reference numerals in FIG. 10 may also be used to indicate documents categorized in particular categories.

When documents are categorized in particular categories, document icons and document titles of documents are displayed in corresponding document category displaying areas 203, 204, etc. When a document has no title, a sentence representing the summary of the document is displayed.

The size of each document category displaying area 203, 204, etc., is not fixed. That is, the size of each document category display area can be changed to a desired size by moving the subwindow frames 211, 212, 213, etc., by means of dragging or the like. The number of document category displaying areas can be changed by a user to an arbitrary value.

The title (such as "Political News") of each document category displaying area 203, 204, etc., may be arbitrarily set and changed by a user.

The number of document category displaying areas and the titles thereof correspond to the number of categories and categories, respectively, defined in the categorization model that will be descried later. That is, the number of categories and the titles of the categories of the categorization model are set when a user sets the document category displaying areas or the title thereof in the categorization window 201 by using the mouse or the keyboard of the input unit 20.

FIG. 11 illustrates an example of a browser window 301 used by a user to browse documents.

For example, if a user clicks the browser button 202b in the categorization window 201 after selecting a document by clicking the corresponding icon or the like in the categorization window 201 shown in FIG. 10, then the controller 11 opens the browser window 301 as shown in FIG. 11 and displays the selected document therein.

The browser window 301 includes a file name displaying area 302 for displaying the file name of a selected document data file, a document displaying area 303 for displaying document data corresponding to the file name displayed in the file name displaying area 302, a summary displaying area 304 for displaying a summary of the document displayed in the document displaying area 303, and a keyword displaying area 305 used to input and display a keyword. Furthermore, the browser window 301 includes operation control buttons 306 such as a Summarize button 306a used to start summarization, an undo button 306b used to cancel an operation, and a read-out button 306c used to execute a read-aloud operation.

In the browser window 301, a user can read a document displayed in the document displaying area 303. When the entire document is not displayed at a time in the document displaying area 303, a part of the document is displayed. In this case, the use can read the entire document by scrolling the document.

If the user clicks the Summarize button 306a, a summary of the document displayed in the document displaying area 303 is generated and displayed in the summary displaying area 304.

The operation performed by the controller 11 to generate a summary text will be described later.

On the other hand, if the user clicks the read-out button 306c, the document displayed in the document displaying area 303 or the summary thereof is read aloud.

The process of reading-aloud a document will be described later.

The categorization window 201 and the browser window 301 are displayed on the display 30 not only during the manual categorization process shown in FIG. 5 but also during other processes in response to a request issued by the user. For example, in the manual categorization process shown in FIG. 5, information about the types and the contents of received documents are displayed in the categorization window 201 or the browser window 301, and thus the user can acquire such information via the categorization window 201 or the browser window 301.

More specifically, if one or more documents are received in step F11 shown in FIG. 5, an index is generated in step F12 for the received documents. After that, the titles of the received documents are displayed in the document category displaying area 203 entitled "Miscellaneous Topics" in the categorization window 201 shown in FIG. 10.

Using the categorization window 201, the user manually categorizes the documents displayed in the document category displaying area 203. If the user cannot guess the content of a document from the title thereof, the user may display the document in the browser window 301 shown in FIG. 11 and read the content thereof. That is, in step F13 shown in FIG. 5, the user reads a document if reading is required for the above purpose.

In step F14, using the categorization window 201, the user may add, update, and delete a category, as required. In response to an operation performed by the user, the controller 11 changes the manner in which the document category displaying areas 203, 204, etc., are displayed (that is, the number, the size, and the title of document category displaying areas are modified).

If the user creates or modifies a category (the title of a document category displaying area), the creation or modification is reflected in the categorization model that will be described later.

After creating a category as required, the user categorize the respective documents displayed in the document category displaying area 203 into proper categories corresponding to document category displaying areas. Thus, documents are manually categorized by the user.

More specifically, the user drags, using the mouse of the input unit 20, the icons of documents displayed in the document category displaying area 203 entitled "Miscellaneous Topics" into document category displaying areas corresponding to desired categories.

For example, the user may create a document category displaying area entitled "Sports" and may drag the icon of a document on a sport displayed in the document category displaying area entitled "Miscellaneous Topics" into the document category displaying area entitled "Sports".

After being dragged, the icons and the titles of the respective documents are displayed in document category displaying areas into which the documents have been dragged.

4.4 Creation/Registration of the Categorization Model

In step F15 shown in FIG. 5, after completion of the manual categorization, the controller 11 creates a categorization model including a plurality of categories on the basis of the categorization that has been manually performed by the user. More specifically, the controller 11 creates a categorization model by gathering indexes of a plurality of documents categorized into categories. After that, the controller 11 categorizes the plurality of documents into corresponding categories defined in the categorization model.

The categorization model consists of a plurality of categories in which documents are categorized, and the categorization model represents the correspondence between each category and documents.

As described above, an index is generated for each document in step F12. The categorization model has a data structure in which the indexes of the respective documents are related to the corresponding categories in which the documents are categorized. An example of such a categorization model is shown in FIG. 12A.

In the example shown in FIG. 12A, the categorization model includes categories "sport", "company", "computer", etc., which have been created by the user using the categorization window 201. Note that the categorization model may include a category that is not given by a user but that has been predefined. A document category displaying area corresponding to such a predefined category may also be displayed in the categorization window.

In the categorization model, correspondence between each category and indexes IDX1, IDX2, . . . is described. That is, the indexes of the respective documents are related to the corresponding categories in which the documents are categorized.

The indexes related to the respective categories are the same as those of documents displayed in the document category displaying areas corresponding to the respective categories in the categorization window 201.

For example, index IDX1 is related to category "sport" because a user has created a document category displaying area entitled "sport" in the categorization window 201 and dragged the icons of a document having index IDX1 into the document category displaying area entitled "sport".

As described earlier, each index includes one or more proper nouns and word senses other than the proper nouns, and also includes a document address.

As shown in FIG. 12A, one or more indexes are related to each category. Because each index includes one or more proper nouns and word senses other than the proper nouns and also includes a document address, the categorization model may also be represented as shown in FIG. 12B.

In the example shown in FIG. 12B, the categorization model has index fields for describing proper nouns, word senses other than proper nouns, and document addresses.

In this categorization model, proper nouns "Mr. A", etc., are related to category "sport". Similarly, proper noun "Mr. B", etc., are related to "company", C Company", "G Company", etc., to "computer", "D species", etc., to "plant", "Mr. E", etc., to "art", and "Mr. F", etc., to "event".

Similarly, word senses such as "base ball (4546)", "grand (2343)", "labor (3112)", "employment (9821)", "mobile (2102)", "cherry-1 (11111)", "orange-1 (9911)", "cherry-2 (11112)", "orange-2 (9912)", and "cherry-3 (11113)" are related to the corresponding categories.

Furthermore, document addresses such as "SP1", "SP2", "SP3", . . . , "S01", "S02", "S03", . . . , "C01", "C02", "C03", . . . . , "PL1", "PL2", "PL3", . . . , "AR1", "AR2", "AR3", . . . , and "EV1", EV2", "EV3", . . . are also related to the corresponding categories.

Herein, "cherry-1", "cherry-2", and "cherry-3" represent the first word sense (11111), the second word sense (11112), and the third second word sense (11113), respectively, of "cherry". Similarly, "orange-1", and "orange-2" represent the first word sense (9911) and the second word sense (9912), respectively, of "orange". More specifically, for example, "orange-1" represents an orange that is one of plants, and "orange-2" represents an orange color.

For general nouns other than proper nouns, not words but word senses are used because a word can have a plurality of meanings.

In step F15 shown in FIG. 5, a categorization model is generated in the above-described manner on the basis of manual categorization performed by a user. In the next step F16, the generated categorization model is registered, that is, stored in the RAM 14 (or the HDD 34).

Thus, by generating and registering the categorization model, documents are categorized.

After generating and registering the categorization model steps F15 and F16 shown in FIG. 5, the categorization model is updated via an automatic categorization process that will be described later, or via a modification of a category or a further manual categorization process performed by a user.

If the categorization model is updated, the date and time of update is written in the categorization model. In the example shown in FIG. 12, the date and time of update is written as "1998:12:10:19:56:10".

5. Automatic Categorization of Document Data

5.1 Procedure

In the document processing apparatus 1 according to the present embodiment, once a categorization model is generated, it becomes possible to perform an automatic categorization process to automatically categorize document data input from the outside via the communication device 21 or the like.

That is, when the document processing apparatus 1 receives document data from the outside, the automatic categorization process is performed to categorize the received document data, as is described in detail below.

In the following description, it is assumed that the automatic categorization process is performed each time one document is received. However, the automatic categorization process may be performed each time a predetermined number of documents have been received. Alternatively, the automatic categorization process may be performed when the window shown in FIG. 9 is opened. In this case, the automatic categorization process may be performed for all documents that have been received at that time.

Figure 13:
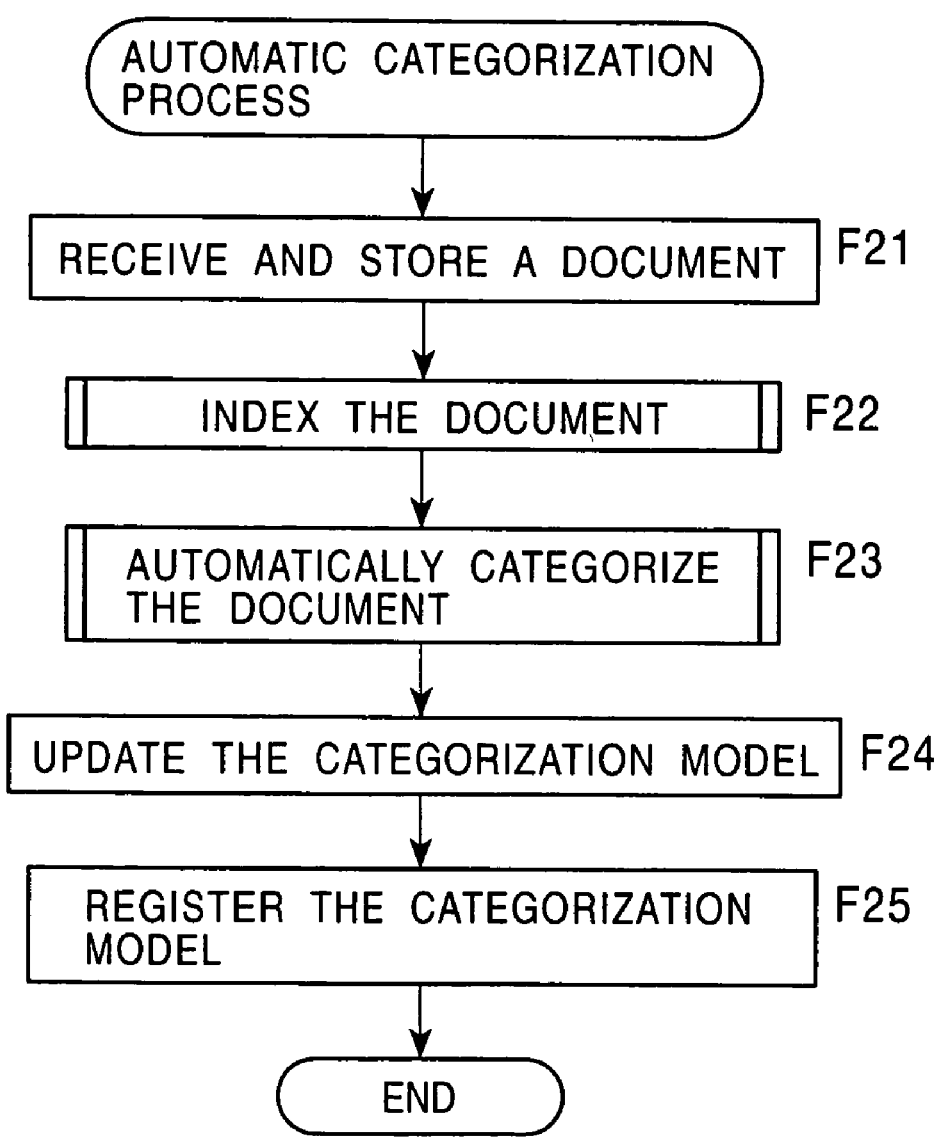
FIG. 13 is a flow chart illustrating an automatic categorization process according to the embodiment of the invention.

The outline of the automatic categorization process is shown in FIG. 13.

In step F21 in FIG. 13, the receiver 21 of the document processing apparatus 1 receives a document. In this step F21, the receiver 21 receives one or more documents via, for example, a communication line. The received one or more documents are transferred to the main unit 10 of the document processing apparatus 1. The controller 11 stores the one or more documents into RAM 14 or the HDD 34.

In the next step F22, the controller 11 generates an index for each document data received in step F21.

In step F23, the controller 11 automatically categorizes each document with an index into one of categories of the categorization model. The controller 11 stores the categorization result in the RAM 14. Each step in the automatic categorization process will be described in further detail later.

In step F24, the controller 11 updates the categorization model on the basis of the result of automatic categorization performed upon the new document in step F23.

In step F25, the controller 11 registers the resultant categorization model updated in step F24, by storing it in the RAM 14.

Thus, by performing the process shown in FIG. 13 in the above-described manner, the document data input to the document processing apparatus 1 is automatically categorized in accordance with the categorization model.

That is, in the automatic categorization process, an index is first generated for a received document, and then the document is automatically categorized. Furthermore, proper nouns, word senses, and the document address described in the index are related to a category on the categorization model as shown in FIG. 12 (thereby updating the categorization model).

Steps F21 and F22 are performed in a similar manner to steps F11 and F12 in the manual categorization process described above. That is, the indexing process in step F22 is performed in a similar manner as described above with reference to FIGS. 6 to 9, and thus it is not described in further detail herein.

In step F24, the categorization model is updated on the basis of the result of the automatic categorization performed in step F23.

The automatic categorization in step F23 is performed in a different manner from the manual categorization process, as will be described below.

5.2 Automatic Categorization

Figure 14:
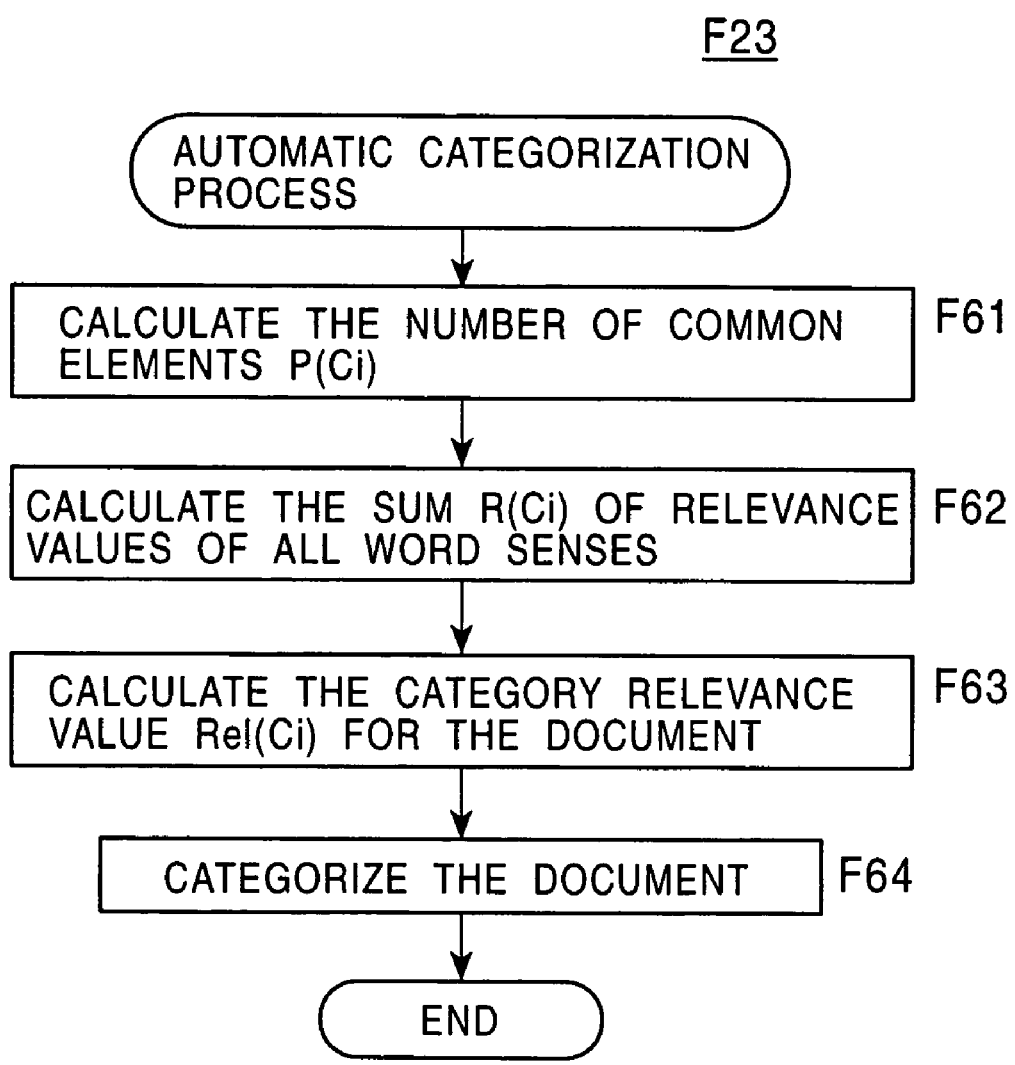
FIG. 14 is a flow chart illustrating an automatic categorization step according to the embodiment of the invention.

FIG. 14 illustrates details of the automatic categorization process in step F23 shown in FIG. 13.

In step F61 in FIG. 14, the controller 11 determines the number $P(C_i)$ of proper nouns that are included in both the set of proper nouns belonging to the category $C_i$ defined in the categorization model and the set of words extracted from the document received in step F21 and employed as elements of the index of the document. The controller 11 stores the calculated number $P(C_i)$ into the RAM 14.

In step F62, the controller 11 determines the word sense relevance values between all word senses included in the index of the document and all word senses included in each category $C_i$ by referring to a word sense relevance table in FIG. 16 that will be described later. The controller 11 then calculates the sum $R(C_i)$ of the word sense relevance values.

That is, the controller calculates the sum $R(C_i)$ of word sense relevance values for words on the categorization model other than proper nouns. The controller 11 stores the calculated sum of word sense relevance values into the RAM 14.

The word sense relevance value is described below.

The word sense relevance value is calculated in advance for each word sense contained in an electronic dictionary provided in the document processing apparatus 1, and the calculated word sense relevance values are stored as shown in FIG. 16. That is, if the controller 11 performs the process shown in FIG. 15 once, the obtained relevance values can be used in the automatic categorization process shown in FIG. 14.

Figure 15:
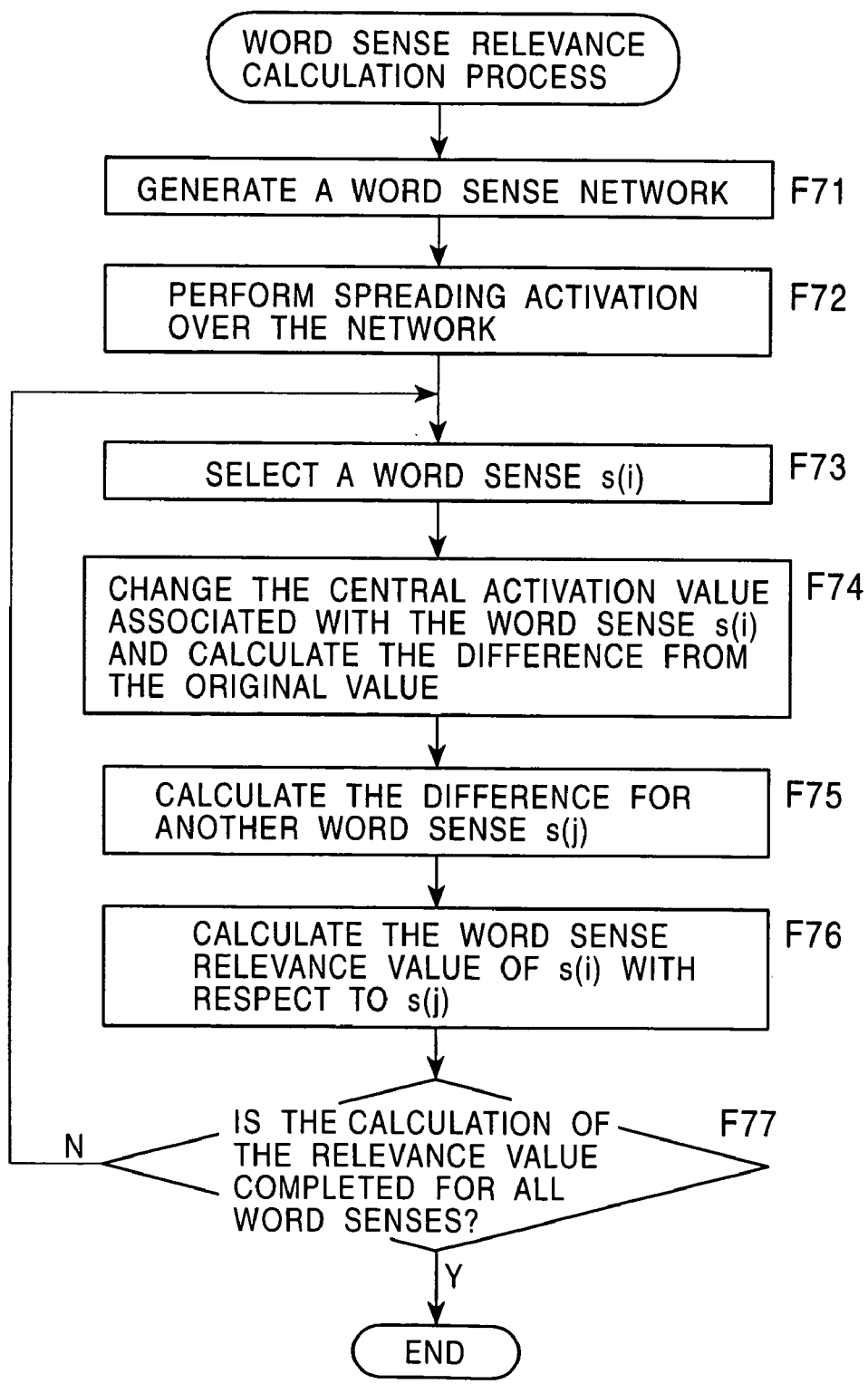
FIG. 15 is a flow chart illustrating a process of calculating a word sense relevance values according to the embodiment of the invention.

More specifically, the process shown in FIG. 15 is performed by the controller 11 as described below.

First, in step F71, the controller 11 generates a word sense network in accordance with explanations of word senses described in the electronic dictionary.

More specifically, the word sense network is generated in accordance with the explanations of the respective word senses described in the dictionary and the referential relations of word senses appearing in the explanations.

The internal structure of the network is described by tags such as those described above. The controller 11 of the document processing apparatus 1 sequentially reads word senses and explanations thereof described in the electronic dictionary stored in the RAM 14 and generates a network.

The controller 14 stores the generated word sense network in the RAM 14.

Instead of generating a network by the controller 11 of the document processing apparatus 1 using the dictionary, a network may also be obtained by receiving from the outside via the receiver 21 or by installing from the storage medium 32 via the write/read unit 31.

Similarly, the electronic dictionary may also be obtained by receiving from the outside via the receiver 21 or by installing from the storage medium 32 via the write/read unit 31.

In step F72, spreading of central activation values of elements of the respective word senses is performed over the word sense network generated in step F71. In this activation spreading process, the central activation values associated with the respective word senses are given in accordance with the internal structure described by tags using the dictionary. The process of spreading activation values is performed in the manner described above with reference to FIG. 8.

In step F73, one word sense Si is selected from elements constituting the word sense network generated in step F71. In the next step F74, the initial central activation value ei of the element Ei corresponding to the word sense Si is changed, and the change $\Delta ei$ in the central activation value from the initial value is calculated.

In the next step F75, the change $\Delta ej$ in the central activation value ej of an element Ej corresponding to another word sense Sj in response to the change $\Delta ei$ in the central activation value of the element Ei is determined.

In step F76, the difference $\Delta ej$ obtained in step F75 is divided by $\Delta ei$ obtained in step F74. The resultant ratio $\Delta ej/\Delta ei$ is employed as the word sense relevance value of the word sense Si with respect to the word sense Sj.

In step F77, it is determined whether the word sense relevance values have been calculated for all possible combinations between one word sense Si and all other word senses Sj.

If word sense relevance values have not been calculated for all possible combinations, the process returns to step F73 to calculate the word sense relevance value for a remaining combination.

In the loop from step F73 to F77, the controller 11 sequentially reads values required for the calculation from the RAM 14 and calculates the word sense relevance values in the above-described manner. The controller 11 sequentially stores the calculated word sense relevance values into the RAM 14.

If it is determined in step F77 that the word sense relevance values have been calculated for all possible combinations of two word senses, the process is terminated.

In the calculation of word sense relevance values, as can be seen from the above description, when the central activation value of a certain word sense is changed, if the central activation value of some other word sense changes to a great degree, then that word sense is regarded as having a high relevance.

That is, if the central activation value of a certain word sense is changed in step F74, this change results in changes in the central activation values of word senses related (linked) to that word sense. Therefore, the relevance of word senses with respect to a certain word sense can be determined from the relative changes. (As described earlier, the central activation value of an element Ei is given by the sum of the current central activation value and the end-point activation values associated with that element Ei. Herein, the end-point activation values of the element Ei depend upon the central activation value and end-point activation values of elements linked to the element Ei. Therefore, if an element Ej has a high degree of relevance to the element Ei, a change in the central activation value of the element Ei generates a large change in the central activation value of the element Ej.)

By performing the above-described process for all possible combinations of two word senses, the relevance values are obtained for all possible combinations of two word senses.

A word sense relevance value is defined between each word sense and another word sense, as shown in FIG. 16. In the example of the word sense relevance table shown in FIG. 16, word sense relevance values are normalized such that they take a value within the range from 0 to 1. In the example shown in FIG. 16, the word sense relevance values among "computer", "television", and "VTR" are described in the table. Herein, the relevance value between "computer" and "television" is 0.55, and that between "computer" and "VTR" is 0.25. The relevance value between "television" and "VTR" is 0.60.

Referring again to FIG. 14, after performing step F62 using the word sense relevance values which have been calculated in advance in the above-described manner, the controller 11 performs step F63 to calculate the document category relevance value Rel(Ci) of a document with respect to category Ci according to the following equation:

$$Rel(Ci) = mlP(Ci) + nlR(Ci)$$

where coefficients ml and nl are constants representing the degrees of contributions of the respective values to the document category relevance.

In the above process, the controller 11 calculates, according to the above equation, the document category relevance value Rel(Ci) using the number P(Ci) of common elements calculated in step F61 and the sum R(Ci) of word sense relevance values calculated in step F62.

The controller 11 stores the calculated document category relevance value Rel(Ci) into the RAM 14.

The coefficients ml and nl may be set to, for example, 10 and 1, respectively.

The values of coefficients ml and nl may also be determined statistically. In this case, the controller 11 calculates the document category relevance value Rel(Ci) using various values of ml and nl, and employs optimum values.

In step F64, the controller 11 categorizes the document into category Ci if the document category relevance value of the document becomes highest for category Ci and if the document category relevance value Rel(Ci) is greater than a threshold value.

That is, the controller 11 calculates document category relevance values with respect to a plurality of categories, and selects a category corresponding to the highest document category relevance value. If the document category relevance value corresponding to the selected category is greater than the threshold value, the controller 11 categorizes the document into the selected category. Thus, the document is automatically categorized into a correct category.

If the highest document category relevance value is not greater than the threshold value, the document is not categorized into any category.

After performing the automatic categorization in step F23 in FIG. 14, which is described in further detail in FIG. 14, the categorization model is updated and registered in steps F24 and F25, respectively, in accordance with the result of the automatic categorization. Thus, the entire process associated with the automatic categorization is completed.

In this way, the document data input to the document processing apparatus 1 is automatically categorized, and displayed in a corresponding document category displaying area in the document categorization window 201 shown in FIG. 10, thereby informing the user of the reception of the document.

6. Summarization

Now, the process of generating a summary of document data is described.

As described earlier, a user can select a document and read the selected document displayed in the browser window 301 shown in FIG. 11. The browser window 301 can be opened from the categorization window 201 shown in FIG. 10 when the above-described manual categorization process is performed in step F13 or at any other time.

Figure 17:
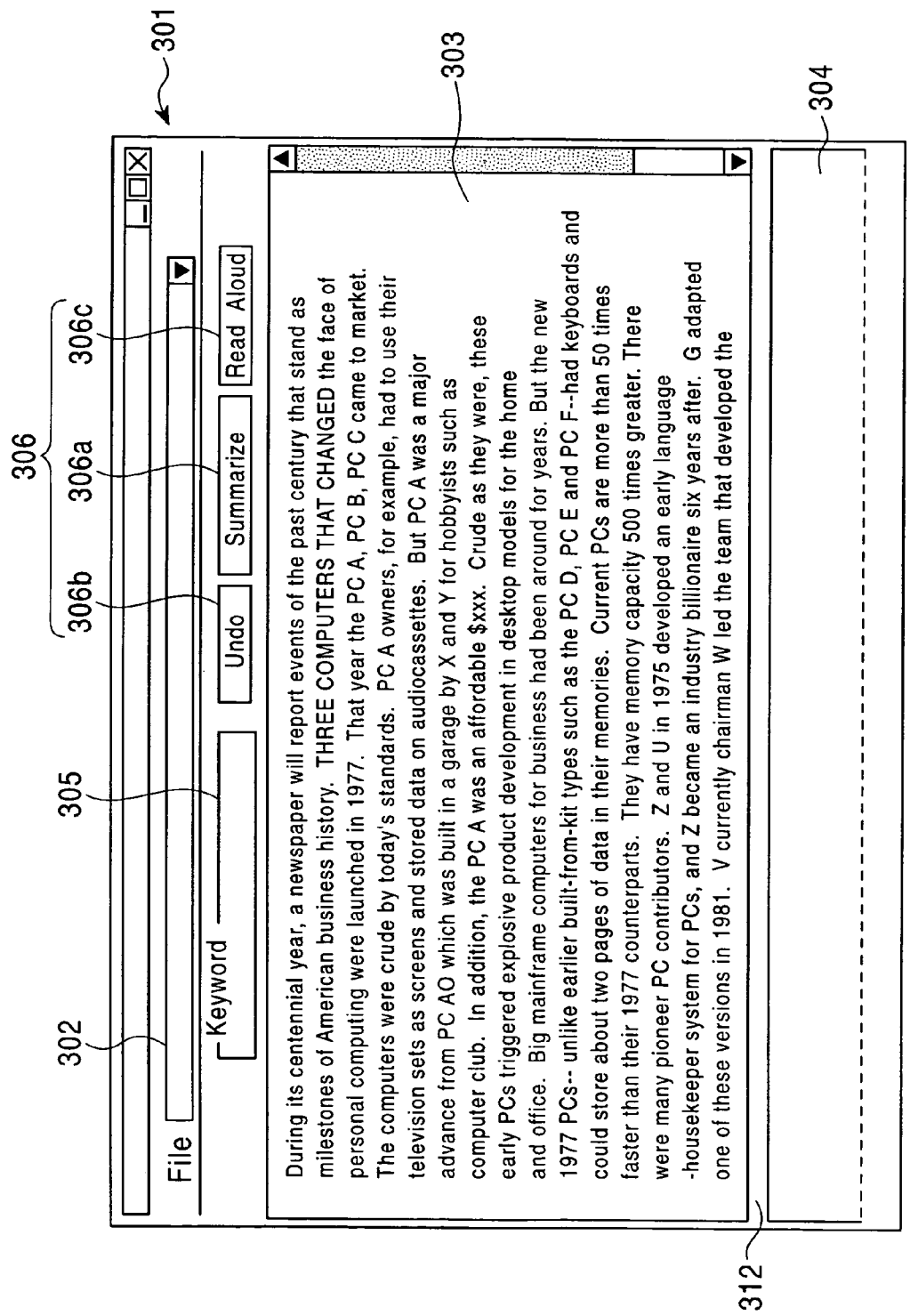
FIG. 17 is a schematic diagram illustrating an example of a browser window according to the embodiment of the invention.

For example, if the user clicks the browser button 202*b* in the categorization window 201 after selecting a document, the browser window 301 is opened and the selected document is displayed in the document displaying area 303 as shown in FIG. 17.

When the entire document is not displayed at a time in the document displaying area 303, a part of the document is displayed.

When a summary has not been generated yet, nothing is displayed in the summary displaying area 304 as shown in FIG. 17.

Figure 18:
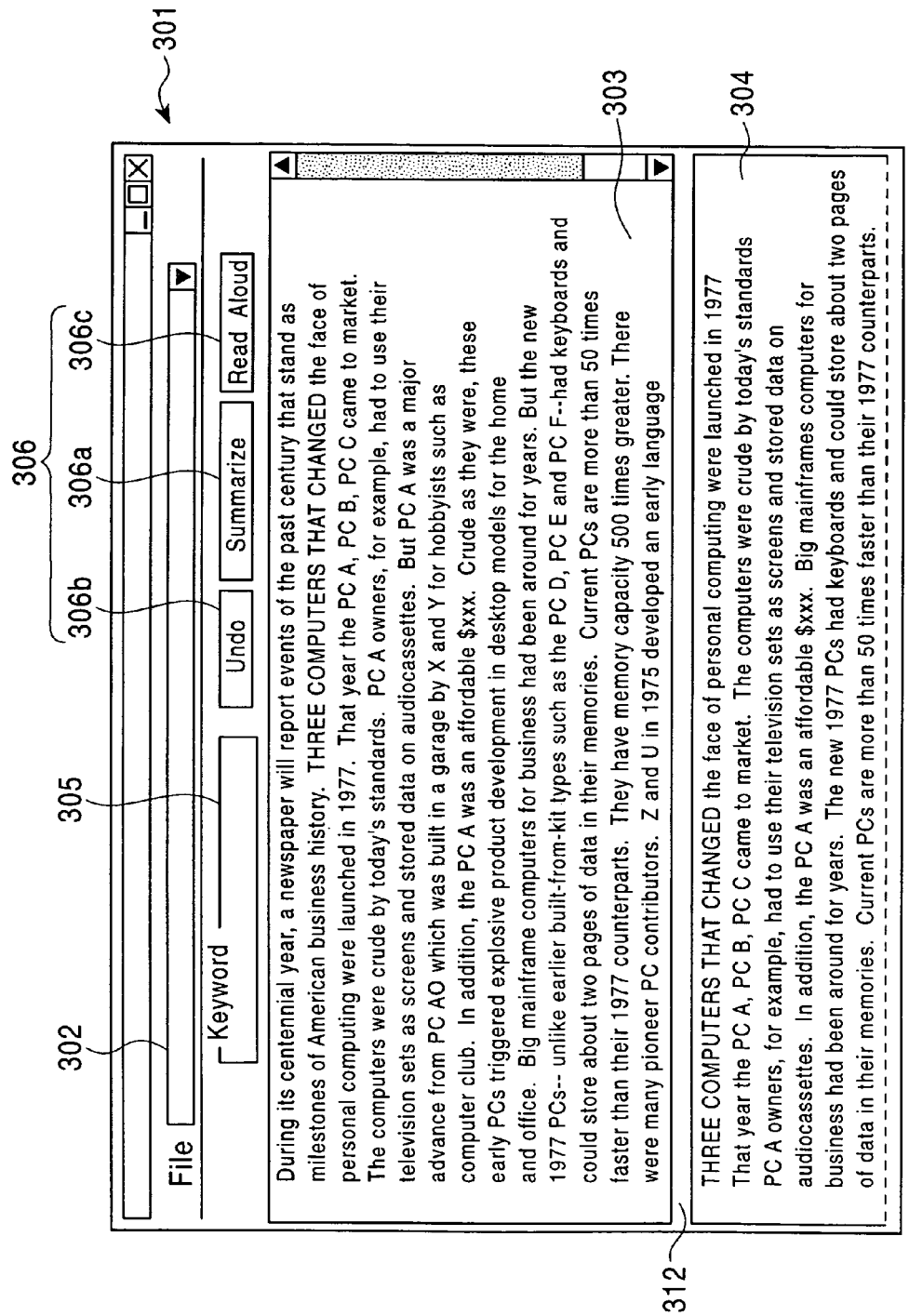
FIG. 18 is a schematic diagram illustrating an example of a browser window in which a summary is displayed, according to the embodiment of the invention.

If the summarize button 306*a* in the browser window 301 is clicked, a summary of the document displayed in the document displaying area 303 is generated and displayed in the summary displaying area 304 as shown in FIG. 18.

More specifically, in response to the Summarize button 306*a* being clicked by the user, the controller 11 performs a summarization process for generating a summary text and the displays the generated summary text as described below.

The process of generating a summary from a given document is performed on the basis of the internal structure, represented by tags, of the document.

The summary is generated depending on the size of the summary displaying area 304. The sizes of the document displaying area 303 and the summary displaying area 304 can be changed by moving the boundary 312.

That is, the summary is generated such that the resultant summary has a size (document length) corresponding to the size of the summary displaying area 304 at the time when a summarization command is issued.

Figure 19:
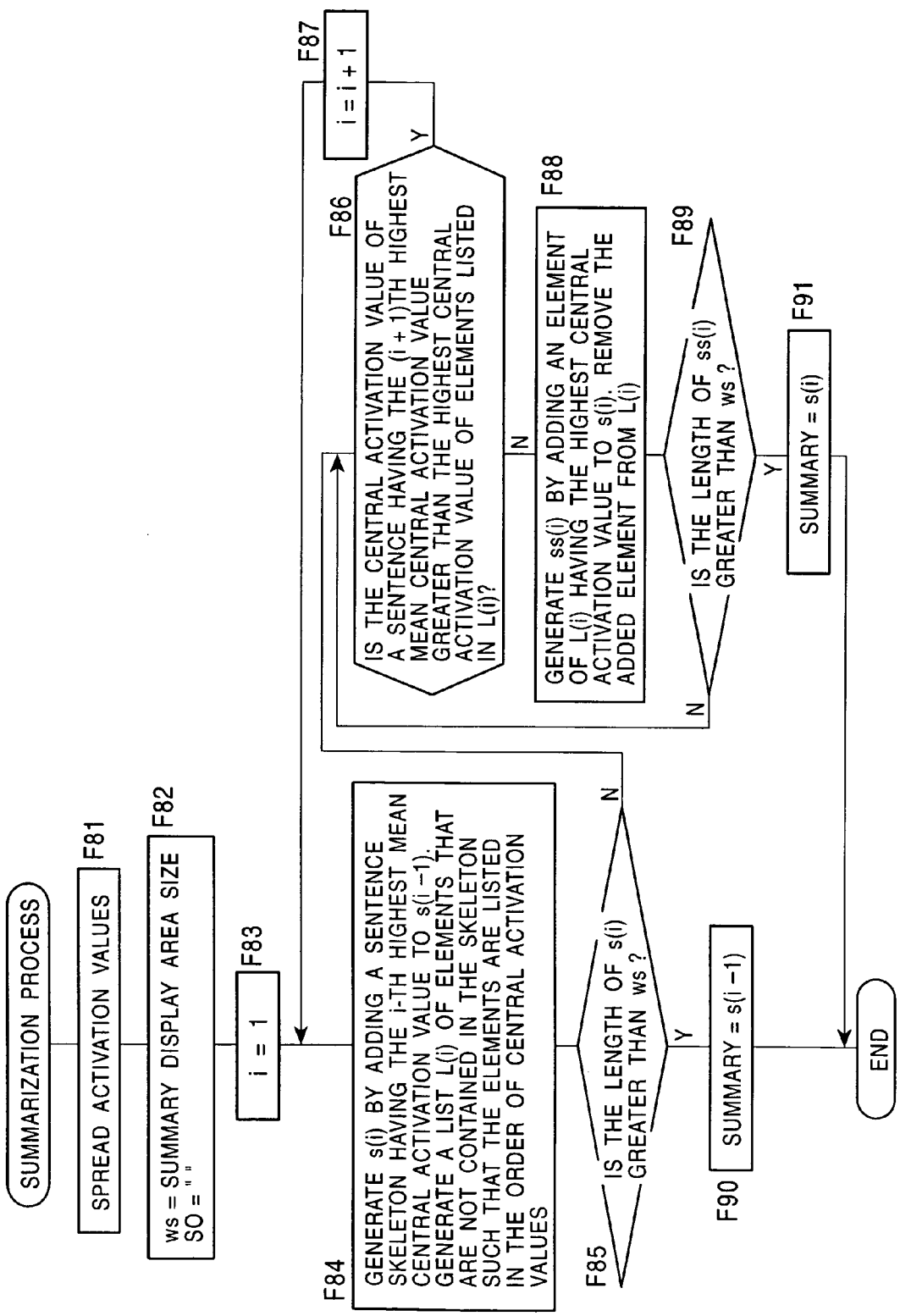
FIG. 19 is a flow chart illustrating a process of generating a summary according to the embodiment of the invention.

FIG. 19 illustrates the process performed by the controller 11 to generate a summary text in response to the Summarize button 306*a* being clicked.

In step F81 in FIG. 19, the controller 11 spreads activation values. In the present embodiment, a summary is generated by employing elements having high degrees of significance represented by the central activation values obtained by means of spreading activation. When a given document includes tags representing the internal structure, central activation values determined by means of spreading activation in accordance with the internal structure described by tags can be assigned to the respective elements.

The process of spreading activation in step F81 is performed in a similar manner to the process described earlier with reference to FIGS. 7–9. As described earlier, the spreading activation is a process in which the central activation values associated with elements are spread such that if an element has significant relation with an element having a high central activation value, then a high central activation value is given to the former element. The activation spreading process causes both an anaphoric (coreferential) expression and an antecedent thereof to have the same central activation value. On the other hand, the central activation values of the other elements decrease. The central activation values are determined in accordance with the internal structure represented by tags, and they are used to extract keywords characterizing the document.

In the next step F82, the controller 11 sets a parameter ws such that ws represents the current size of the summary displaying area 304 in the browser window 301 displayed on the display 30. That is, the parameter ws represents the maximum allowable number of characters that can be displayed in the summary displaying area 304 such that The controller 11 initializes the summary string s (internal register for storing a summary). That is, the initial value of the summary string s is set such that s(0)="". The controller 11 stores the maximum allowable number ws of characters and the initial value s(0) of the string s into the RAM 14.

In step F83, the controller 11 sets the counter value i of a counter for counting the number of iterations.

Then in step F84, the controller 11 extracts a skeleton of a sentence having an ith greatest mean central activation value from the document.

Herein, the mean central activation value refers to the mean value of central activation values of elements included in a sentence.

The controller 11 reads a string s(i−1) from the RAM 14 and adds the string of the extracted sentence skeleton to the string s(i−1) thereby generating a string s(i). The controller 11 stores the resultant string s(i) into the RAM 14.

In the first iteration, because the string s(i−1) has an initial value s(0), the sentence skeleton extracted in this first operation is employed as the string s(i) and stored into the RAM 14.

When step F84 is performed in the following iterations, a newly extracted sentence skeleton is added to the current string s(i) (that is, string s(i−1) at that time).

Furthermore, in step F84, the controller 11 generates a list L(i) of elements that are not included in the sentence skeleton, wherein elements are listed in the order of descending central activation values. The controller 11 stores the resultant list L(i) into the RAM 14.

The summarization algorithm employed in step F84 is to select sentences in the order of central activation values from the highest value to the lowest value on the basis of the result of spreading of activation values and extract sentence skeletons of selected sentences. The skeleton of a sentence is made up of essential elements extracted from the sentence. Elements that can be essential include a head, a subject, an object, an indirect object, and an element having a relational attribute as to possessor, cause, condition, or comparison. When a coordination structure is essential, elements included directly in the coordination structure are employed as essential elements. The controller 11 generates a sentence skeleton by joining essential elements of a selected sentence and adds it to the summary.

In step F85, the controller 11 determines whether the length c–f the string s(i) is greater than the maximum allowable number ws of characters that can be displayed in the summary displaying area 304 of the browser window 301.

This step F85 is necessary to generate the summary such that the summary has a length corresponding to the size of the summary displaying area 304.

If the length of the string s(i) is less than the maximum allowable number ws of characters, the controller 11 advances the process to step F86.

In step F86, the controller 11 compares the central activation values of elements of a sentence having an (i+1)th highest mean central activation value of sentences included in the document with the highest central activation value among those of elements included in the list L(i) generated in step F84.

That is, a sentence (a candidate having highest priority among the remaining sentences) whose mean central activation value is next in magnitude to that of a sentence that has been employed in step F84 as a part of the summary is compared with the central activation values of elements that have been regarded as being not essential and omitted from the skeletons of sentences employed in step F84 to generate the summary.

Thus, in step F86, it is determined whether an element omitted from the sentence skeleton employed in the previous step F84 should be now added to the summary or an element of another sentence should be added.

If the highest central activation value among those of elements in the list L(i) is higher than those of elements of the sentence having the (i+1)th highest mean central activation value, an element is selected from the elements that were not employed in the sentence skeleton in the previous step F84 and the selected element is added to the summary string.

In this case, the controller 11 advance the process to step F88 and selects an element having the highest central activation value from the list L(i) and adds the selected element to the current string s(i) thereby generating a string ss(i).

The controller 11 then removes the selected element from the list L(i).

In step F89, the controller 11 determines whether the length of the string ss(i) is greater than the maximum allowable value ws. If not, the process returns to step F86.

On the other hand, if it is determined in step F86 that the sentence having the (i+1)th highest mean central activation value includes an element having a higher central activation value than the highest central activation value among those of elements in the list L(i), it is determined that an element to be further added to the summary string should be selected from a sentence other than the sentence employed in the previous step F84. In this case, the process goes to step F87, and the counter value i is incremented. Then, the process returns to step F84.

That is, a skeleton is extracted from the sentence that have been determined, in step F84, to have the (i+1)th highest mean central activation value, and the extracted skeleton is added to the string s(i).

Thus, elements having high central activation values are selected in step F84 or F88, and the selected elements are added to the summary string. On the other hand, in step F85 or F89, the length of the string s(i) or ss(i) is compared with the maximum allowable number ws of characters, thereby ensuring that the number of characters included in the string becomes closest to but not greater than the maximum allowable number ws.

If it is determined in step F85 that the length of the string s(i) is greater than the maximum allowable value ws, then the controller 11 advances the process to step F90 and employs the previous string s(i−1) instead of the new string s(i) that includes a skeleton selected and added in the previous step F84.

That is, when a sentence skeleton is added to the summary string in step F84, if the resultant summary string includes a greater number of characters than the maximum allowable number ws, it is determined that the previous string s(i−1), which does not include the sentence skeleton employed in the immediately previous step F84 to form the current string s(i), includes as many characters as possible below the limit ws. Thus, the previous string s(i−1) is employed as a final summary string.

When the string s(i) is generated for the first time in step F84 (i=1, in this case), if it is determined in step F85 that the number of characters included in the string s(i) is greater than the maximum allowable number ws, the string s(i−1) becomes identical to the initial string s(0) (null string) given in step F82, and thus no summary string is generated.

This can occur when the size of the summary displaying area 304 is too small. In this case, the user may expand the size of the summary displaying area 304 on the screen and click the Summarize button 306*a* to start the process shown in FIG. 19.

If it is determined in step F85 that the number of characters included in the string s(i) is not greater than the maximum allowable number ws, the controller 11 advances the process to step F86 as described above and selects an element to be further added to the summary string.

In step F89, it is determined whether the number of characters included in the string ss(i) is greater than the maximum allowable number ws.

If yes, the controller 11 advances the process to step F91 and employs, as the summary string, the previous string s(i) that does not include an element added in the immediately previous step F88 to form the current string.

That is, when an element is added to the string in step F88, if the resultant summary string includes a greater number of characters than the maximum allowable number ws, it is determined that the previous string s(i), which does not include the above-described element, includes as many characters as possible below the limit ws. Thus, the previous string s(i) is employed as a final summary string.

If wsy=ws, it is determined that a summary has been generated in the summarization process such that the length of the summary matches the size of the summary displaying area 304. The content of the summary is made up of a skeleton of one or more sentences having high mean central activation values and one or more elements that are not included in skeletons but have high central activation values.

The resultant summary is stored in the RAM 14 and the entire summary is displayed in the summary displaying area 304 in a fixed fashion as shown in FIG. 18.

When the user reads the summary displayed in the summary displaying area 304, if the user wants a longer or shorter summary, the user may click the Summarize button 306*a* after increasing or decreasing the size of the summary displaying area 304 in the browser window 301.

In response, the process shown in FIG. 19 is performed, and a summary having a length matching the specified size of the summary displaying area 304 is generated and displayed.

7. Reading-Aloud Process

As described above, when the document processing apparatus 1 receives a document including a tag, the document or a summary thereof is displayed so that a user can read it. Furthermore, the document processing apparatus 1 is capable of outputting a voice that reads aloud the received document.

Figure 20:
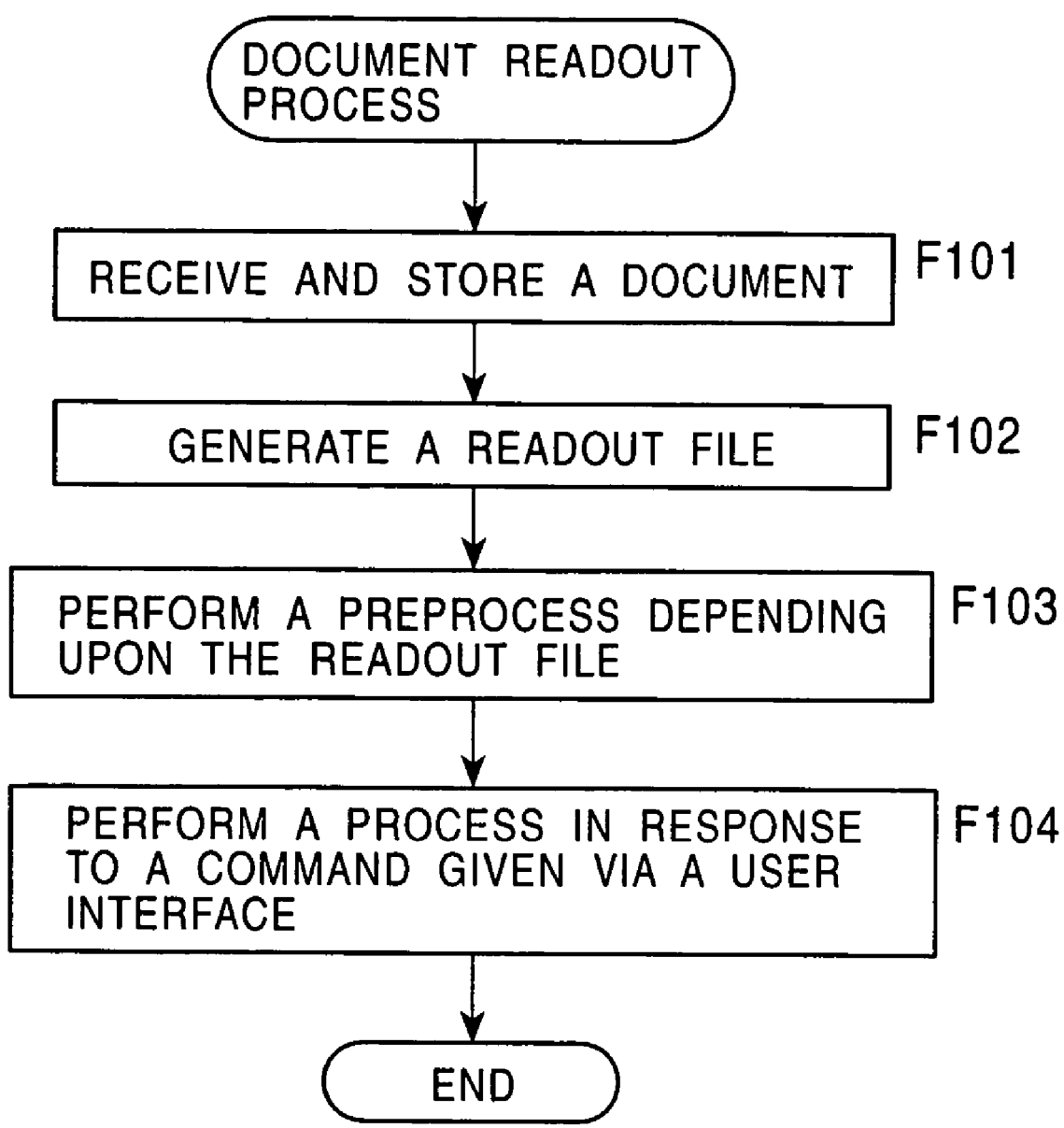
FIG. 20 is a flow chart illustrating a process of reading aloud a document according to the embodiment of the invention.

In this case, a read-aloud program stored in the ROM 15 or the HDD 34, in which other various electronic document processing programs are also stored, is started to perform the process shown in FIG. 20 thereby reading aloud a document.

The outline of the read-aloud process is descried first, and then various steps of the read-aloud process are described in detail with reference to specific examples of documents.

In step F101 shown in FIG. 20, the controller 11 performs reception and storage of a document in a similar manner to step F11 shown in FIG. 5 (or step F21 in FIG. 13). As described earlier, when a document (tag file) is received, the document is categorized manually or automatically. If desired, the document received in step F101 may be subjected to a reading-aloud process. Note that the read-aloud processing may be performed either after or before step F101.

In order to perform the read-aloud processing, the document has to include a tag required to control voice synthesizing operation.

As described earlier with reference to FIG. 1, document data (tag file) including tags is generated by the authoring apparatus 2. In order to realize voice synthesis, the authoring apparatus 2 describes tags for controlling voice synthesis operation in the document data.

Note that after receiving a document including a tag, the document processing apparatus 1 may attach to the document an additional tag for controlling the voice synthesizing operation. That is, it is not necessarily required to use the authoring apparatus 2 to describe tags for controlling voice synthesis.

In the next step F101 in the read-aloud processing, the document processing apparatus 1 generates a read-out file on the basis of the tag file, under the control of the CPU 13. The read-out file is generated by extracting read-aloud attribute information from a tag described in the tag file and embedding attribute information, as will be described in detail later.

In the next step F103, under the control of the CPU 13, the document processing apparatus 1 performs optimization associated with the voice synthesis engine using the read-out file.

The voice synthesis engine may be implemented with hardware or software. When the voice synthesis engine is implemented with software, the voice synthesis engine program is stored in advance in the ROM 15 or the HDD 34.

In the next step F104, the document processing apparatus 1 performs various processes in response to a command issued by a user via the user interface that will be described later.

One of such processes performed by the document processing apparatus 1 is to read aloud a document. Each step of the reading-aloud process is described in detail below.

First, reception and/or generation of a document in step F101 is described.

The document processing apparatus 1 receives a document (including a tag required to control the voice synthesis operation) via, for example, the communication device 21.

Alternatively, the document processing apparatus 1 may generate a document by inserting an additional tag for controlling voice synthesis into the received document.

By way of example, we assume herein that the document processing apparatus 1 has received or generated a document written in Japanese and also a document written in English, wherein both documents include a tag.

The content of the Japanese document is shown below.

"[Enjoy Aging]/8 Metastasis of Cancer can be Suppressed!

がんはこの十数年、わが国の死因 第一位を占めている。その死亡率I

は年齢 が進むとともに増加傾向にある。高齢者の健康 を考えるとき、がんの問題を

避けて通れない。

て通れない。がんを特徴づけるのは、細胞増殖と転移である。人間の細

胞には、自動車でいえばアク セルに当たり、がんをどんど ん増殖する「

がん遺伝子」と、ブレー キ役の「がん 抑制遺伝子」がある。

双方のバランスが取れていれば問題はない。正常な調節機能が失われ、

細胞内でブレーキが利かない変異が起こると、がんの増殖が始まる。

高齢者の場合、長い年月の間にこの変異が蓄積し、がん化の条件 を備えた細胞

の割合が増え、が ん多発につながるわけだ。

ところで、もう一つの特徴、転移という性 質がなければ、がんはそ

れほど恐れる必要はない。切除するだけで、完治が可能になるからである。

転移を抑制することの重要性がここにある。

この転移、がん細胞が増えるだけでは発生しない。がん細胞が細

胞と細胞 の間にある蛋白(たんぱく)質などを溶かし、自分の進む道をつくって、

血管やリンパ管に入り込む。循環しながら 新たな"住み家"を探して

潜り込む、といった複雑な動きをすることが、近年解明され つつある。

A translation of the above document into English is shown below.

[Enjoy Aging]/8 Metastasis of Cancer can be Suppressed! In Japan, cancer has caused the most deaths over the last ten or more years. The rate of death caused by cancer increases with increasing age. Therefore, cancer is a very significant problem for old persons to maintain their health. The cancer is characterized by cell multiplication and metastasis. Human cells each include an "oncogene" and a "tumor suppressor gene". The oncogene corresponds to an accelerator of a car and the tumor suppressor gene corresponds to a brake. When the functions of these two genes are balanced, no problems occur. However, if a genetic defect occurs, the balance is broken and cancer cells start to proliferate. Older persons have genetic defects accumulated over a long period of years and thus have a large number of cells that are apt to become cancer cells. If cancer had not the other property, that is, metastasis, cancer would not be a fearful disease, because cancer would be cured completely by cutting away a cancerous part. In this sense, it is very important to suppress metastasis. A simple increase in the number of cancer cells does not cause metastasis. Recent investigations have revealed that metastasis occurs via a complicated process in which cancer cells dissolve a protein or the like between cells thereby creating a path through which to invade a blood vessel or a lymph vessel. After invading a blood or lymph vessel, cancer cells circulate in the blood vessel to find a new "habitation". A new actor has recently appeared on the stage. The actor is a protein called "nm23". An investigation performed in the USA has revealed that nm23 has a capability of suppressing metastasis, although the detailed mechanism has not been revealed yet. Protein nm23 is expected to be useful for diagnosis and curing of cancer.

The content of the English document is shown below.

"During its centennial year, The Wall Street Journal will report events of the past century that stand as milestones of American business history. THREE COMPUTERS THAT CHANGED the face of personal computing were launched in 1977. That year the Apple II, Commodore Pet and Tandy TRS came to market. The computers were crude by today's standards. Apple II owners, for example, had to use their television sets as screens and store data on audio cassettes."

When the document processing apparatus 1 receives such a document that is written in Japanese or English and that includes tags, the document processing apparatus 1 may categorize it and display the content of the document or a summary thereof, as shown in FIG. 17 or 18.

The above documents written in Japanese and English are described in the form of tag files as shown in FIGS. 22 and 23, respectively.

FIG. 18B illustrates a part of the last paragraph of the tag file.

Note that the tag file actually includes the entire part from the title to the end of the last paragraph.

In FIG. 22A, a tag <title> is used to indicate that the part following this tag is the title.

In the tag file shown in FIGS. 22A and 22B, tags are inserted in a similar manner to tags used to describe the document data structure as described earlier with reference to FIG. 3. Although all tags are not described here, a plurality of tags for controlling voice synthesis are put at various locations.

An example of a voice synthesis control tag is that which is attached when a document includes information representing the pronunciation of a word, as is the case with Example 1 shown in FIG. 18B. In this example, pronunciation="null" is described as attribute information in a tag to prevent pronunciation characters "(たんぱ)" representing the pronunciation of a word "蛋白" located before the pronunciation characters from being read aloud. Herein, "蛋白" is a Japanese word corresponding to "protein" and "たんぱ" represents its pronunciation. If pronunciation="null" is not specified, the Japanese word "蛋白" corresponding to "protein" will be pronounced twice because of the presence of the pronunciation characters.

Another tag for controlling voice synthesis is that used to represent the pronunciation of a word which is difficult to pronounce. In Examples 2 in FIG. 18B, attribute information, pronunciation="りんぱかん", is described in a tag to indicate the correct pronunciation of a word "りんぱ管". Similarly, in Example 3 in FIG. 18B, attribute information pronunciation="すみか" is described in a tag to indicate the correct pronunciation of a word "住み家". Herein, "りんぱ管" is a Japanese word corresponding to "lymph vessel", and "住み家" corresponds to "habitation".

In the example shown in FIG. 23, the tag file also includes tags for controlling voice synthesis. In Example 4 in FIG. 23, pronunciation="two" is described in a tag to indicate the correct pronunciation of "II". This ensures that "II" is correctly pronounced as "two".

In the case where a document includes a quotation, a tag is put in the document to indicate that a sentence is a quotation. Similarly, a tag for indicating an interrogative sentence may be inserted in a document.

In step F101 described above with reference to FIG. 20, the document processing apparatus 1 receives or generates a document including a tag for controlling voice synthesis, wherein the tag may be described in various manners as explained above.

Now, the process of generating a read-out file in step F102 shown in FIG. 20 is described.

The document processing apparatus 1 analyzes attribute information described in tags in a tag file and detects attributes required for the reading-aloud operation. The document processing apparatus 1 then generates a read-out file by embedding attribute information in the tag file.

More specifically, the document processing apparatus 1 detects tags that indicate start positions of paragraphs, sentences, and phrases in the document and embeds attribute information corresponding to these tags into the tag file so as to represent reading-aloud attributes. When there is a summary generated from a document, the document processing apparatus 1 detects the start position of a part corresponding to the summary from the document and embeds attribute information indicating that the specified part of the document includes the same expression as that included in the summary and that the specified part should be read aloud with a greater output level.

For example, the document processing apparatus 1 generates read-out files shown in FIGS. 24 and 25 from the tag files shown in FIGS. 22 and 23, respectively. Herein, FIGS. 24A and 24B correspond to FIGS. 22A and 22B. Note that in actual read-out files, each file includes the entire expression starting from the title and the end of the last paragraph.

In the example shown in FIG. 24, the read-out file includes attribute information, Com=Lang***, embedded at the beginning of the document. This attribute information indicates the language in which the document is written. In this specific example, Com=Lang=JPN is used to indicate that the document is written in Japanese. The document processing apparatus 1 analyzes this attribute information and selects a suitable voice synthesis engine depending upon the language.

The read-out file also includes attribute information, Com=begin_p, Com=begin_s, and Com=begin_ph, embedded at various locations to indicate the start positions of paragraphs, sentences, and phrases, respectively, in the document. The document processing apparatus 1 detects the start positions of phrases, sentences, and phrases by analyzing tags described in the tag files.

In the case where a plurality of tags such as <adjective verb phrase><noun phrase> representing syntactic structures in the same level appear successively in a tag file, only a single attribute data Com=begin_ph is embedded in a read-out file instead of embedding as many attribute data as there are successive tags in the same level.

In the read-out file, attribute information Pau=500, Pau=100, and Pau 50 are embedded at locations corresponding to Com=begin_p, Com=begin_s, and Com=begin_ph, respectively, to indicate that pauses with periods of 500 msec, 100 msec, and 50 msec, respectively, should be inserted in the read-aloud operation.

More specifically, in accordance with these attribute codes, the document processing apparatus 1 inserts pauses with periods of 500 msec, 100 msec, and 50 msec, at the starts of paragraphs, sentences, and phrases, respectively, when the document is read aloud using the voice synthesis engine.

These attribute codes are embedded at locations corresponding to attribute codes Com=begin_p, Com=begin_s, and Com=begin_ph, respectively. Therefore, when a plurality of tags representing syntactic structures in the same level appear successively in a tag file, such as <adverb phrase><noun phrase>, these tags can be regarded as being associated with a single phrase, and only one attribute code Pau=50 is embedded for each phrase without embedding as many attribute codes as there are tags associated with one phrase.

On the other hand, when a plurality of tags representing syntactic structures in different levels appear successively in a tag file, as is the case with <phrase><sentence><noun phrase>, attribute codes Pau=*** are embedded in correspondence with the respective tags. As a result, when the document processing apparatus 1 reads aloud such a part, a pause with a period equal to the sum of pause periods for a phrase, a sentence, and a phrase, that is, a pause with a period of 650 msec is made.

By making pauses for paragraphs, sentences, and phrases, the document processing apparatus 1 can read aloud a document in a natural manner. The lengths of pauses at the starts of paragraphs, sentences, and phrases are not limited to 600 msec, 100 msec, and 50 msec, but they may be set to arbitrary desired values.

In the present example, in response to pronunciation attribute information, pronunciation="null", attached to "(たんぱ)" (characters representing the pronunciation of "蛋白" (protein)) in the tag file, "(たんぱ)" is omitted from the read-out file generated from the tag file. On the other hand, in response to attribute information, pronunciation="りんぱかん" and pronunciation="すみか" described in the tag file, "リンパ管" and "住み家" are replaced with "りんぱかん" and "すみか" respectively. By embedding such pronunciation attribute information, the document processing apparatus 1 can prevent a word from being pronounced incorrectly due to an incorrect description in the dictionary which is referred to by the voice synthesis engine.

When a tag file includes a tag indicating a quotation, attribute information may be embedded to a corresponding read-out file to indicate that a voice synthesis engine different from the current voice synthesis engine should be used for the quotation.

When a tag indicating an interrogative sentence is included in a tag file, attribute information may be embedded to indicate that the end of the interrogative sentence should be read aloud with a rising intonation.

Furthermore, attribute information may be embedded to indicate that a literary expression should be converted to a colloquial expression. This type of attribute information is useful particularly for a document written in Japanese. In this case, instead of embedding such attribute information in a read-out file, the document processing apparatus 1 may convert a literary expression to a colloquial expression in a tag file.

The read-out file shown in FIG. 25 includes attribute information, Com=Lang=ENG, described at the start of the document to indicate that the document is written in English.

Furthermore, in the read-out file, attribute information, Com=Vol=* is embedded to specify the volume level of the voice that reads aloud the document. For example, Com=Vol=0 indicates that the document should be read aloud at a default volume level. Com=Vol=80 indicates that the document should be read aloud at a volume level greater than the default level by 80%. Attribute information Com=Vol=* is effective until another attribute information Com=Vol=*** appears.

In response to the attribute information, pronunciation="two", described in the tag file, "II" in the tag file is converted to "two" in the read-out file".

Figure 21:
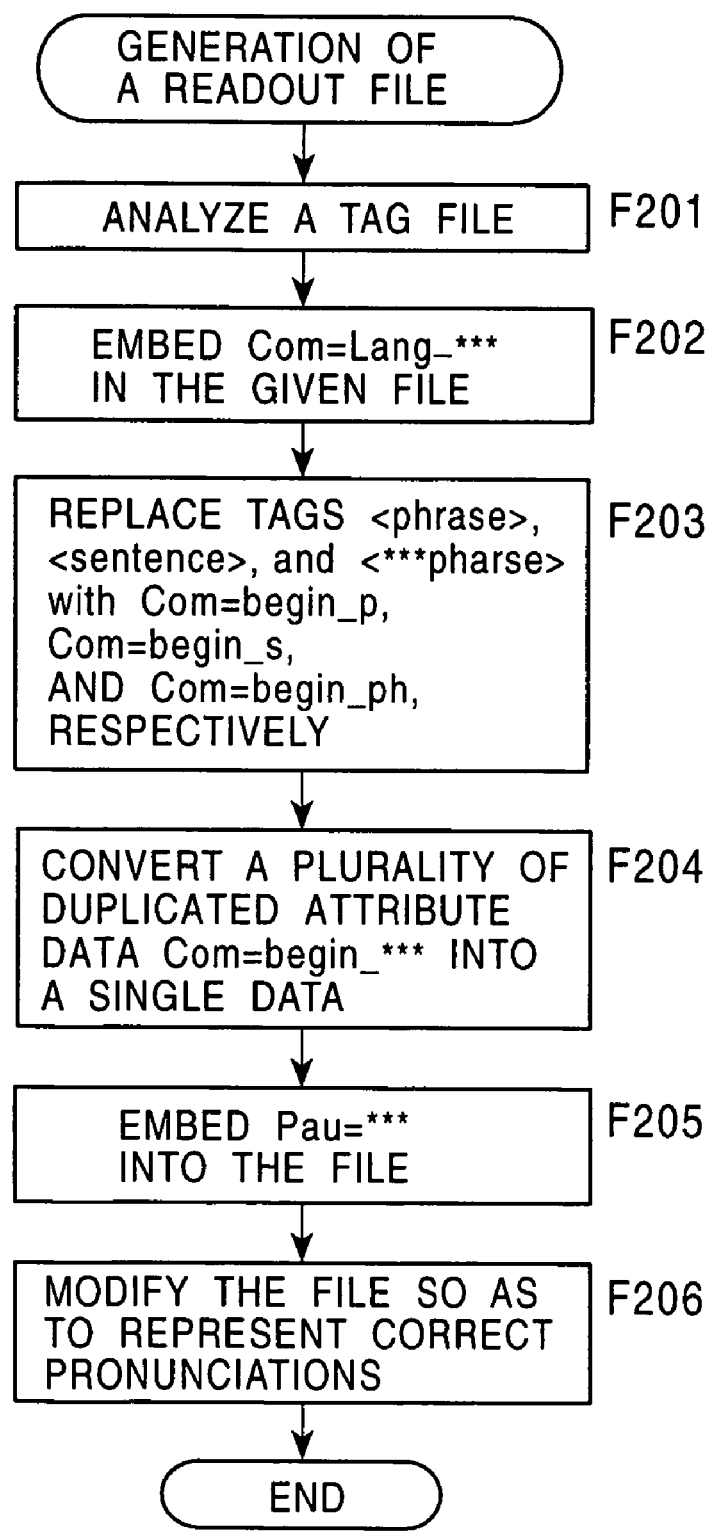
FIG. 21 is a flow chart illustrating a process of generating a read-out file according to the embodiment of the invention.
Figure 26:
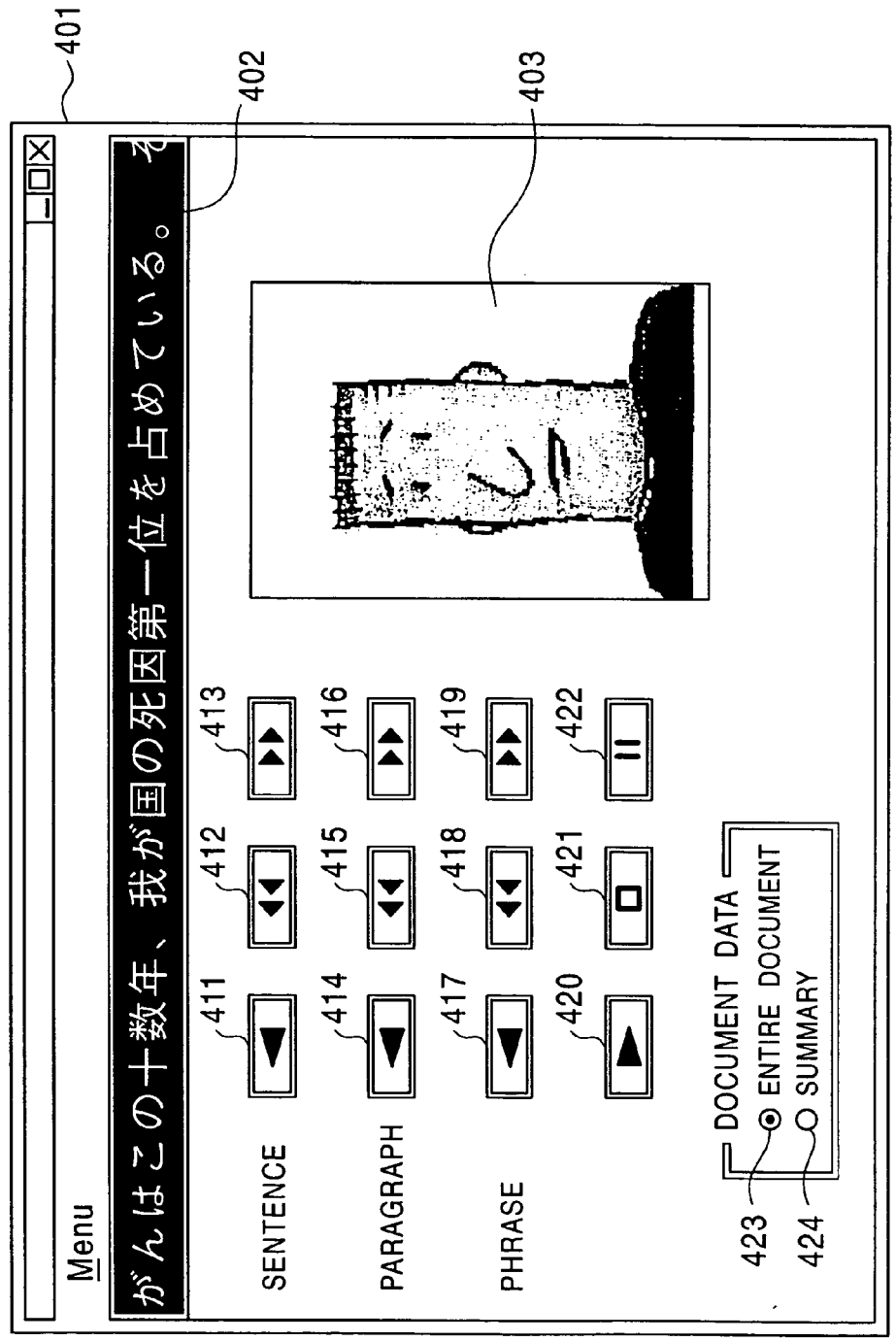
FIG. 26 is a schematic diagram illustrating a read-out window according to the embodiment of the invention.

The document processing apparatus 1 generates a read-out file by performing the process shown in FIG. 21.

That is, in step F201, the document processing apparatus 1 analyzes, using the CPU 13, a tag file received from the outside or generated by the document processing apparatus 1. In this step, the document processing apparatus 1 detects the language in which the document is written and also detects the start positions of paragraphs, sentences, and phrases, and pronunciation attribute information by analyzing tags.

Subsequently, in step F202, the document processing apparatus embeds, using th CPU 13, attribute information Com=Lang=*** at the start of the document, depending upon the language in which the document is written.

In the next step F203, the document processing apparatus 1 replaces, using the CPU 13, tags indicating the starts of paragraphs, sentences, and phrases of the document with corresponding attribute information in the read-out file. More specifically, tags <paragraph>, <sentence>, and <***phrase> in the tag file are replaced with Com=begin_p, Com=begin_s, and Com=begin_ph.

In the next step F204, the document processing apparatus 1 simplifies duplicated expressions, Com=begin_*, corresponding to a plurality of tags representing syntactic structures in the same level, into a single expression of Com=begin_*.

In the next step F205, the document processing apparatus 1 embeds, using the CPU 13, Pau=* at locations before respective attribute information Com=being_*. More specifically, the document processing apparatus embeds Pau=500 before Com=begin_p, Pau=100 before Com=begin_s, and Pau=50 before Com=begin_ph.

Subsequently, in step F206, the document processing apparatus modifies, using the CPU 13, the content of the document so that the document will be read aloud with correct pronunciations. More specifically, in response to the pronunciation attribute information, pronunciation="nulls", "(たんぱ)" is removed. On the other hand, in response to pronunciation attribute information, pronunciation="りんぱかん" and pronunciation="すみか", "リンパ管" and "住み家" are replaced with "りんぱかん" and pronunciation="すみか"respectively.

In step F102 shown in FIG. 20, the document processing apparatus 1 automatically generates a read-out file by performing the process shown in FIG. 21. The controller 11 stores the extracted elements in the RAM 14.

In step F103 shown in FIG. 20, a process is performed using the read-out file as described below.

Using the read-out file, the document processing apparatus performs optimization process associated with the voice synthesis engine.

More specifically, the document processing apparatus 1 selects a voice synthesis engine to be used, in accordance with attribute information Com=Lang=*** embedded in the read-out file.

Each voice synthesis engine has an identifier determined depending upon the language and also depending upon whether to select a male or female voice, and such information is described in an initial setting file and stored on the HDD 34. The document processing apparatus 1 examines the initial setting file and selects a voice synthesis engine having an identifier matching the language of the document.

Furthermore, the document processing apparatus 1 converts expressions Com=begin_**** embedded in the read-out file to expressions in a form suited for the selected voice synthesis engine.

For example, the document processing apparatus 1 marks each expression Com=begin_ph with a number in the range from 10000 to 99999. More specifically, an expression, Com=begin_ph, may be marked such as Mark=10000. On the other hand, each expression, Com=begin_s, is marked with a number with the range from 1000 to 9999, such as Mark=1000. Each expression, Com=begin_p, is marked with a number with the range from 100 to 999, such as Mark=100.

Thus, the start positions of phrases, sentences, and paragraphs are indicated by numbers in the ranges from 10000 to 99999, from 1000 to 9999, and 100 to 999, respectively. Therefore, it is possible to detect the start positions of phrases, sentences, and paragraphs using these marks.

As described above, volume attribute information, Vol=***, representing the volume level by a percentage as compared with the default volume level, and the document processing apparatus 1 determines the absolute volume level from the value described by the percentage.

The document processing apparatus 1 performs the above-described process in step F103 shown in FIG. 20 using the read-out file thereby converting the read-out file into a form which can be read aloud by the voice synthesis engine.

In step F104 shown in FIG. 20, an operation is performed in response to a command issued by a user via the user interface as described below.

If a user clicks the read-out button 306c shown in FIG. 17 or 18 using the mouse or the like of the input unit 20, the document processing apparatus 1 activates the voice synthesis engine.

Furthermore, the document processing apparatus 1 displays the read-out window 401 serving as the user interface such as that shown in FIG. 25 on the display 30.

As shown in FIG. 22, the read-out window 401 includes a play button 420 used to start the read-out operation, a stop button 421 used to stop the read-out operation, and the pause button 422 used to temporarily stop the read-out operation.

The read-out window 401 further includes a search button 411, a fast reverse button 412, and a fast forward button 413, for controlling the read-aloud position in units of sentences. Similarly, a search button 414, a fast reverse button 415, and a fast forward button 416 are provided for controlling the read-aloud position in units of paragraphs. Furthermore, a search button 417, a fast reverse button 418, and a fast forward button 419 are provided for controlling the read-aloud position in units of phrases.

The read-out window 401 also includes selection switches 423 and 423 for selecting the entire document or a summary generated from the document, as a text to be read aloud.

Furthermore, the read-out window 401 includes an image displaying area 403 for displaying, for example, a human image reading aloud the text. Furthermore, there is provided a telop displaying area 402 for displaying the text in the form of a telop in synchronization with the operation of reading aloud the text.

Although not shown in FIG. 22, the read-out window 401 may include a volume control button for controlling the output level of the voice, a speed control button for controlling the speed at which the text is read aloud, and a selection button for selecting a male or female voice.

If a user issues a command by clicking or selecting one of these buttons/switches using the mouse of the input unit 20, the document processing apparatus 1 performs a read-aloud operation using the voice synthesis engine in accordance with the command.

For example, when the user clicks the play but ton 420, the document processing apparatus 1 starts reading aloud the text. More specifically, the controller 11 supplies a voice signal generated by means of voice synthesis to the audio output unit 22. The audio output unit 22 outputs a voice in accordance with the received voice signal.

On the other hand, if the stop button 421 or the pause button 422 is clicked. the document processing apparatus 1 terminates the reading-aloud operation or temporarily stops the operation.

If the user presses the search button 411 when the text is being read aloud, the reading-aloud operation jumps to the beginning of the current sentence being read aloud, and the reading-aloud operation is restarted from the beginning of that sentence. Similarly, if the search button 414 or 416 is pressed, the reading-aloud operation jumps to the beginning of the current paragraph or phrase being read aloud, and the reading-aloud operation is restarted from the beginning of that paragraph or phrase.

In the operations performed in response of the search buttons 411, 414, or 417 being clicked, the controller 11 detects the jumping destination on the basis of the marks described above. More specifically, when the sentence search button 411 is clicked, the controller 11 searches the current sentence backward for a first mark having a number in the range from 1000 to 9999. If a mark having such a number is detected, the reading-aloud operation is restarted from the position where the mark has been detected. In the case of the paragraph searching or the phrase searching, a mark having a number in the range from 100 to 999 or the range from 10000 to 99999 is searched for, and the reading-aloud operation is restarted from the position where the mark is detected.

The above-described capability is useful when a desired part of a document is reproduced in response to a request issued by the user.

In step F104 shown in FIG. 20, as described above, the document processing apparatus 1 reads aloud a document using the voice synthesis engine in response to a command issued by a user via the user interface.

Thus, the document processing apparatus 1 has the capability of reading aloud a desired document in a natural fashion using the voice synthesis engine.

The text to be read aloud may be a document or a summary generated from the original document. By clicking the selection switch 423 or 424, it is possible to select a document or a summary as a text to be read aloud. In any case, a selected document or summary is read aloud via the voice synthesis engine by performing steps F102 and F103 shown in FIG. 20 in accordance with a tag file associated with the selected document or summary.

Although in the present embodiment, a read-out file is generated from a tag file that has been internally generated or received from the outside, it is also possible to directly read aloud a tag file without generating a read-out file.

In this case, after receiving or generating a tag file, the document processing apparatus 1 detects the start positions of paragraphs, sentences, and phrases from tags attached to the tag file and reads aloud the tag file using the voice synthesis engine such that pauses are inserted at detected start positions. This allows the document processing apparatus to directly read aloud a tag file without having to generate a read-out file.

8. Configuration of the Authoring Apparatus

As described above, the document processing apparatus 1 is capable of categorizing received document data in accordance with a categorization model, displaying an original document or a summary thereof, generating a summary text having a length corresponding to the current window size, and reading aloud an original document or a summary thereof. Thus, a user can view or listen to received document data using the document processing apparatus 1.

However, in order for the document processing apparatus 1 to perform the above-described processes, the document data should be written in the form of a tag file. To this end, an authoring apparatus 2 shown in FIG. 1 is used to perform an authoring process thereby converting a given original document in the form of a plain text into document data in the form of a tag file.

The configuration of the authoring apparatus 2 and operations thereof are described in detail below.

Figure 27:
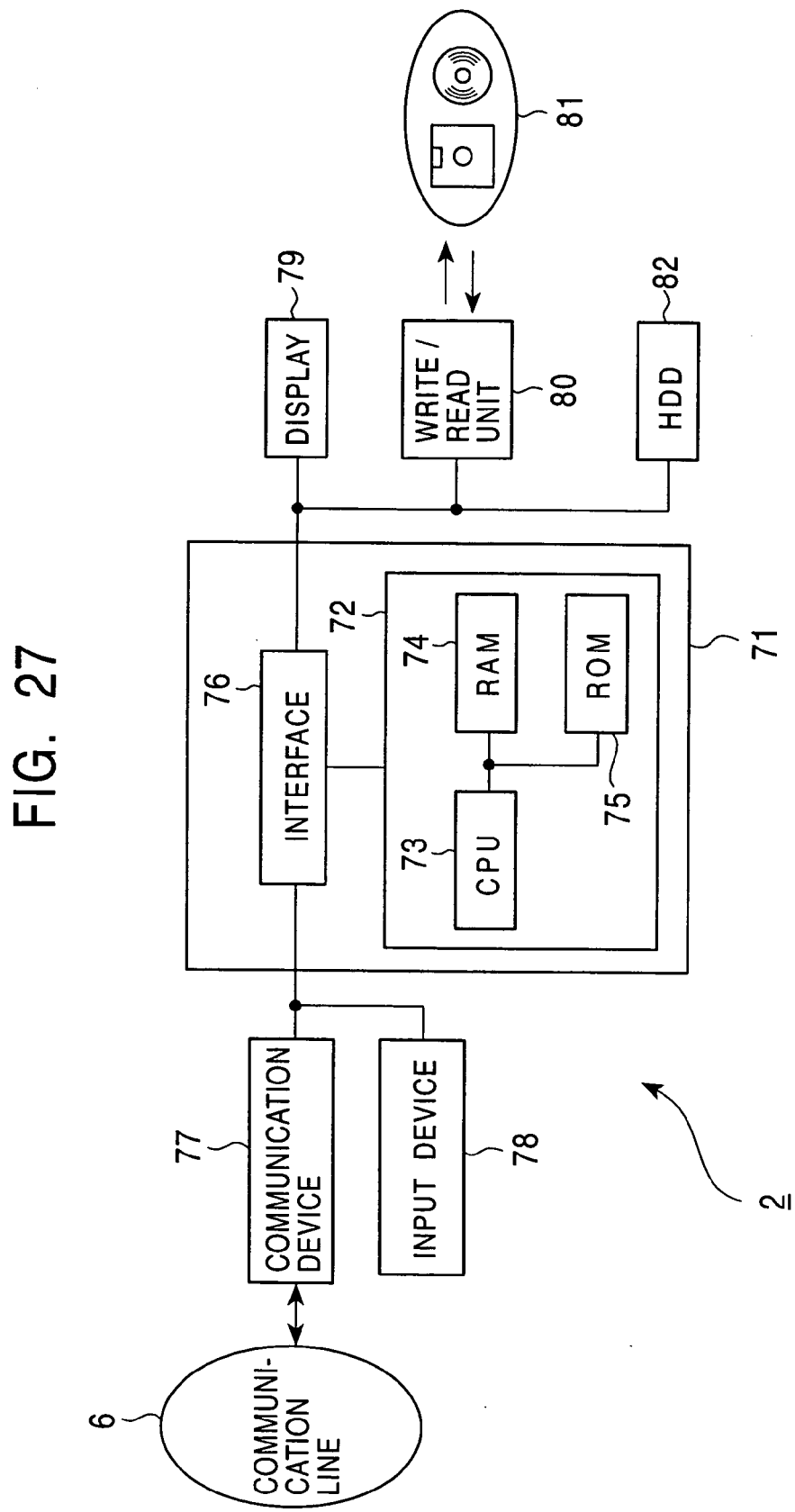
FIG. 27 is a block diagram illustrating an embodiment of an authoring apparatus according to the present invention.

FIG. 27 illustrates the configuration of the authoring apparatus 2.

As shown in FIG. 27, the authoring apparatus 2 includes a main unit 71 including a controller 72 and an interface 76, an input unit 78 used by a user (a human operator doing an authoring work using the authoring apparatus 2) to input data or a command to the main unit 71, a communication device 77 for transmitting and receiving a signal to or from an external device, a display unit 79 for displaying an output from the main unit 71, a write/read unit 80 for writing and reading information onto and from a recording medium 81, and an HDD (hard disk drive) 82.

The main unit 71 including the controller 72 and the interface 76 serves as the core of the authoring apparatus 2.

The controller 72 includes a CPU 73 for controlling various processes performed by the authoring apparatus 2, a RAM 74 serving as a volatile memory, and a ROM 75 serving as a nonvolatile memory. Herein, the processes performed by the authoring apparatus 2 under the control of the controller 72 include an authoring process (denoted by reference numeral 2a in FIG. 1) for a plain text, generation of document data in the form of a plain text (denote by reference numeral 1b in FIG. 1), a process for inputting a plain text from an external device, a process for outputting document data to an external device after completion of an authoring process, and an interfacing process for displaying and inputting data during the above-described processes.

The CPU 73 performs the above-described processes in accordance with various programs stored in, for example, the ROM 75. During execution of programs, the CPU 73 temporarily stores data in the RAM 74 as required.

The controller 72 performs the authoring process in accordance with the authoring program 2c stored in the ROM 73 or the HDD 82, as will be described in detail later.

Alternatively, an authoring program 5 may be supplied from the external to the authoring apparatus 2 via a storage medium 81 or via a communication line 6 and stored in the ROM 73 or the HDD 82. Instead of storing the ROM 73 or the HDD 82, the authoring program received via the storage medium 81 or the communication line 6 may be stored directly into the RM 74, and the authoring program stored therein may be used.

The interface 76 is connected to the controller 72, the input unit 78, the communication device 77, the display 79, the write/read unit 80, and the HDD 82.

Under the control of the controller 72, the interface 76 inputs data via the input unit 78, inputs and outputs data from and to the communication device 77, outputs data to the display 79, inputs and outputs data from and to the write/read unit 80, and inputs and outputs data from and to the HDD 82. More specifically, in the above interfacing operations, the interface 72 adjusts timing of inputting or outputting data between various parts described above and also converts data format as required.

The input unit 78 is used by a user to input data or a command to the authoring apparatus 2. The input unit 78 may include a keyboard and a mouse. Using the keyboard of the input unit 78, the user may input characters to the authoring apparatus 2. The user may also click, using the mouse, a desired operation control button or icon displayed on the display 79. The mouse may also be used by the user to select document element.

The communication device 77 serves to receive a signal that is transmitted by an external apparatus to the authoring apparatus 2 via the communication line 6. The communication device 77 also serves to transmit a signal over the communication line 6.

More specifically, the communication device 77 receives one more plain texts (documents including no tags) transmitted from a document provider 4 shown in FIG. 1. The communication device 77 also receives an authoring program 5. The received data or program is transferred to the main unit 71.

Furthermore, the communication device 77 also transmits data to an external apparatus via the communication line 6. More specifically, the communication device 77 transmits document data generated by means of the authoring process to the server 3.

The display 79 serves to display information such as characters and/or images that are output during the authoring process performed by the authoring apparatus 2. The display 79 may be formed of a cathode ray tube or a liquid crystal display. The display 79 may display one or more windows in which characters and/or graphic images are displayed.

The write/read unit 80 serves to write and read data to and from a storage medium 81 such as a floppy disk or an optical disk. The storage medium 81 is not limited to the floppy disk or the As for the write/read unit 80, a device (such as a disk drive or a card drive) adapted to writing/reading data to and from an employed medium may be used.

In the case where an authoring program is stored on the storage medium 81, the write/read unit 80 may read the authoring program from the storage medium 81 and transfer it to the controller 72.

When a plain text is stored on the storage medium 81, the write/read unit 80 may read it from the storage medium 81 and transfer it to the controller 72. This provides another way for the authoring apparatus 2 to acquire a plain text.

The controller 72 of the authoring apparatus 2 may also supply document data generated through the authoring process to the server 3 by supplying a storage medium 81 on which the document data is stored using the write/read unit 80.

The HDD 82 serves as a mass storage device used by the authoring apparatus 2 to store a large amount of data. The HDD 82 writes and reads information under the control of the controller 72.

The HDD 82 is used to store various application programs such as an authoring program executed by the controller 72. The HDD 82 may also be used to store a plain text input to the authoring apparatus 2 or document data generated through the authoring process.

9. Authoring Process

The authoring process performed by the authoring apparatus 2 is descried below with reference to a flow chart shown in FIG. 28. The flow chart in FIG. 28 illustrates the process performed by the controller 72 in accordance with the authoring program.

FIGS. 29 to 43 illustrate some examples of the authoring window 601 displayed on the display 79 in the authoring process. These figures will also be referred to in the following description.

Figure 28:
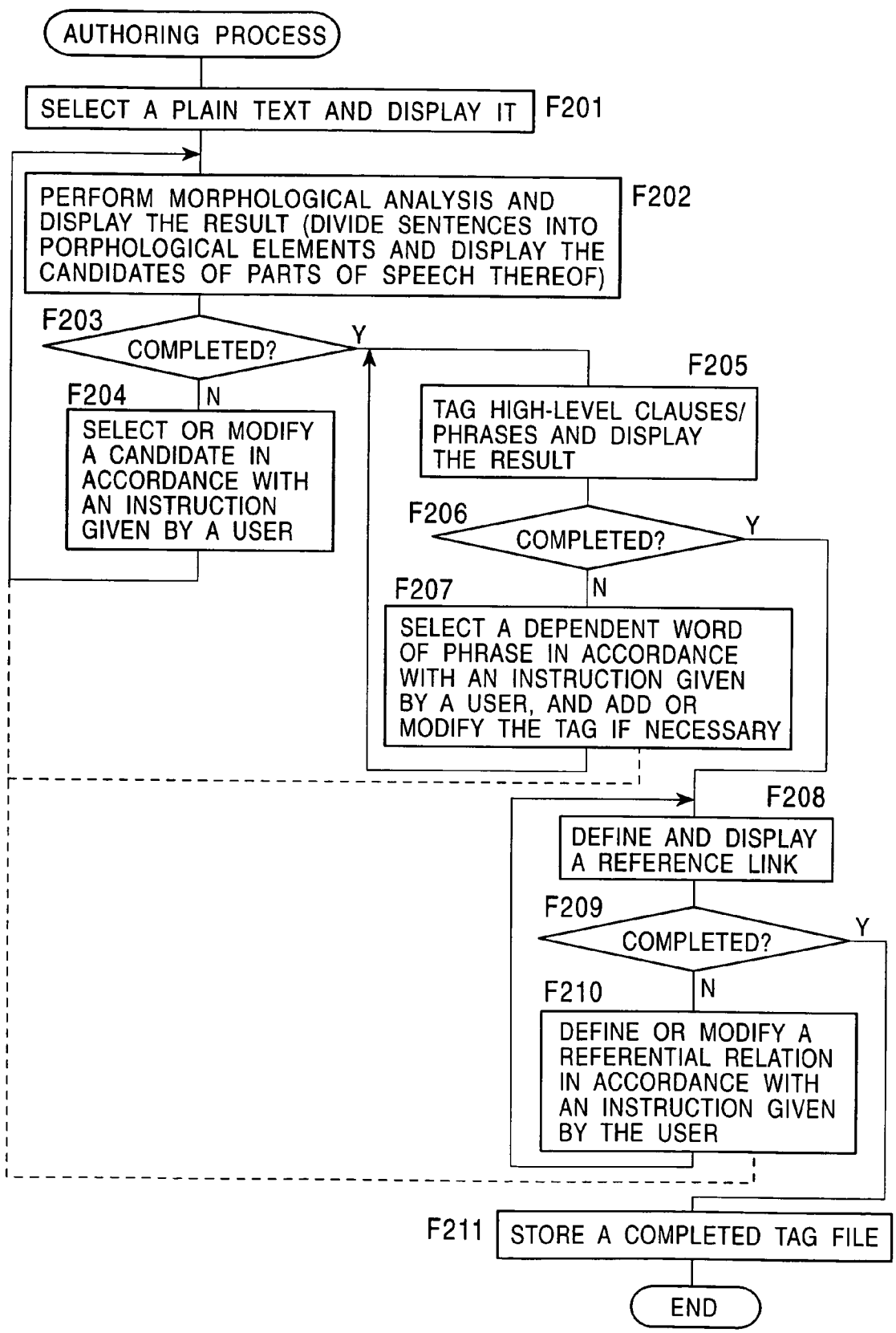
FIG. 28 is a flow chart illustrating an authoring process according to an embodiment of the invention.

To start the authoring process shown in FIG. 28, the controller 72 first starts the authoring process.

In step F201, the controller 71 selects a plain text to be subjected to the authoring process.

More specifically, the controller 71 displays, on the display 70, a list of one or more plain texts that are stored in the RAM 74, the HDD 82, or the storage medium 81 after being received from the document provider 4 or after being generated by the authoring apparatus 2 so that a user can select a desired plain text. If the user designates one of plain texts from the list, the controller 72 selects the designated plain text.

The controller 72 displays the selected plain text on the display 79.

Figure 29A:
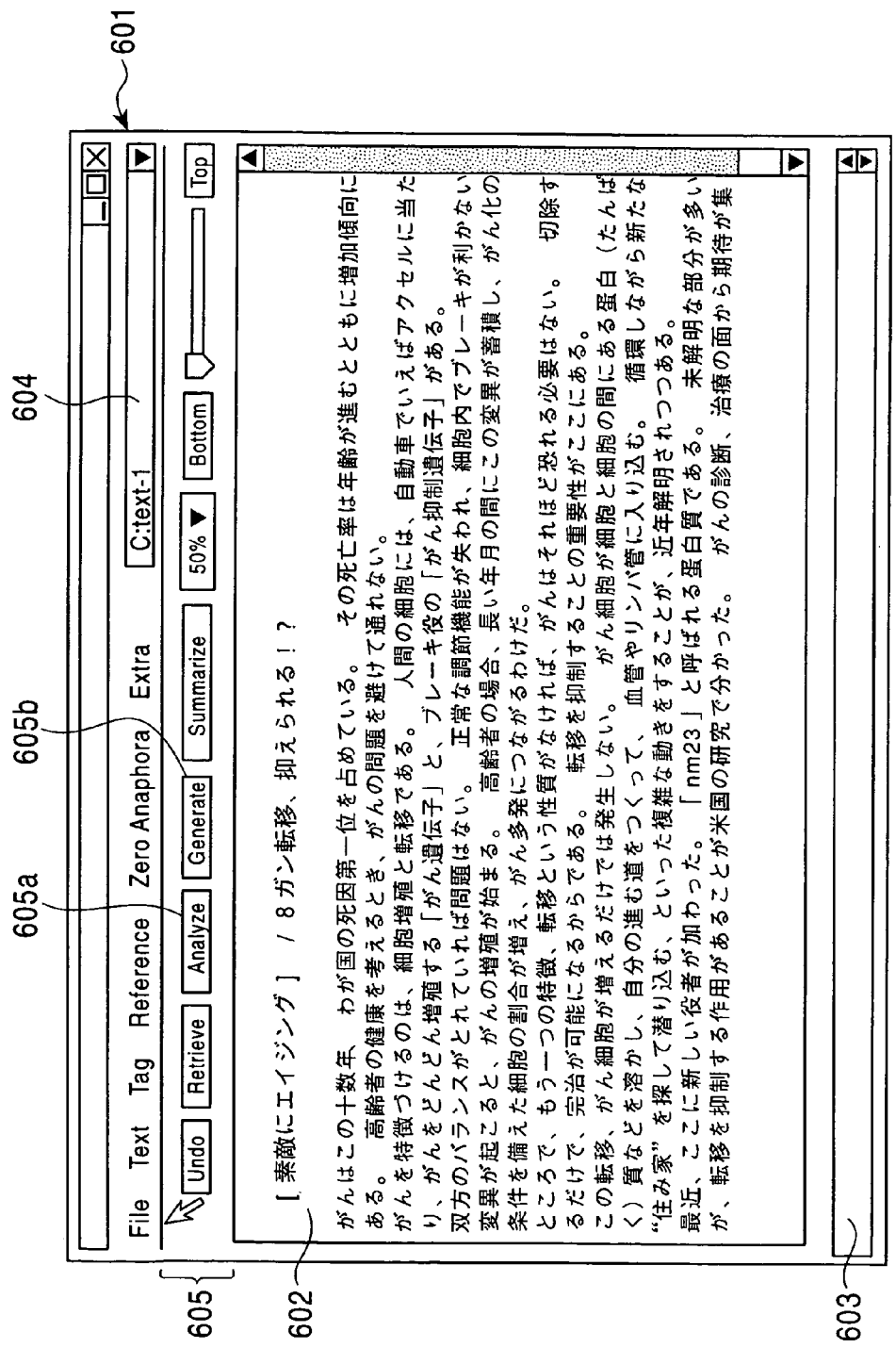
FIG. 29 is a schematic diagram illustrating an example of a plain text that is displayed on a display and that is to be subjected to the authoring process according to the embodiment of the invention.
Figure 29B:
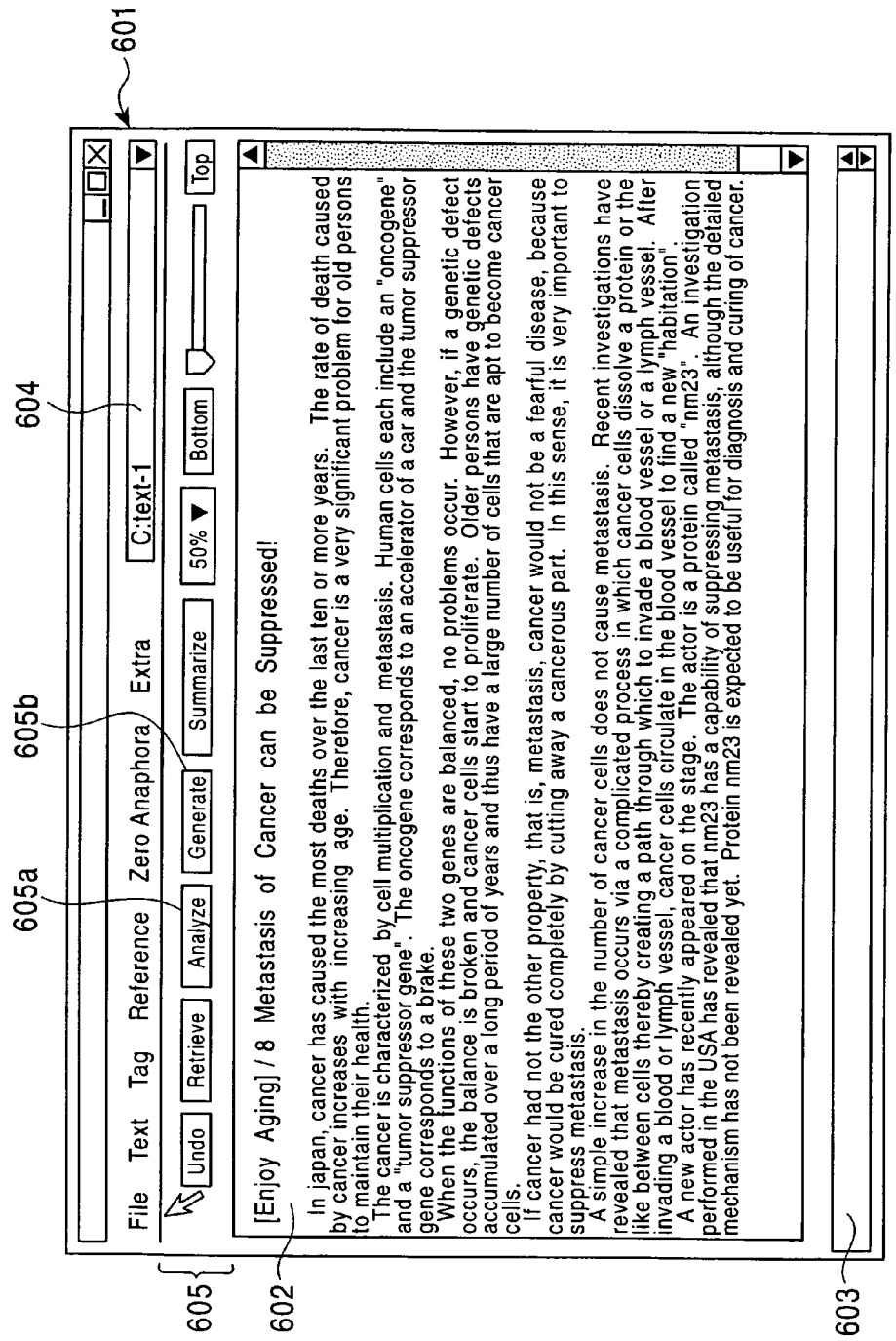

More specifically, the plain text is displayed in the authoring window 601, for example, in such a manner as shown in FIG. 29.

The authoring window 601 includes a first document displaying area 602, a second document displaying area, a file name displaying area 604, and various operation control buttons 605.

The file name of the selected plain text is displayed in the file name displaying area 604 in the authoring window 601, and the plain text is displayed in the document displaying area 602.

The user can arbitrarily change the sizes of the document displaying areas 602 and 603 by moving the boundary between them. The sizes of the document displaying area 602 and 603 may also be changed automatically as required during the authoring process.

When the plain text is being displayed, if the user clicks the analyze button 605a, the controller 72 advances the process to step F202.

In step F202, the controller 72 performs the morphological analysis upon the plain text.

More specifically, the controller 72 divides sentences in the plain text into morphological elements such as words or phrases and determines parts of speech of the respective morphological elements. However, the controller 72 does not always correctly divide the sentences into words and does not always correctly determine parts of speech. In the case where the controller 72 cannot determine delimitations or parts of speech, the controller 72 displays possible candidates.

Figure 30:
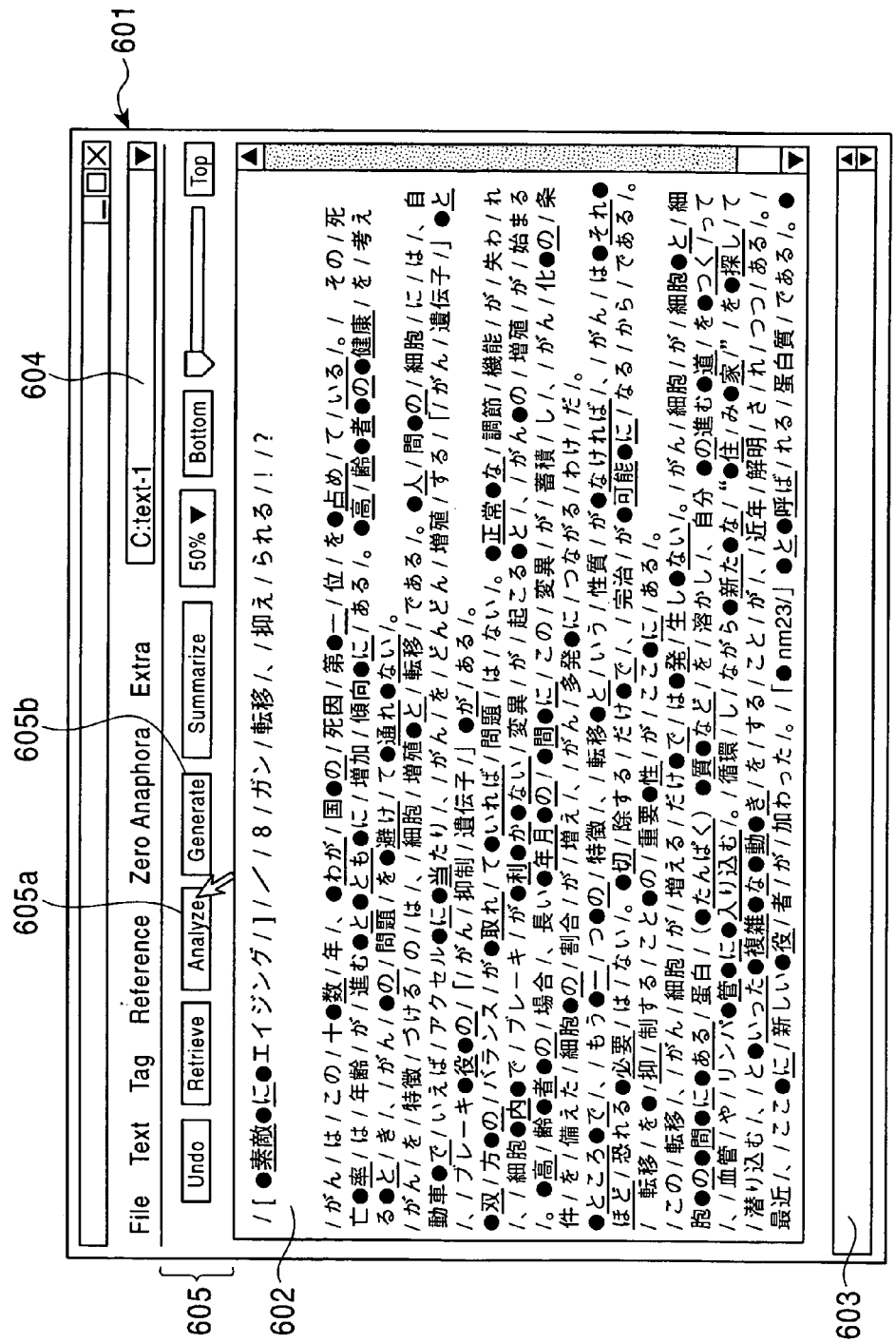
FIG. 30 is a schematic diagram illustrating an example of a text displayed on the display after being subjected to morphological analysis in the authoring process according to the embodiment of the invention.

The result of the morphological analysis is displayed in the document displaying area 602 in the authoring window 601. FIG. 30 shows an example of the result displayed in the document displaying area 602.

In this specific example, boundaries between morphological elements are represented by slashes "/", wherein determined and undetermined portions are distinguished by the color of slashes.

Because it is not allowed to use various colors in FIGS. 30–43, slashes "/" with a normal color (the same color as that used to display characters) are used to represent determined boundaries, and undetermined boundaries are represented by marks "●" that will be represented by red slashes if red color is allowed to be used. Hereinafter, "/" is called simply a slash, and "●" is called a red slash.

Green slashes will also be used later. To represent green slashes, marks "◆" will be used, and marks "◆" will be called green slashes.

Those elements that have been definitely separated and determined as to the parts of speech, boundaries of the elements are represented by slashes "/" in the document displaying area 602 as shown in FIG. 30.

If an element has a plurality of candidates, the element is underlined and the boundary is represented by a red slash "●".

When the part of speech for an element is undefined, the boundary thereof is represented by a red slash "●" without being underlined.

When a user views the analysis result, he/she may determine the undetermined boundaries and/or parts of speech using the mouse or keyboard of the input unit 78. The user may also modify sentences, if necessary.

In step F204, the controller 72 performs a process such as selection of a part of speech from a plurality of candidates and modification of a sentence in response to an inputting operation performed by the user. Each time the controller 72 performs such a process, the result is displayed in step F202. Morphological analysis may be performed again if necessary. More specifically, if a sentence is added, morphological analysis may be performed for the added sentence.

Figure 31:
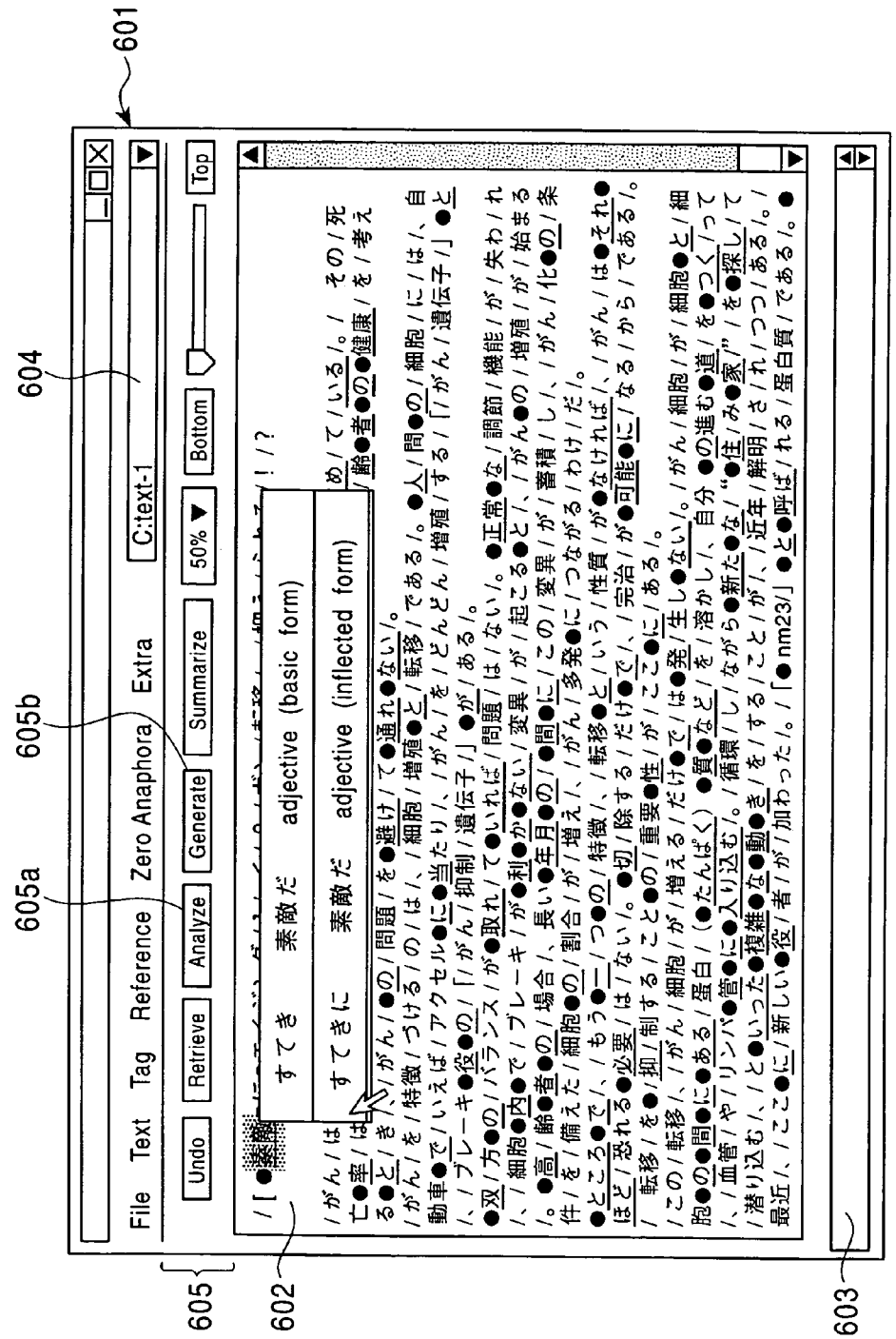
FIG. 31 is a schematic diagram illustrating an example of a manner of displaying candidates in terms of morphological elements during the authoring process according to the embodiment of the invention.

If the user clicks an undetermined element indicated by a red slash "●" and an underline, candidates regarding morphemes and parts of speech thereof are displayed. FIG. 31 illustrates a specific example in which the controller 72 displays, in step F204, candidates regarding morphemes and parts of speech for "素敵" that has been clicked by the user. Herein BO "素敵" is a Japanese word corresponding to an English word "wonderful". In FIG. 31, a selected portion is represented in a reversed fashion. Alternatively, a selected portion may also be represented by colored characters. In other figures, a selected portion may be represented in either fashion.

The user may select (click) a correct candidate thereby determining the undetermined portion.

Figure 32:
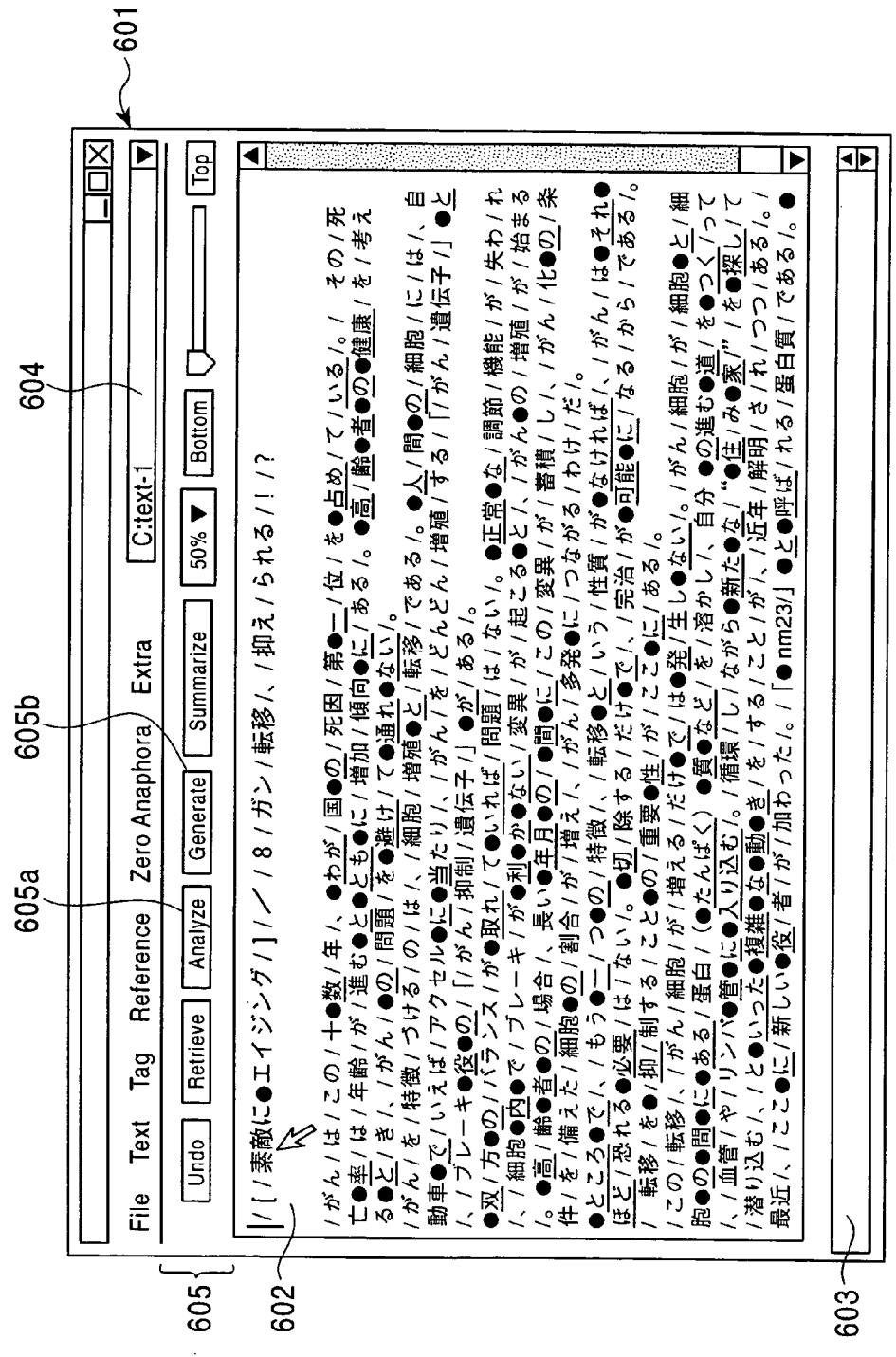
FIG. 32 is a schematic diagram illustrating an example of a text displayed on the display after being determined in terms of morphological elements during the authoring process according to the embodiment of the invention.

In FIG. 31, if the user selects a candidate on the second row in the selection window in which two candidates are displayed, the boundary and the part of speech of the undetermined portion are determined. As a result, the text is displayed in the document displaying area 602 in the manner in which "素敵に" is indicated by a slash "/" as a determined morphological element, as shown in FIG. 32.

Figure 33:
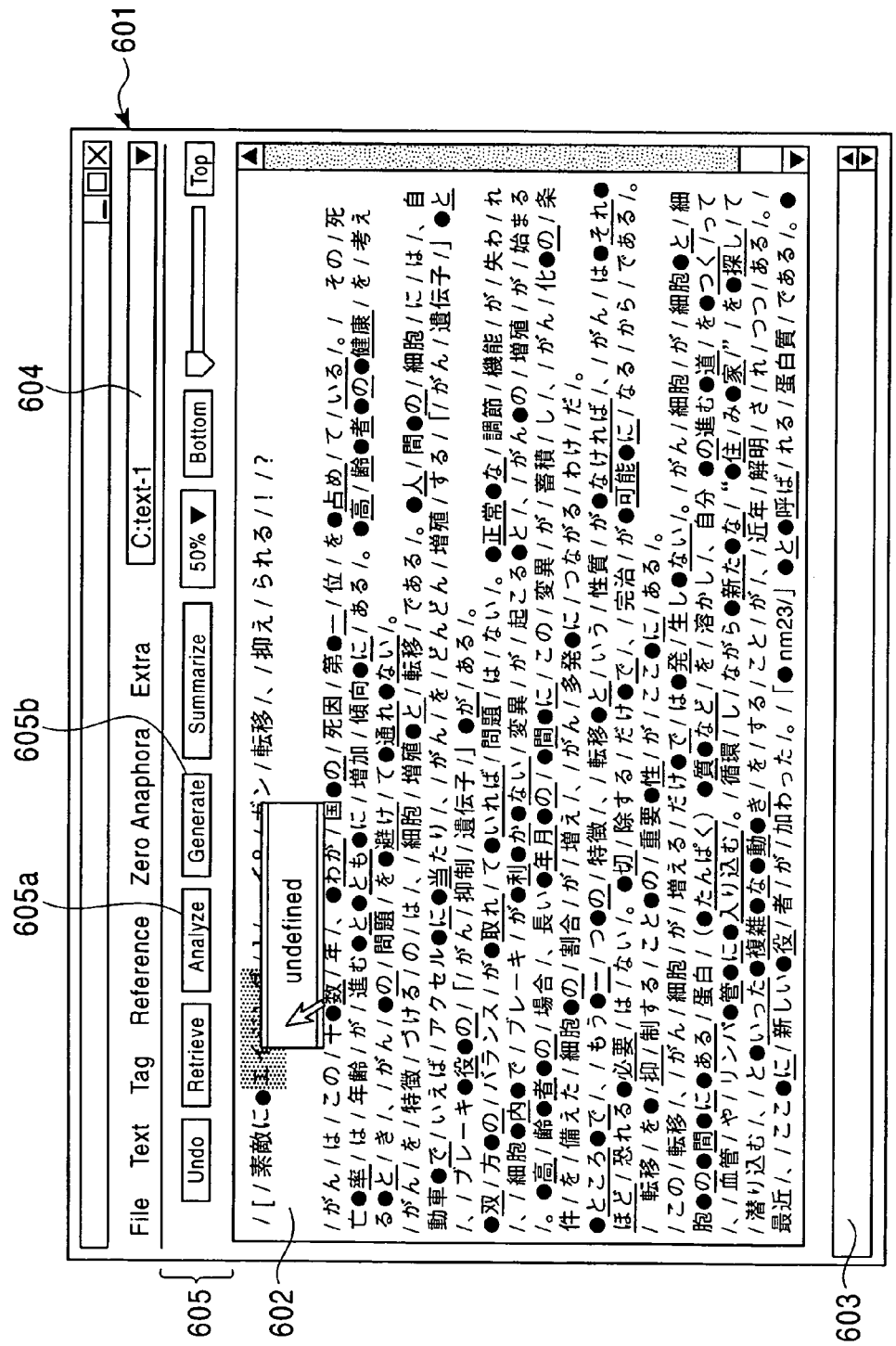
FIG. 33 is a schematic diagram illustrating an example of a manner of displaying an undefined word during the authoring process according to the embodiment of the invention.

If a user designates a portion whose part of speech is undefined and that is delimited by a red slash "●" without being underlined, a message window appears, as shown in FIG. 33, to indicate that the part of speech is undefined. In the specific example shown in FIG. 33, the controller 72 displays, in step F204, a message to notify the user that a portion "エイジング" (aging) clicked by the user is undefined.

The user may define such an undefined word. If the user again clicks the same portion, the controller 72 opens an editor window 620, as shown in FIG. 34, to prompt the user to input data.

The editor window 620 includes a tag name box 621, a tag attribute box 622, an OK button 623, and a cancel button 624.

Figure 34:
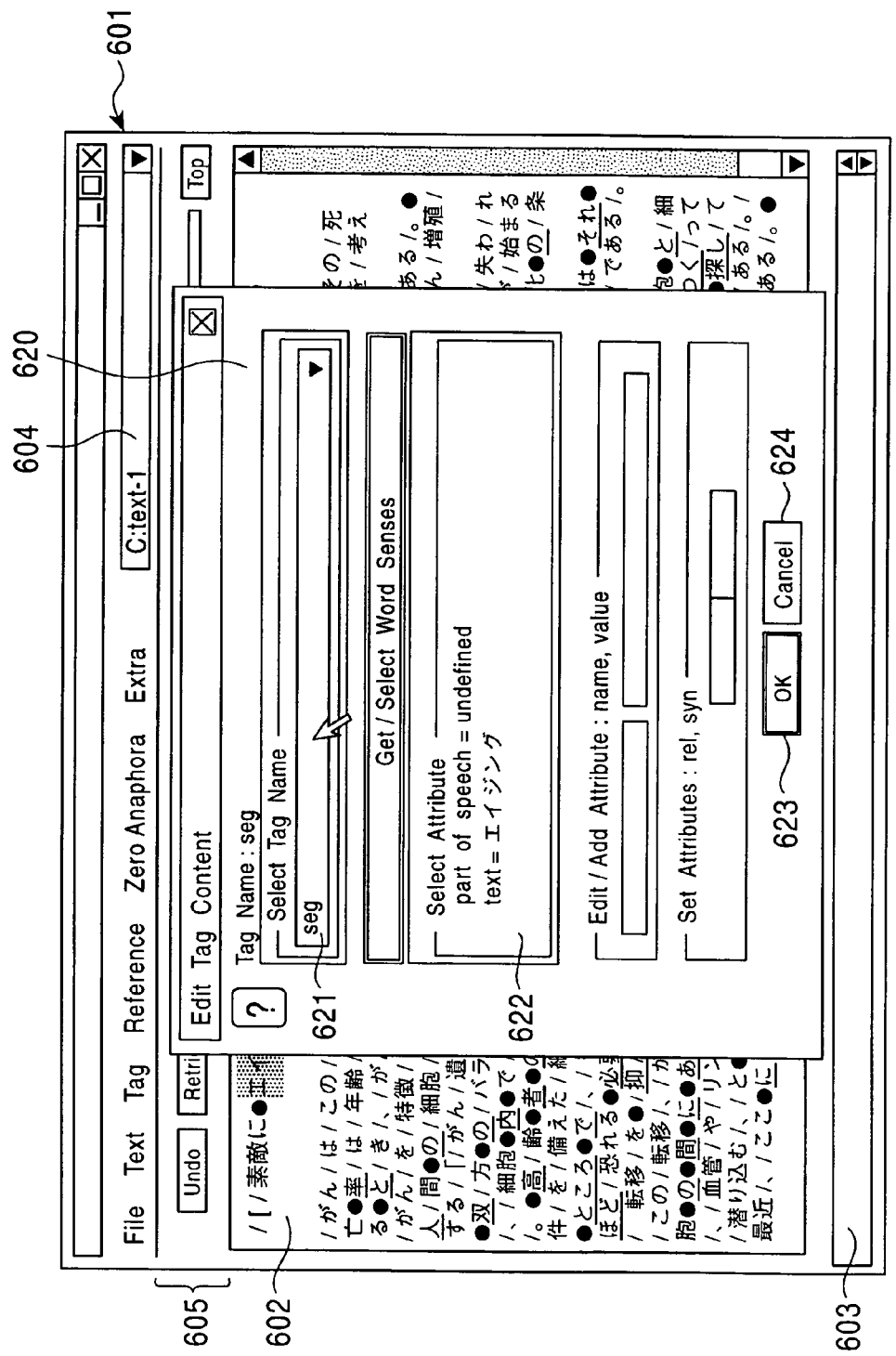
FIG. 34 is a schematic diagram illustrating an example of a manner of presenting a subwindow for processing an undefined word during the authoring process according to the embodiment of the invention.

When a word is undefined, "seg" is displayed in the tag name box 621, as shown in FIG. 34, to indicate that a given word is an undefined element. In the specific example shown in FIG. 34, "エイジング" (aging) is displayed as an undefined word in the tag attribute box 622.

Figure 35:
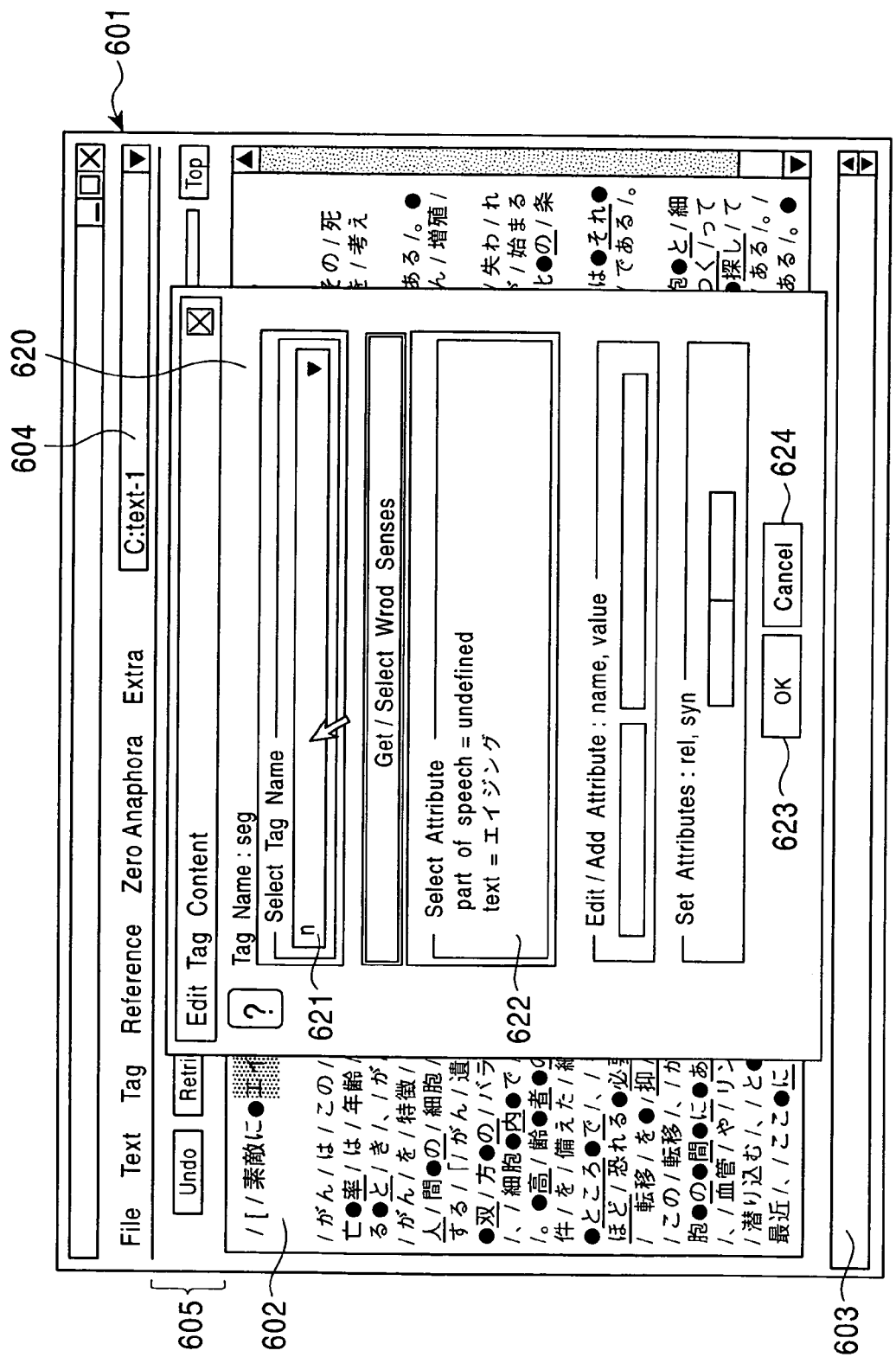
FIG. 35 is a schematic diagram illustrating an example of a manner of processing an undefined word in the subwindow during the authoring process according to the embodiment of the invention.
Figure 36:
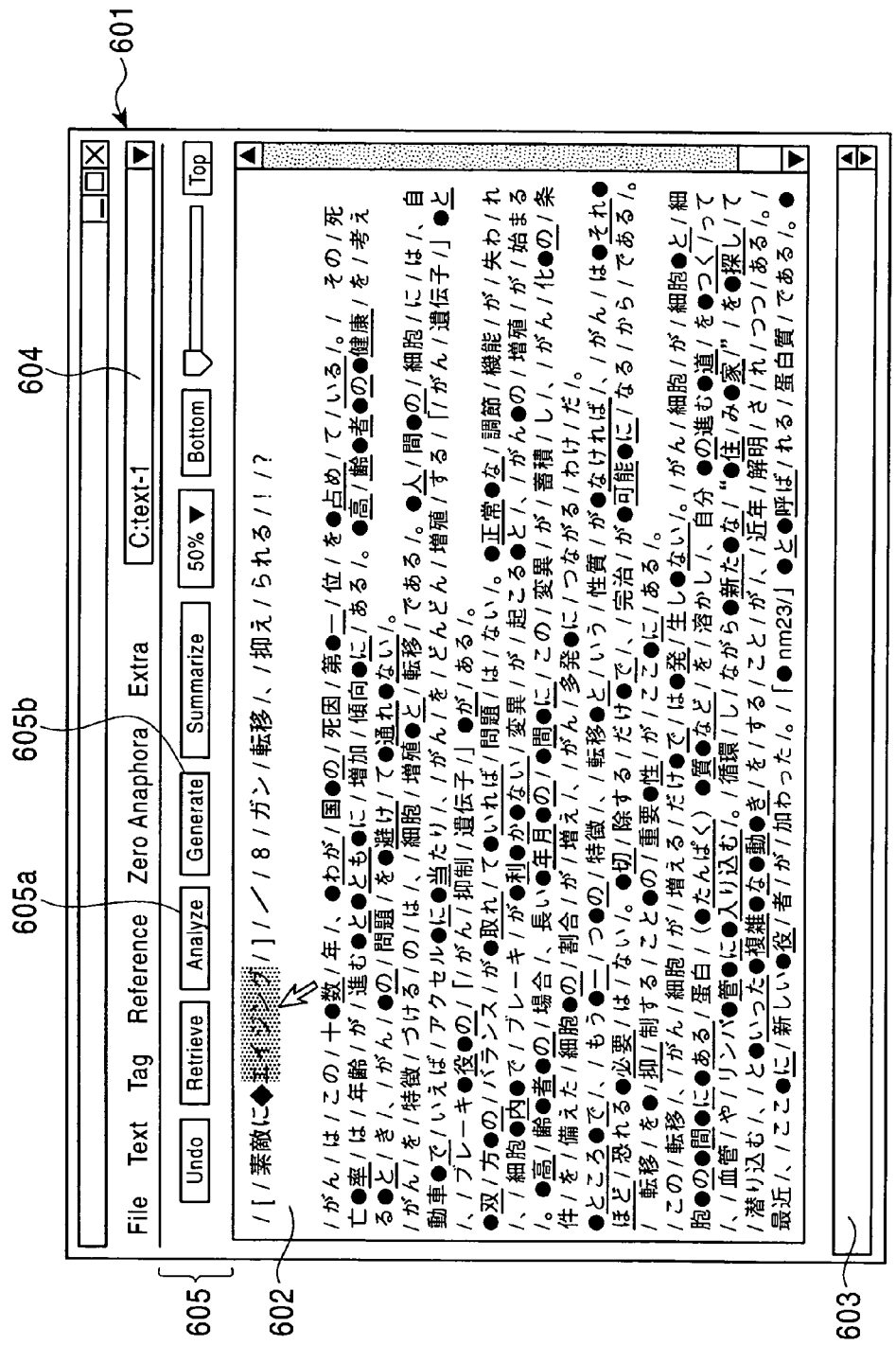
FIG. 36 is a schematic diagram illustrating an example of a text displayed after defining an undefined word during the authoring process according to the embodiment of the invention.

In the tag attribute box 622, the user may define the part of speech. For example, if selects "n" from a pull-down menu of the tag name box 621, then "n" is displayed in the tab name box 622 as shown in FIG. 35. Herein, "n" represents "noun".

In this state, if the user clicks the OK button 623, the controller 72 sets the element "エイジング" (aging) to be a noun.

In response to the change in the tag name, the slash displayed in the document displaying area 602 is changed to a green slash "♦".

As described above, when an analysis result is presented to the user, the user may determine delimitation and the parts of speech of undetermined portions indicated by red slashes "●" and may also define undefined words. Furthermore, if the user adds or modifies a sentence, the controller 72 performs morphological analysis upon the added or modified sentence and displays the analysis result using slashes "/", red slashes "●", and underlines, as required. If the analysis result includes a red slash "●", the user may determine delimitation and the parts of speech of undetermined portions or may define undefined words indicated by red slashes "●".

The user performs the above-described operation until the document displayed in the document displaying area 602 includes no red slashes "●".

Figure 37:
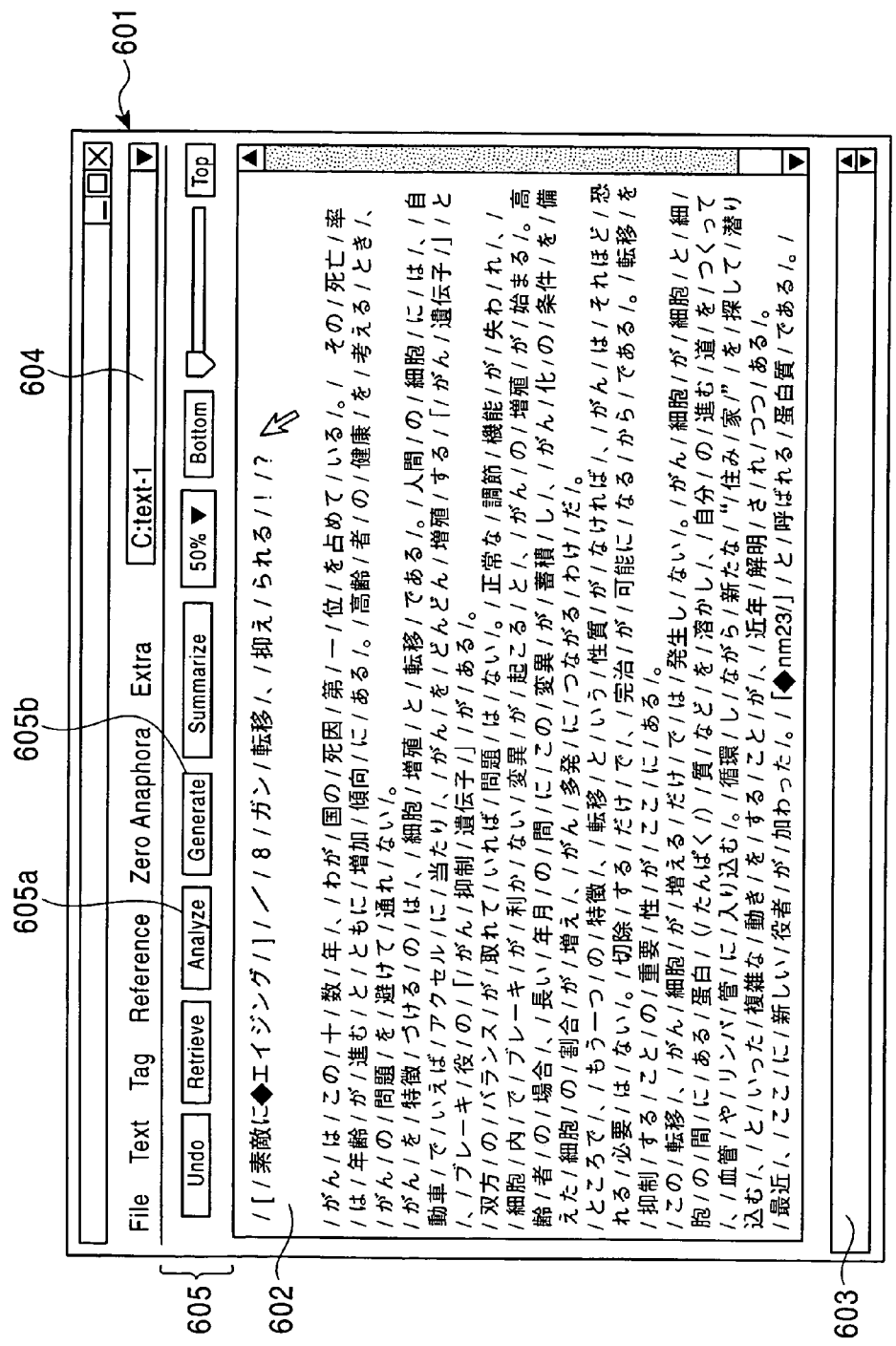
FIG. 37 is a schematic diagram illustrating an example of a text displayed after completion of morphological analysis during the authoring process according to the embodiment of the invention.

If all morphological elements have been determined in terms of delimitation and parts of speech and all undefined words have been defined, the document is displayed, for example, as shown in FIG. 37.

At this stage, it is determined in step F203 that the morphological process has been completed. That is, at this stage, all words in the lowest layer of the document data structure described earlier with reference to FIG. 3 have been determined in terms of delimitation and parts of speech. In other words, tags have been attached in units of words.

Subsequently, in step F205, the controller 72 automatically generates tags representing higher-level sentence structures from the data including tags determined for the respective morphological elements.

More specifically, the controller 72 attaches tags to the text so as to indicate a hierarchical structures including words, subsentential segments, and sentences in accordance with morphemes and the parts of speech thereof, as shown in FIG. 3.

Figure 38:
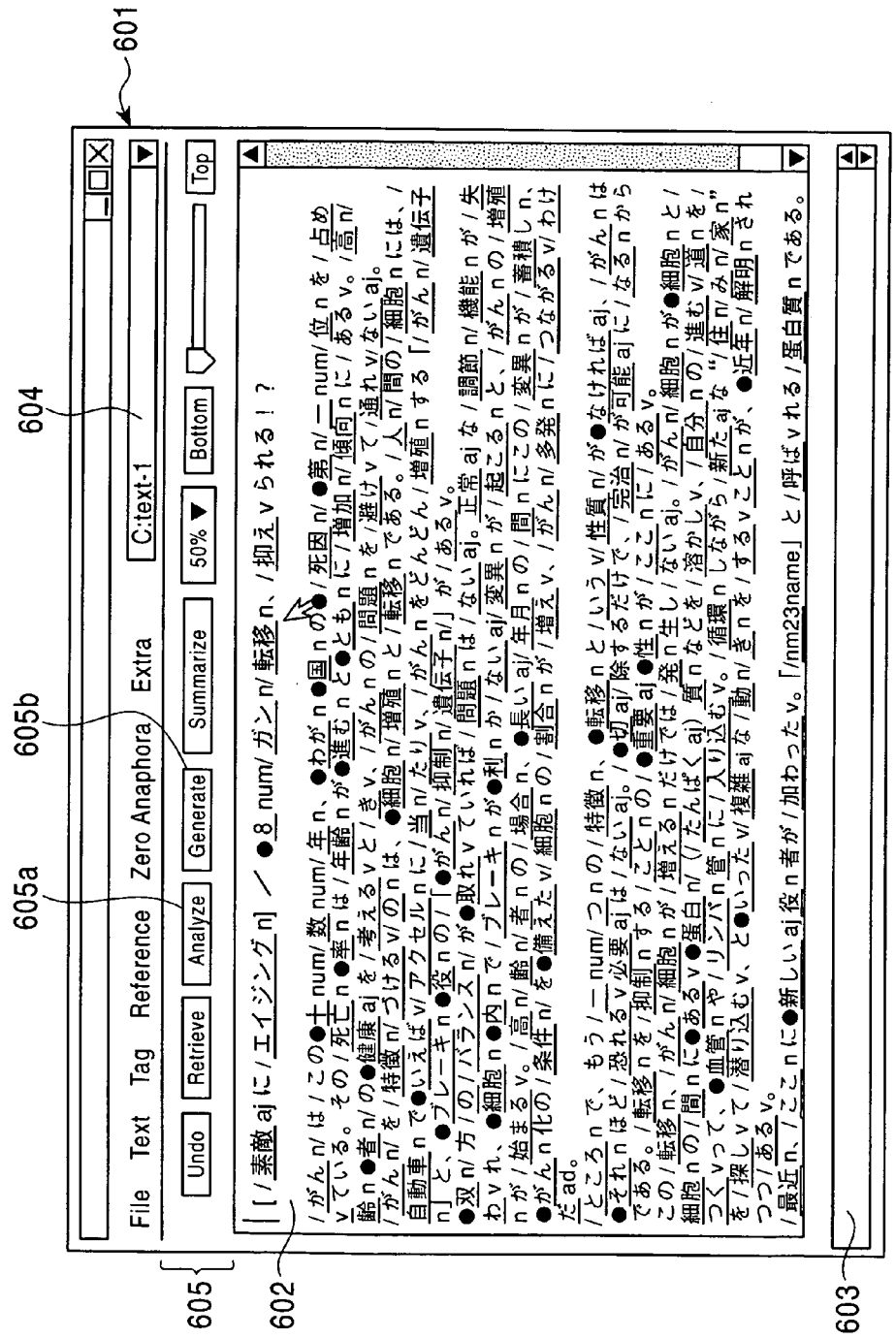
FIG. 38 is a schematic diagram illustrating an example of a text including tags representing document structures added during the authoring process according to the embodiment of the invention.

The result is displayed in the document displaying area 602, as shown in FIG. 38.

In the specific example shown in FIG. 38, one tag is indicated by a combination of a slash, an underline, and a tag name.

In FIG. 38, each read slash "●" is used to indicate that an element having a red slash "●" has a plurality of candidates modified by that element.

Tag names used herein include
n (noun), np (noun phrase),
v (verb), vp (verb phrase),
aj (adjective), ajp (adjective phrase),
ad (adverb), adp (adverb phrase),
ij (interjection),
time (time), timep (time phrase),
name (proper noun), namep (proper noun phrase),
persname (person name), persnamep (person name phrase), orgname (organization name), orgnamep (organization name phrase),
geogname (geographical name), geognamep (geographical name phrase),
num (numeral), nump (numeral phrase).

The tag names described above are some examples, and tag names may be given in many different manners, and there may be additional various tags. Furthermore, the manner in which tags are represented is not limited to the above-described example.

In the document displaying area 602 shown in FIG. 38, slashes "/", red slashes "●", underlines, and tag names are used to indicate higher-level document structures and portions whose dependency-relation is undetermined.

When a user views the result of generation of tags associated with higher-level document structure, the user may determine undetermined portions using the mouse or keyboard of the input unit 78. The user may also modify sentences as required.

In step F207, the controller 72 performs a process in accordance with an operation such as selection of one of candidates or modification of a sentence performed by the user. Each time the controller 72 performs such a process, the result is displayed in step F202.

The process may return to step F202 to again perform the morphological analysis, if required. This may occur, for example, when a sentence is added.

Figure 39:
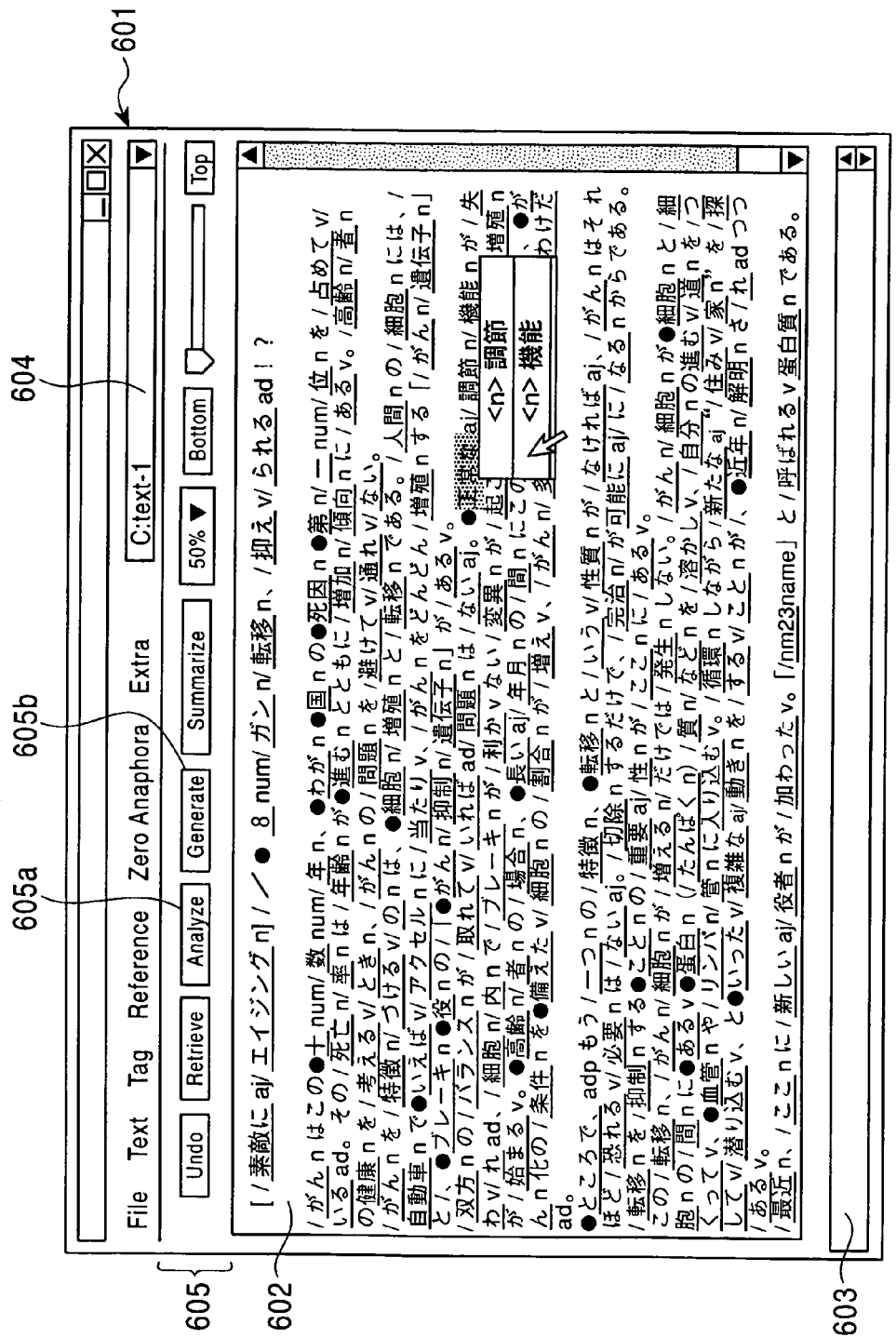
FIG. 39 is a schematic diagram illustrating an example of a manner of displaying candidates for words modified by a modifier, during the authoring process according to the embodiment of the invention.

In the specific example shown in FIG. 39, a word "正常な" (Japanese word corresponding to "normal") is clicked that is indicated, by a red slash "●" and an underline, to be undetermined as to which word to modify. That is, in step F207, if the user clicks "正常な" (normal), the controller 72 displays candidates for words that are modified by "正常な" (normal).

More specifically, the controller 72 displays two words "調節" (adjustment) and "機能" (function) as candidates.

When candidates are presented, the user may select (click) a correct candidate thereby determining the word modified by the modifier.

For example, if the user clicks "機能" (function), it is determined that "機能" (function) is modified by "正常な" (normal).

The user performs the above operation to determine all undetermined portions until the document data includes no red slashes "●".

Tags generated in step F205 indicate structures in levels of words, subsentential segments, and sentences shown in FIG. 3. On the other hand, tags for indicating structures in higher levels, such as paragraphs, subdivisions, and a document are described by the user in step F207.

Figure 40:
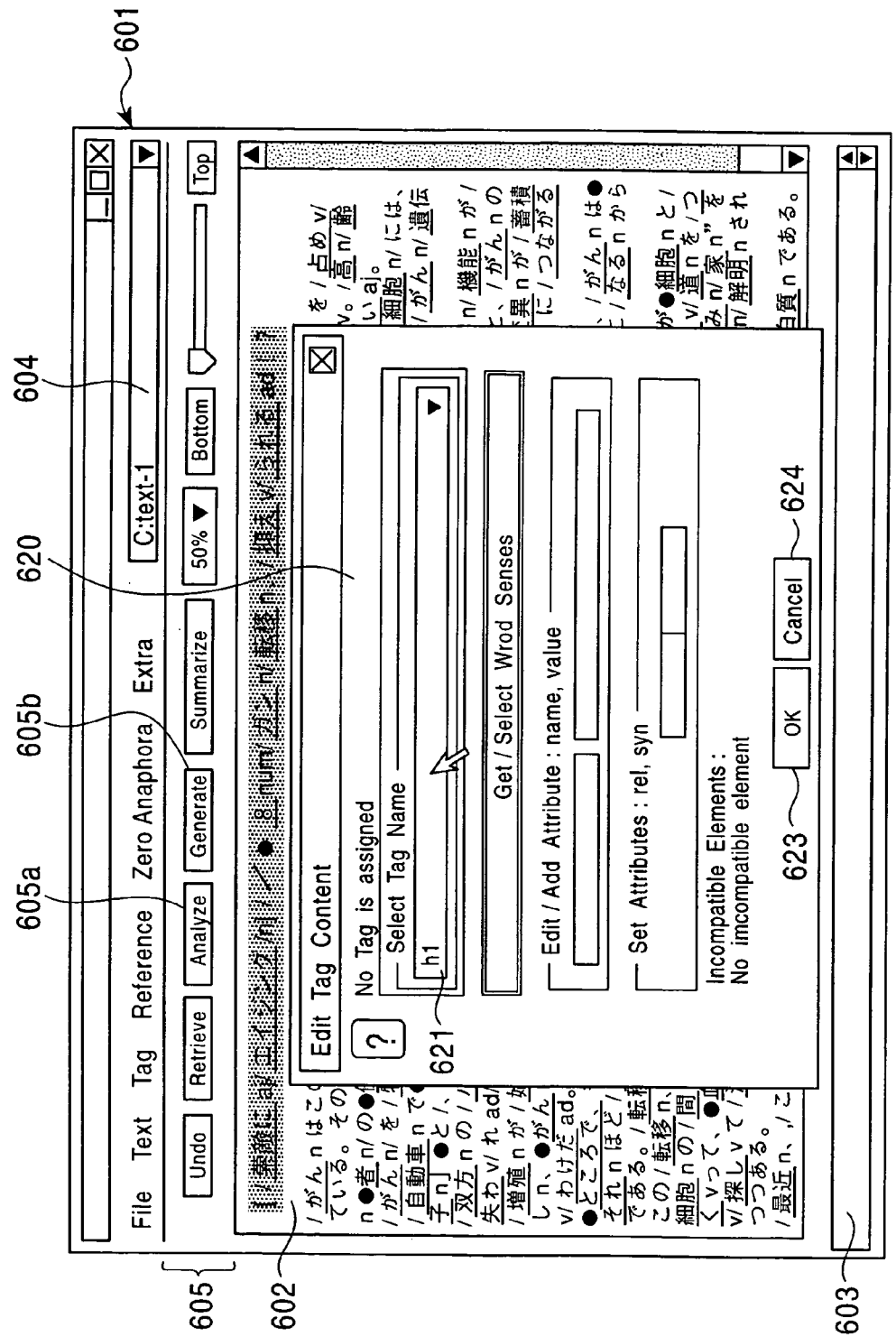
FIG. 40 is a schematic diagram illustrating an example of a manner of adding a tag using a subwindow during the authoring process according to the embodiment of the invention.

For example, if the user designates "[素敵にエイジング ... 抑えられる!?" in the document data, the controller 72 opens the editor window 602 as shown in FIG. 40 so that the user may describe a tag.

In this specific example shown in FIG. 40, "h1" is selected by the user from a pull-down menu displayed in the tag name displaying box 621. Herein, "h" (h1, h2, . . . ) represents a heading.

In this state, if the user clicks the OK button 623, the controller 72 determines that "[素敵にエイジング ... 抑えられる!?" is designated as a heading-1 and attaches a corresponding tag.

Figure 41:
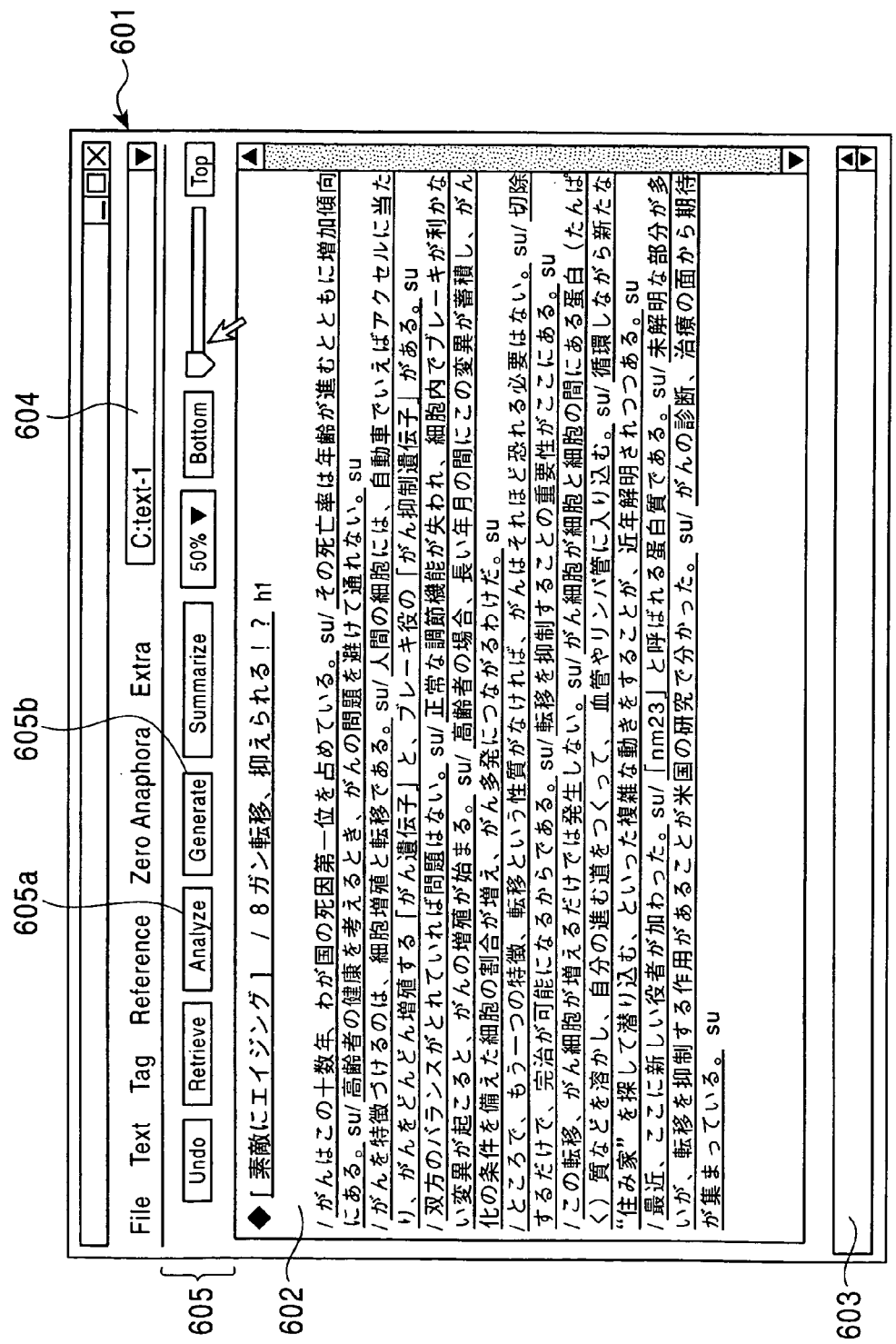
FIG. 41 is a schematic diagram illustrating an example of a manner of displaying a heading and tags associated with sentences during the authoring process according to the embodiment of the invention.

As a result, in the document display area 602, a green slash "♦", an underline, and a tag "h1" are attached to "[素敵にエイジング... 抑えられる!?", as shown in FIG. 41.

Tags that were attached in step F205 to each sentence of the document are also shown in FIG. 41. That is, tags shown in FIG. 14 indicate sentence structures in higher levels than those indicating dependency-relations shown in FIG. 39. As can be seen from FIG. 41, tags described in step F205 and being now displayed include slashes "/", underlines, and tags "su" attached to the respective sentences. Herein, tags "su" are used to indicate "sentences".

As described above, the user may check the tags generated by the controller 72 to indicate document structures in levels higher than words, determine dependency-relations by selecting adequate elements from candidates, and add tags indicating further higher-level structures such as paragraphs and document.

That is, the user advances his/her job at least until the document data displayed in the document displaying area 602 includes no red slashes "●". During the job, the user may describe tags indicating paragraphs, headings, and the document, as required.

When the above-described process is completed, it is determined in step F206 that the tagging process has been completed. At this stage, tags indicating document structures in the levels from words to sentences and paragraphs, subdivisions, and document described earlier with reference to FIG. 3 have been described.

At any desired time thereafter, the user can view an image of tagged document data (a browser image which would be displayed on, for example, the document processing apparatus 1) to check whether tags have been described correctly.

Figure 42:
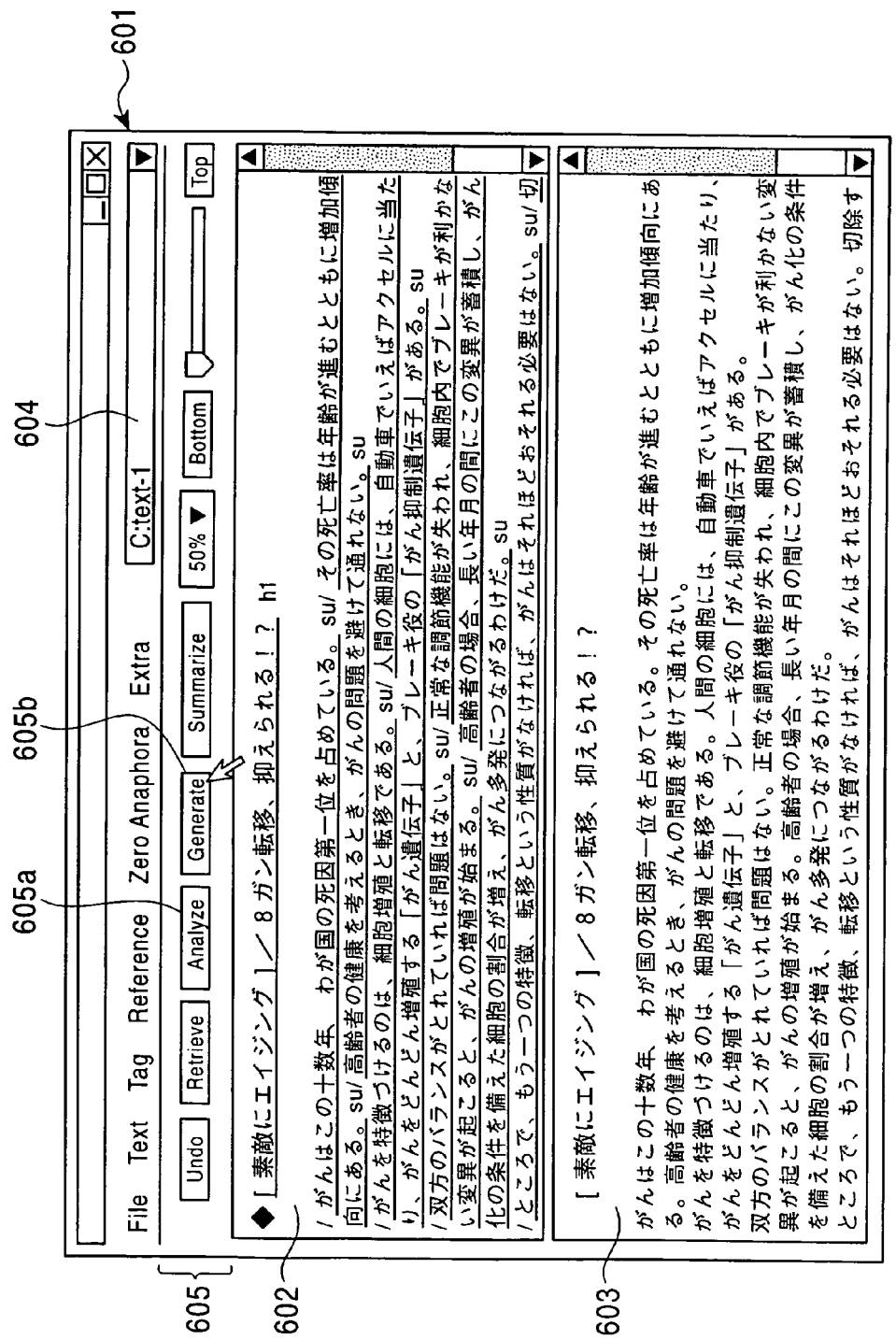
FIG. 42 is a schematic diagram illustrating an example of a manner of displaying a text after being tagged during the authoring process according to the embodiment of the invention.

If the user clicks the Generate button 605b in FIG. 42, a browser image is displayed in the document displaying area 603 in addition to the text including tags displayed in the document displaying area 602, so that the user can view the text in the same manner as that in which the text would be presented to an end user (using the document processing apparatus 1). More specifically, in response to the tag "h1" added in the above process to indicate the heading, the heading portion is displayed in boldface.

Because the user can view the image of the document data, the user can determine whether tagging has been performed correctly. If an incorrect tag or an incorrect sentence is found, the user may issue a command in step F207 to again perform morphological analysis from step F202.

If it is determined in step F206 that the tagging is completed, the controller 72 advances the process to step F208. In step F208, the controller 72 sets reference links in the manner described earlier with reference to FIG. 3.

Note that normal links have been automatically generated in accordance with the tags that have been generated in the above-described process (that is, normal links have already been generated at the time when it is determined in step F206 that the tagging is completed).

In step F208, the controller 72 performs analysis associated with reference links and displays candidates for possible reference links. More specifically, the controller 72 displays candidates for words referred to by a pronoun or the like.

Figure 43:
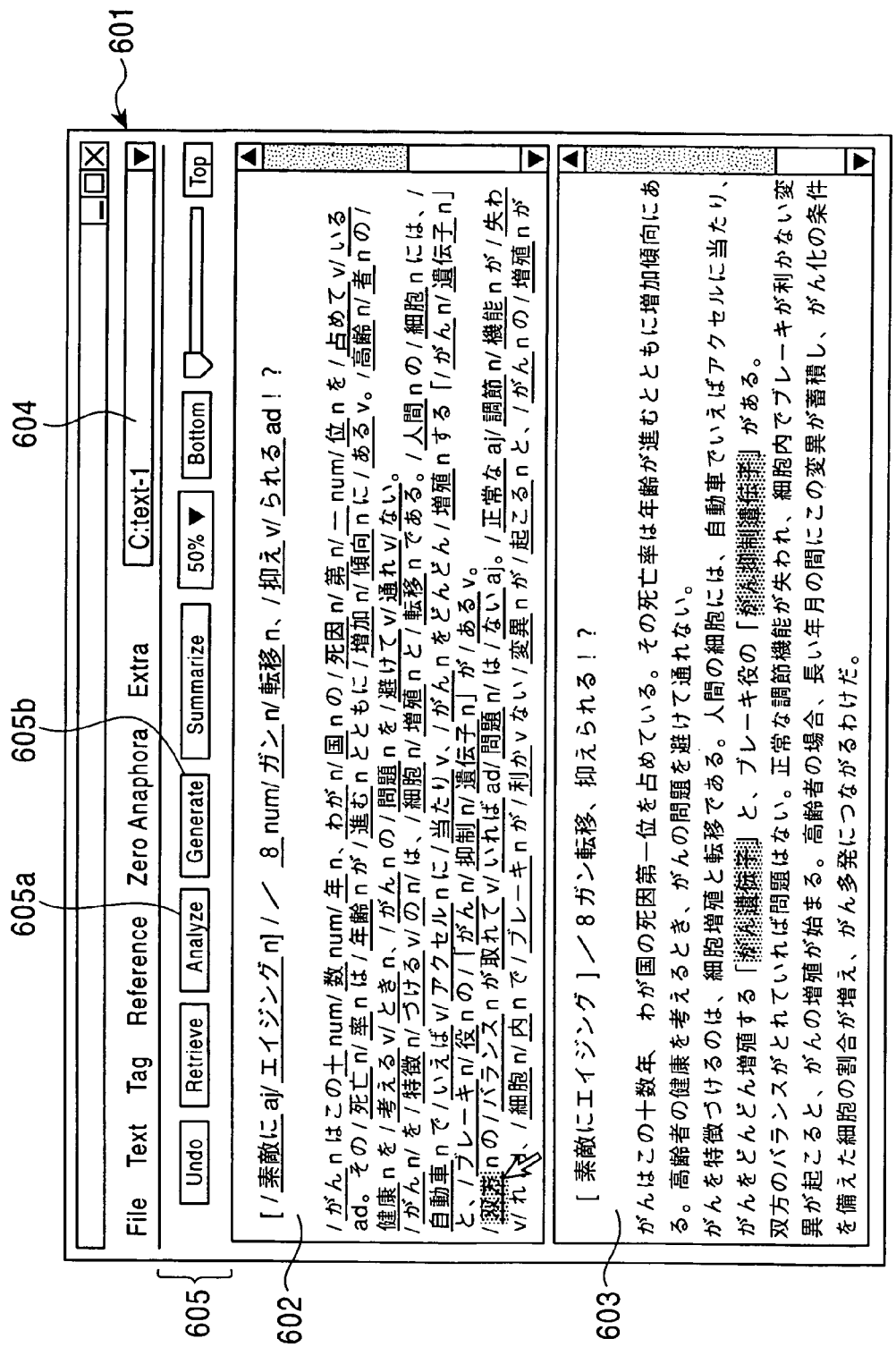
FIG. 43 is a schematic diagram illustrating an example of a manner of displaying words cataphorically referred to by another word, during the authoring process according to the embodiment of the invention.

For example, as shown in FIG. 43, document data is displayed, together with tags included the document data, in the document displaying area 602, and a browser image of the document is displayed in the document displaying area 603.

In the example shown in FIG. 43, "双方" (Japanese word corresponding to "both") is highlighted in the document displaying area 602, and "がん遺伝子" (onocogene) and "がん抑制遺伝子" (tumor suppressor gene) are highlighted in the document displaying area 603 thereby indicating that "双方" (both) cataphorically refers to "がん遺伝子" (onocogene) and "がん抑制遺伝子" (tumor suppressor gene). The highlighting may be performed by means of displaying characters in a reverse fashion or using different colors.

When the user views the displayed document, if a wrong referential relation is found, the user may correct it. The user may also select a word and define a new reference link associated with the selected word.

For example, when a reference link is correct as is the case with the reference link indicating that "双方" (both) cataphorically refers to "がん遺伝子" (onocogene) and "がん抑制遺伝子" (tumor suppressor gene), the user performs no operation for correction. However, if a wrong referent is referred to, the user designates a correct referent in the document displaying area 603.

When a certain word is selected in the document displaying area 602, if no reference link is defined for that word, no referent is displayed in the document displaying area 603. If necessary, in this case, the user may define a reference link by designating a referent in the document displaying area 603.

In steps F210 and F208, the controller 72 modifies or adds a reference link in accordance with the operation performed by the user. Each time such a process is performed, the result is displayed.

During the above process, the user may also add a new sentence or modify a tag. In response, the controller 72 may return the process to step F202 so as to again perform the process from morphological analysis.

If it is determined in step F209 that all reference links have been determined in accordance with the operation performed by the user, the process goes to step F211. In step F211, the completed document data including tags is stored as authored document data in the RAM 74 or the HDD 82.

Thereafter, the resultant document data is transmitted to the server 3 via the storage medium 81 or the communication line 6 and stored in the database 3a.

The server 3 supplies the document data stored in the database 3a to an end user's apparatus such as the document processing apparatus 1. Thus, the end user can perform various processes (displaying the document, generating and displaying a summary of the document, reading aloud the document of the summary) upon the document data using the document processing apparatus 1.

As described above, the authoring apparatus 2 divides the original document (plain text) into morphological elements and adds morphological information thereto The authoring apparatus 2 also adds information representing the hierarchical document structures and also adds information indicating referential relations between elements in the original document. Thus, the authoring apparatus 2 generates document data (tag file) in a form that makes it possible to perform desired processing upon the document data.

In the authoring process described above, morphological analysis is first performed, and then the document structure is defined from the lowest level to the highest level. Delimitations, parts of speech, words modified by modifiers, and referents referred to by anaphora or cataphora are determined by a user by selecting one of candidates displayed.

Thus, the user can easily do an authoring job on the authoring apparatus 2 without having to have high-level knowledge about a language and the grammar thereof. This means that the use can correctly attach tags to the document depending on the content thereof, without having to have knowledge about the grammar.

Thus, the user can do the authoring job quickly and correctly simply by designating a particular portion of the document and selecting a candidate.

In accordance with an input given by a user, the authoring apparatus 2 determines delimitation of a given document, adds or modifies reference information or information representing document structures, and adds, modifies, or deletes sentences, thereby attaching complicated tags to the document in an adequate fashion that would not be achieved by a simple automatic process. This also makes it possible to generate a tag file as intended by a user.

Furthermore, candidates in terms of separators between adjacent morphemes, morphological information, information about document structures, and reference information are displayed on a display device thereby allowing a user to easily recognize the status of the authoring process and easily perform the authoring process.

Although the authoring process has been described above with reference to the specific example in conjunction with FIGS. 28 and 29–43, the authoring process may also be performed in many different ways.

For example, instead of performing an authoring process upon a plain text that has already been generated, a user may perform an authoring process while generating a plain text. In this case, each time the user inputs a sentence, morphological analysis is performed upon the input sentence, and the result is displayed using slashes, underlines, and the like. The user may determine morphological definitions by properly selecting candidates and may modify the sentence as required. After that, the user may input another sentence.

The manner of displaying the status of the authoring process is not limit to use of slashes "/", red slashes "●", green slashes "♦", underlines, and tags. The status of the authoring process may also be displayed in various manners depending on the authoring program, the display device, and fonts employed.

Furthermore, the manners of displaying candidates in various stages during the authoring process are not limited to the examples described above.

The authoring apparatus and the document data providing system have been described above with reference to specific embodiments. Note that the authoring apparatus 2 and the system including the authoring apparatus 2 may be configured in various manners.

Furthermore, the respective parts of the authoring apparatus 2, such as the main unit 71, the display 79, the input device 78, the communication device 77, the write/read unit 80, and the HD 82, may also be configured in various manners, and they may be connected to one another in various manners. For example, as for the input device 78, not only the keyboard and the mouse, but also other devices such as a tablet, a light pen, and a wireless command inputting device using an infrared ray may be employed.

Furthermore, the authoring apparatus 2 may include a plurality of similar devices such as write/read units. The authoring apparatus 2 may further include other types of devices such as a printer and an audio output device.

The authoring apparatus 2 may be realized in the form of a dedicated apparatus or may be implemented on a general-purpose information processing apparatus such as a desk-top personal computer, a portable personal computer, and a workstation.

In the embodiment described above, some examples of manners of tagging a document have been described. However, the present invention is not limited to such examples.

In the embodiment described above, a document written in Japanese and a document written in English have been taken as examples. However, the present invention is not limited to those languages.

Note that various modifications and changes are possible without departing from the scope and spirit of the present invention.

The functions of the present invention may be realized by an authoring program stored on a storage medium in the form of a disk or a tape. Note that such a storage medium also falls within the scope of the present invention.

Similarly, the functions of the present invention may also be realized by an authoring program stored on the HDD 84 shown in FIG. 1.

Using such a storage medium, it is possible to supply a program for implementing the above-described authoring method. This makes it possible to realize the authoring apparatus according to the present invention, on a general-purpose computer or the like.

Various types of storage media may be employed as the above-described storage medium. They include a floppy disk, an optical disk, a magnetooptical disk, a magnetic tape, a memory card using a flash memory or the like, and a memory chip.

The program implementing the authoring method according to the present invention may also be supplied via a communication network such as the Internet. This means that the present invention may also be applied to a storage medium used in a program server or used in a communication process.

As can be understood from the above description, the present invention has great advantages as described below.

That is, an original document (plain text) is divided into morphological elements, and morphological information is added thereto. Information representing the hierarchical document structures is also added. Furthermore information indicating referential relations between portions in the original document is also added. Thus, document data (tag file) is generated in a form that makes it possible to perform various processes upon the document data.

Because morphological analysis is first performed and then document structures are described step by step in the order of hierarchical levels, a user can easily generate document data in a correct fashion.

The combination of the automatic analysis and determination as to morphological definitions of elements, description of document structures and referential relations also allows the user to easily obtain desired document data.

Because the authoring apparatus has the capability of determining delimitations of morphological elements and modifying/adding morphological information, reference information, and information representing document structures in accordance with an input given by a user, it is possible to correctly describe various complicated tags that would not be achieved by a simple automatic process. This also makes it possible to generate a tag file as intended by the user.

Furthermore, by presenting candidates in terms of delimitations of morphological elements, morphological information, reference information, and information representing document structures, it becomes possible for a user to easily recognize the status of the authoring process and easily advance the authoring process.

The present invention also provides the method including the steps of automatically analyze an original document to be processed, adding information to the original document, modifying, adding, or deleting information in accordance with an input given by a user in response to the result of the automatic analysis, and generating document data including information added via the automatic analysis and modified via the modification/addition process according to the input given by the user. That is, document data including added information (various tags) is generated via the automatic analysis and the process performed in accordance with inputs given by the user thereby allowing the user to easily obtain document data generated as intended by the user. In the automatic analysis and the process performed in accordance with inputs given by the user, information is added in a step-by-step fashion in the order from the lowest level to the highest level of the document structure thereby making it possible to add information in a highly efficient and correct fashion.

What is claimed is:

1. A document processing apparatus comprising:

an automatic analysis means for automatically analyzing an electronic document and attaching hierarchical structure information representing a document structure to said electronic document in accordance with the result of said automatic analysis, said automatic analysis means automatically analyzes the document structure of said electronic document in the order from a lowest hierarchical level to a highest hierarchical level;

information presenting means for presenting information about the electronic document including said structure information at each hierarchical level so that a user may correct internal information associated with said electronic document on the basis of said information displayed on a display; and correction means for correcting said internal information associated with said electronic document in response to an operation performed by the user in accordance with the internal information displayed on the display, said correction means corrects the internal structure of said electronic document by adding, removing, or modifying internal information in the order from the lowest hierarchical level to the highest hierarchical level, wherein said automatic analysis means comprises morpheme dividing means for dividing said electronic document into morphemes and morphological information attaching means for attaching morphological information to each said morpheme, and wherein the morphological information includes marks.

* * * * *